RANGE ASSOCIATIVE MEMORY WITH ORDERED RETRIEVAL

Filed March 24, 1966

INVENTORS
ROBERT R. SEEBER
ARWIN B. LINDQUIST

BY [signature]
ATTORNEY

FIG. 2A1
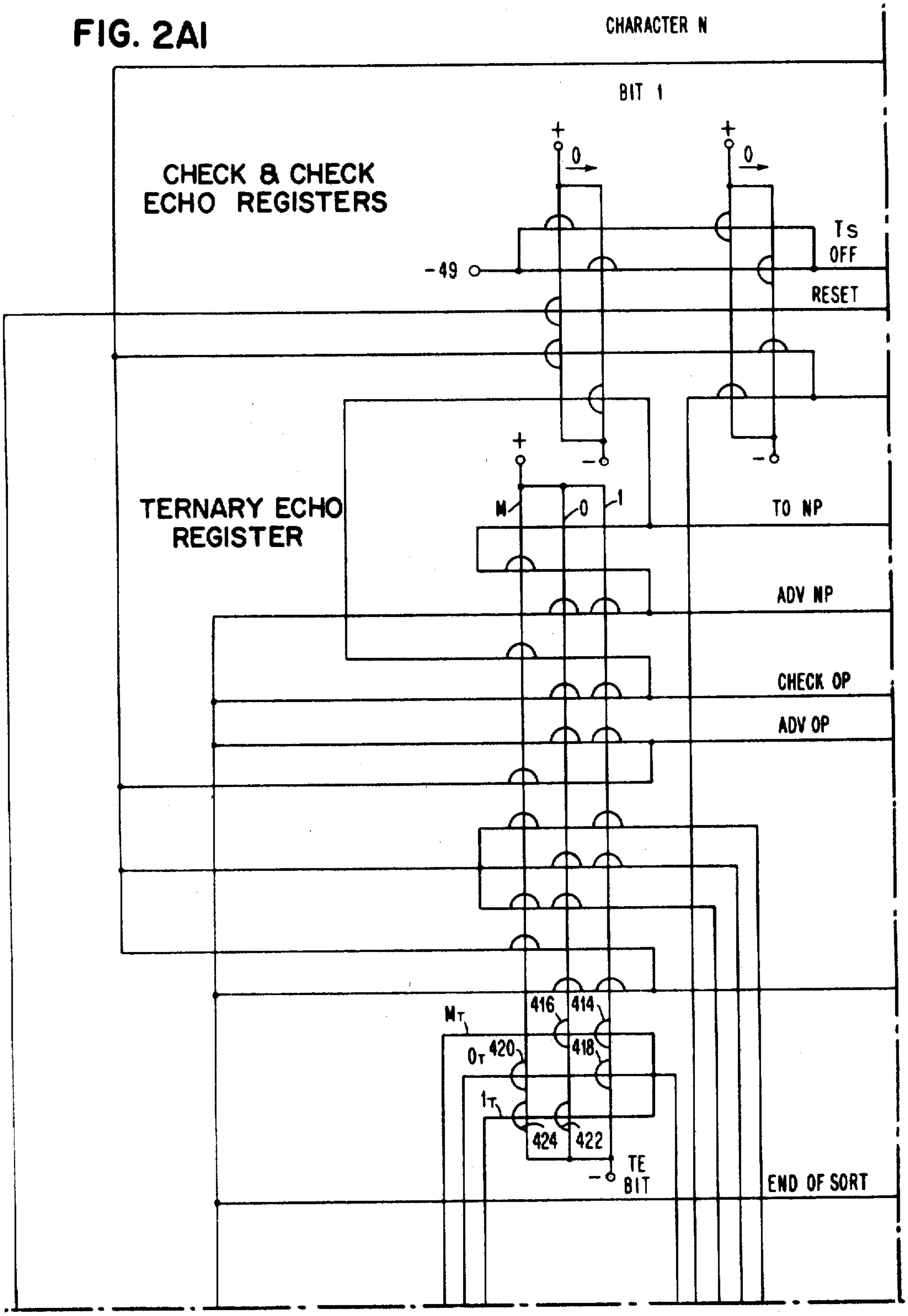

FIG. 2A2
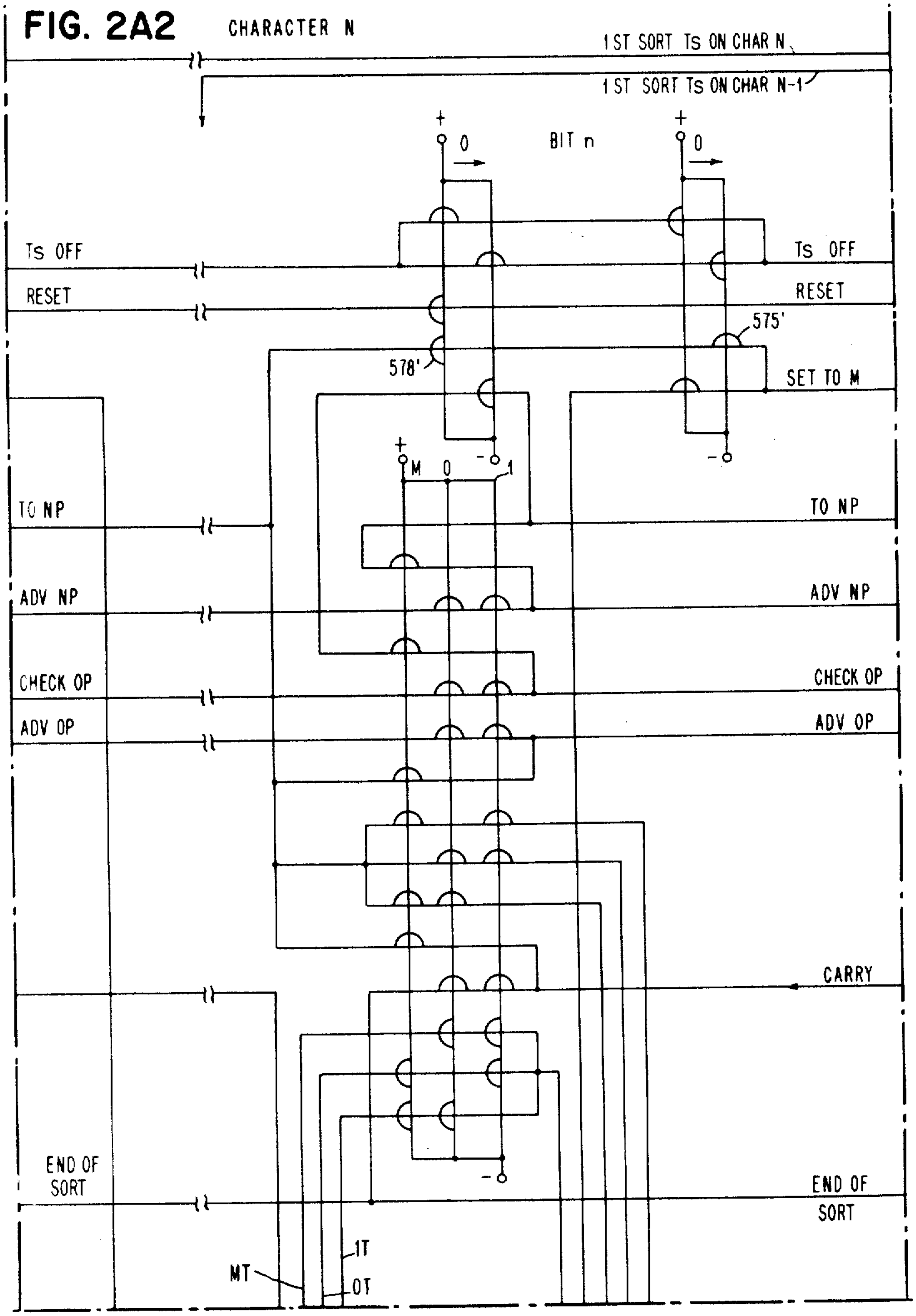

FIG. 2B1
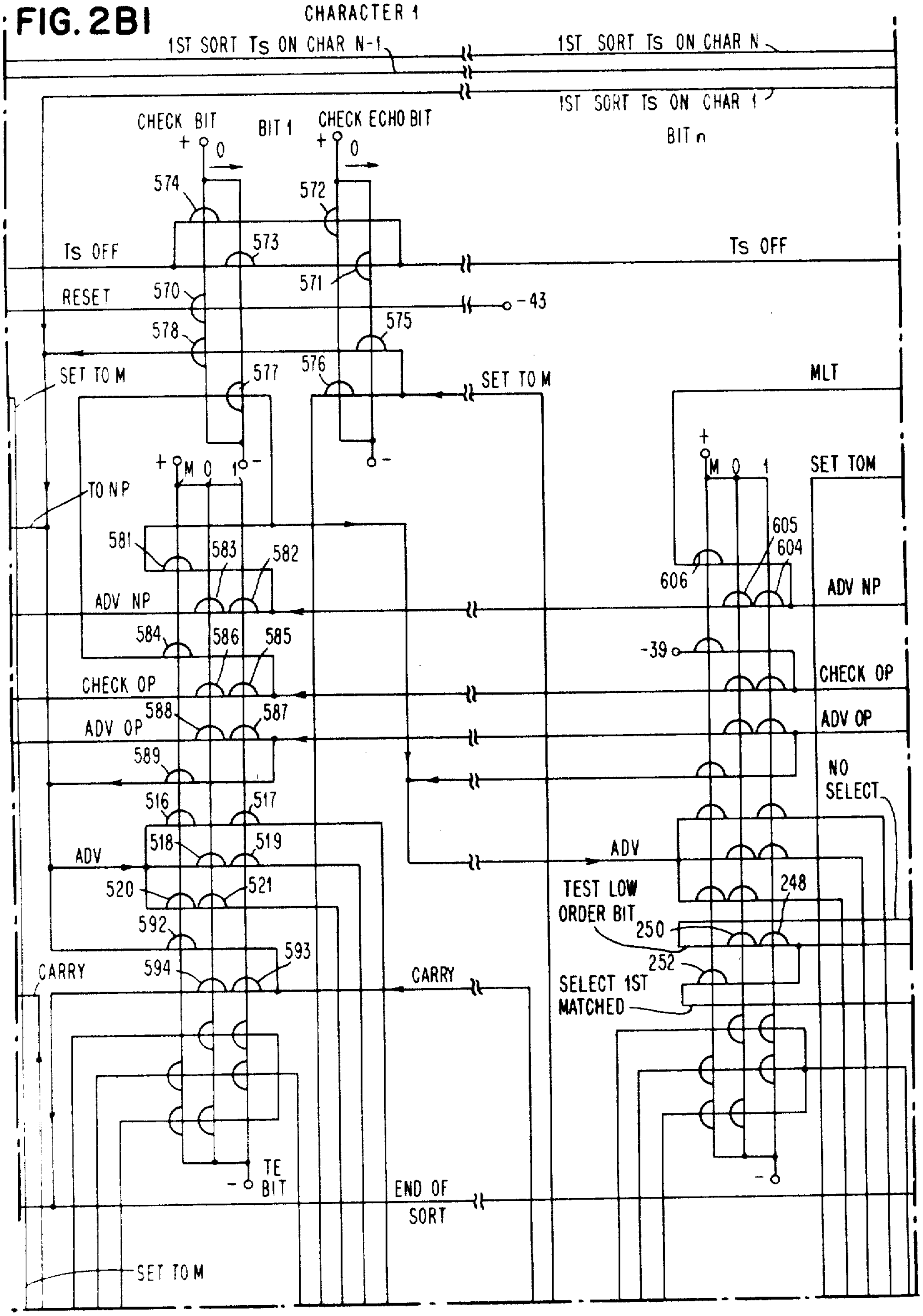

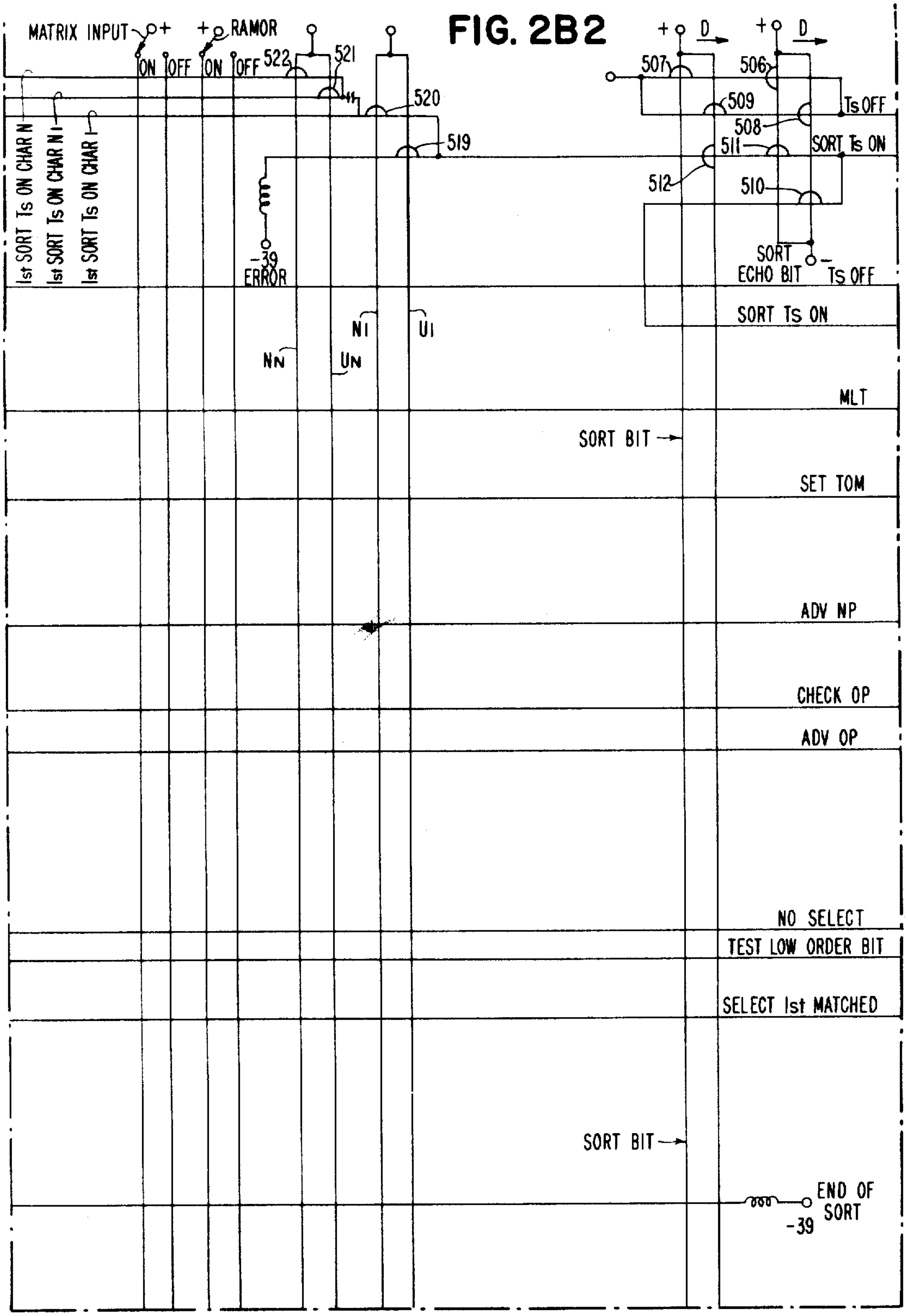
FIG. 2B2

FIG. 2B3
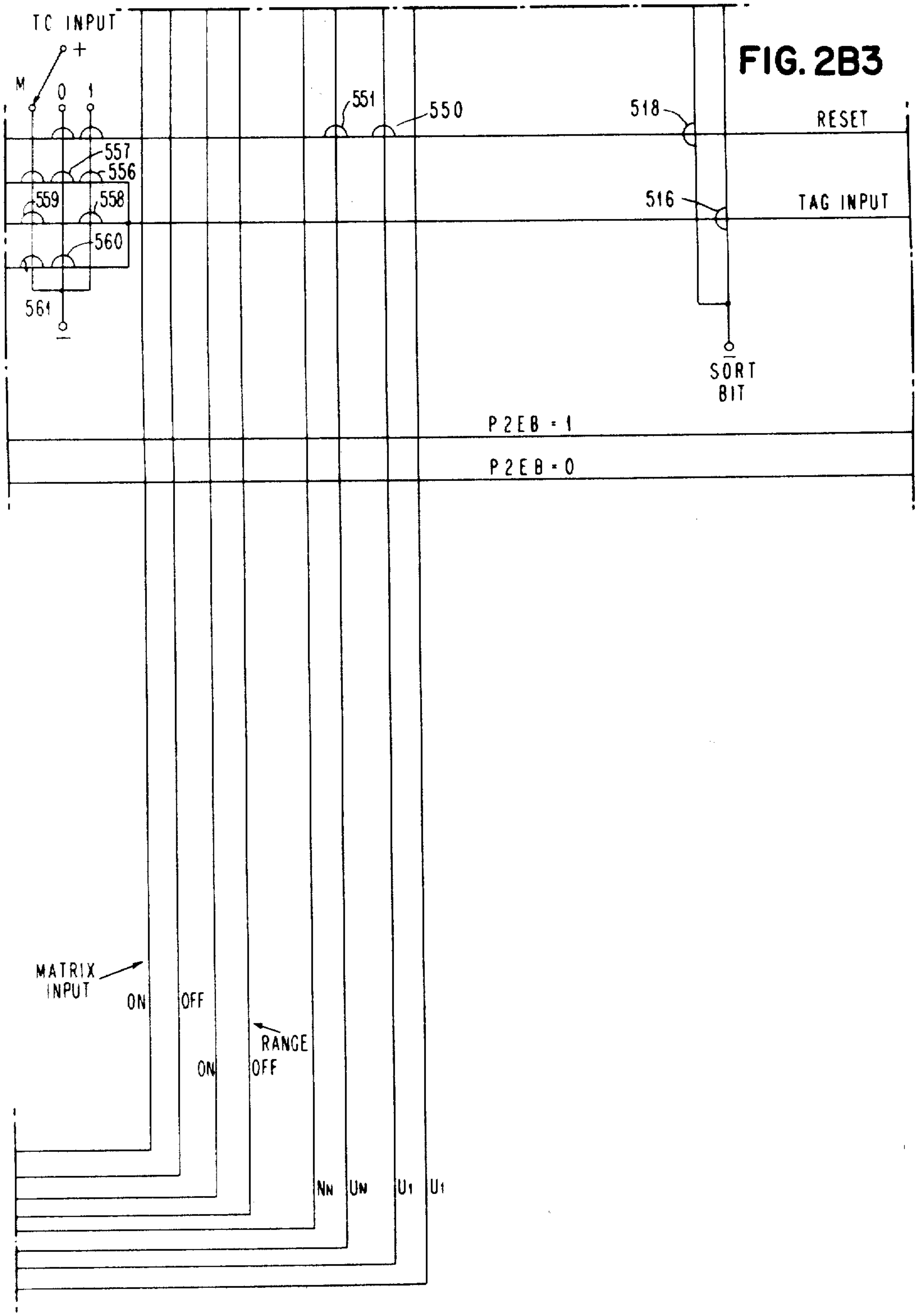

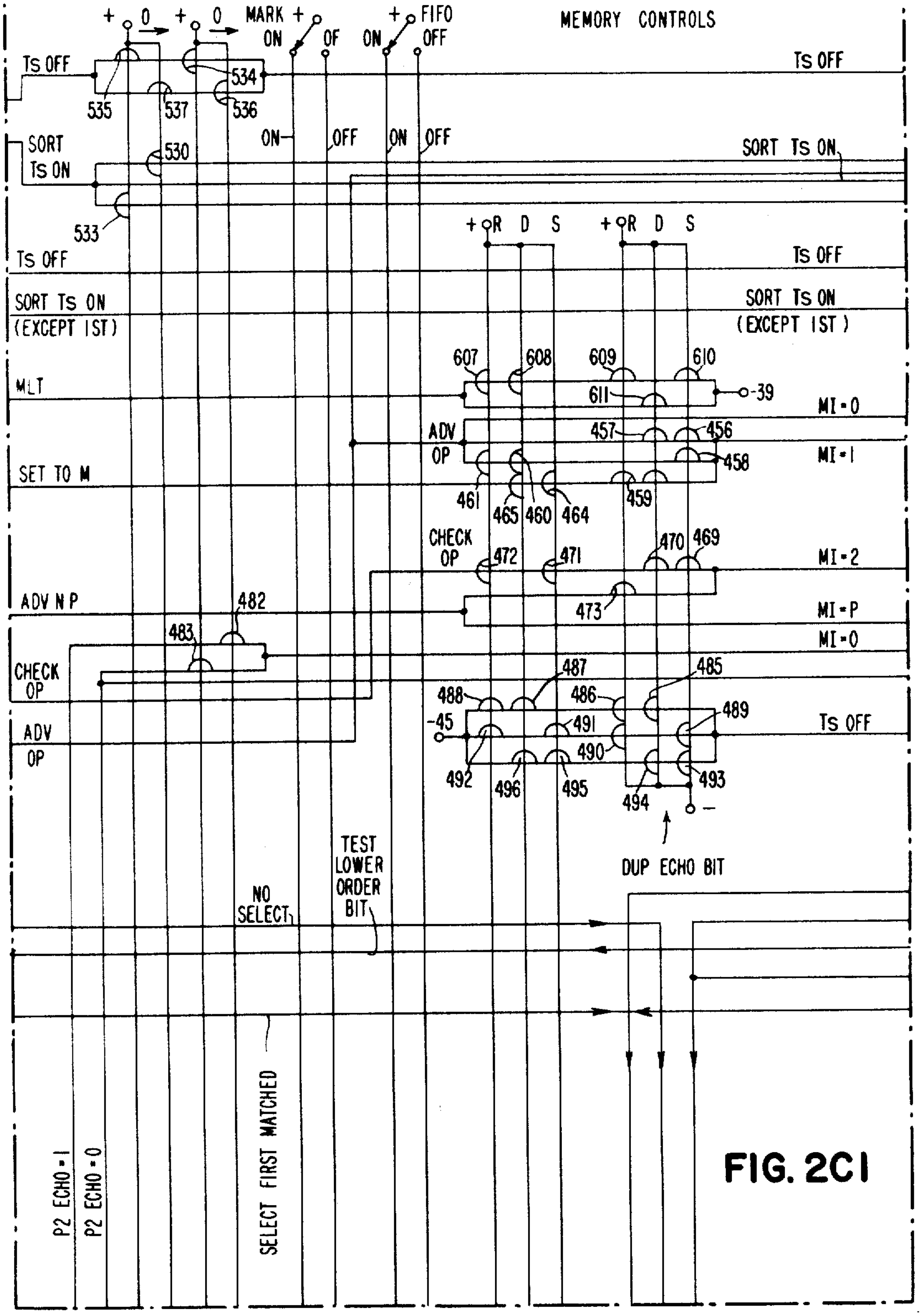
FIG. 2C1

FIG. 2C2
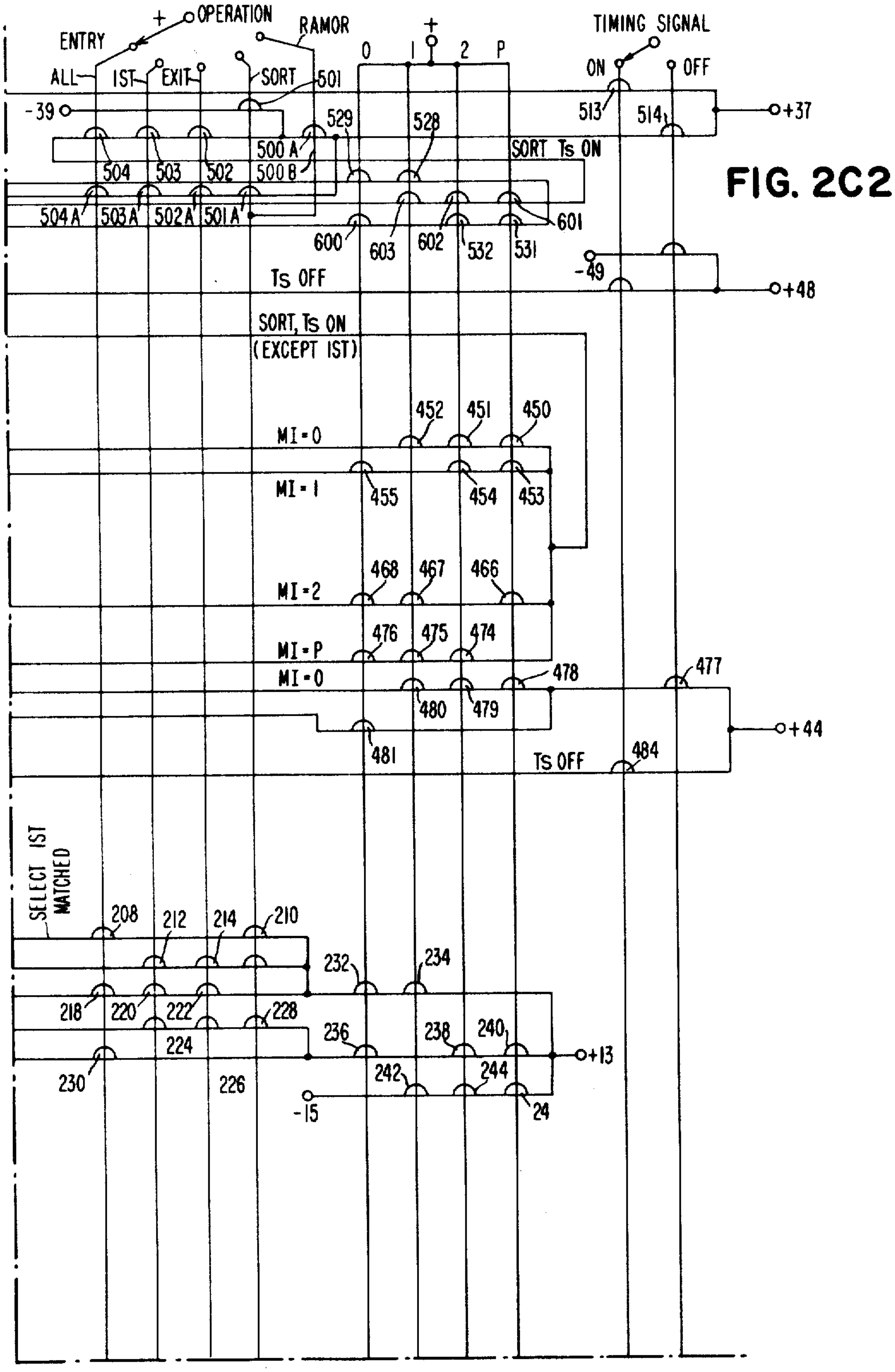

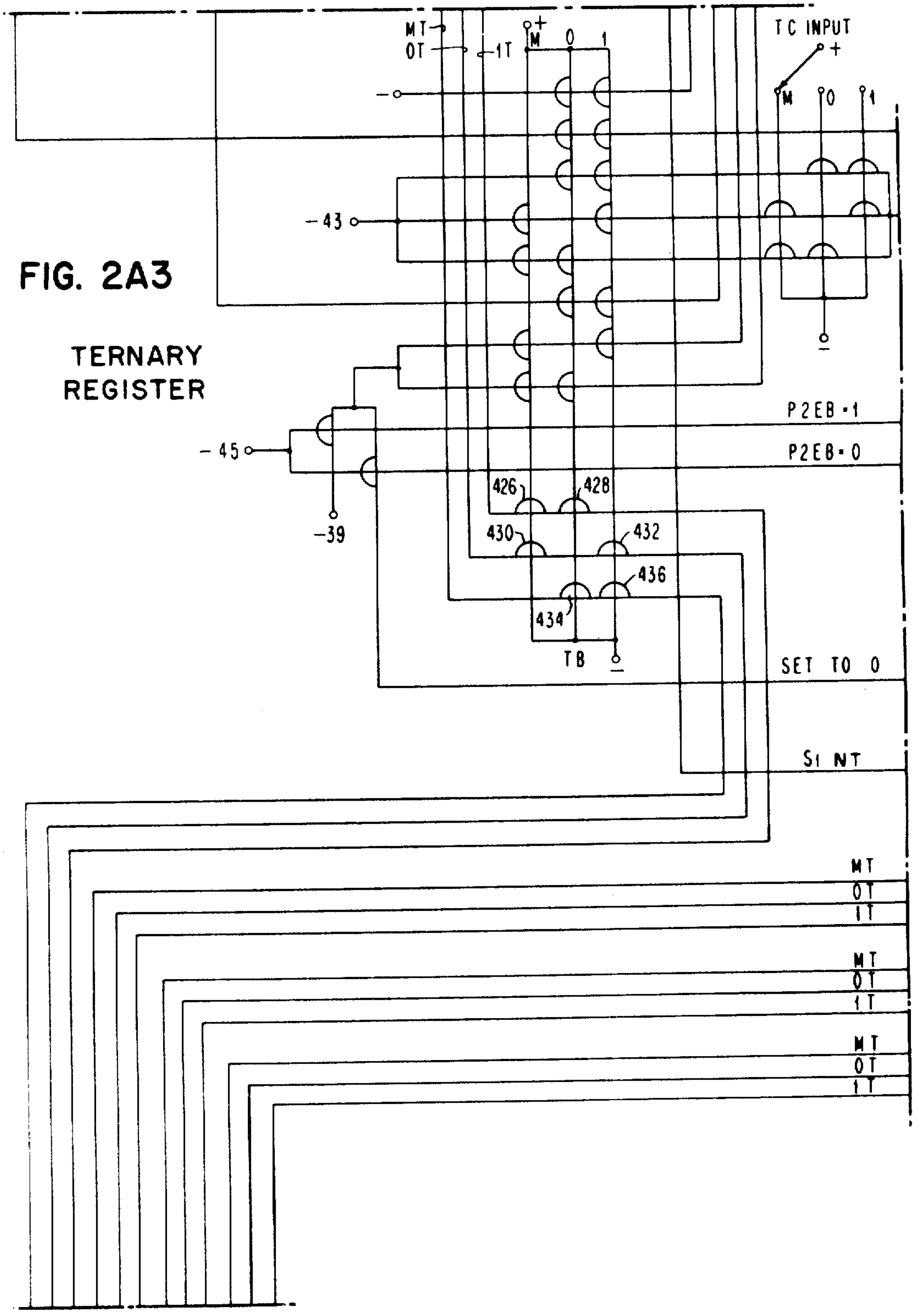
FIG. 2A3

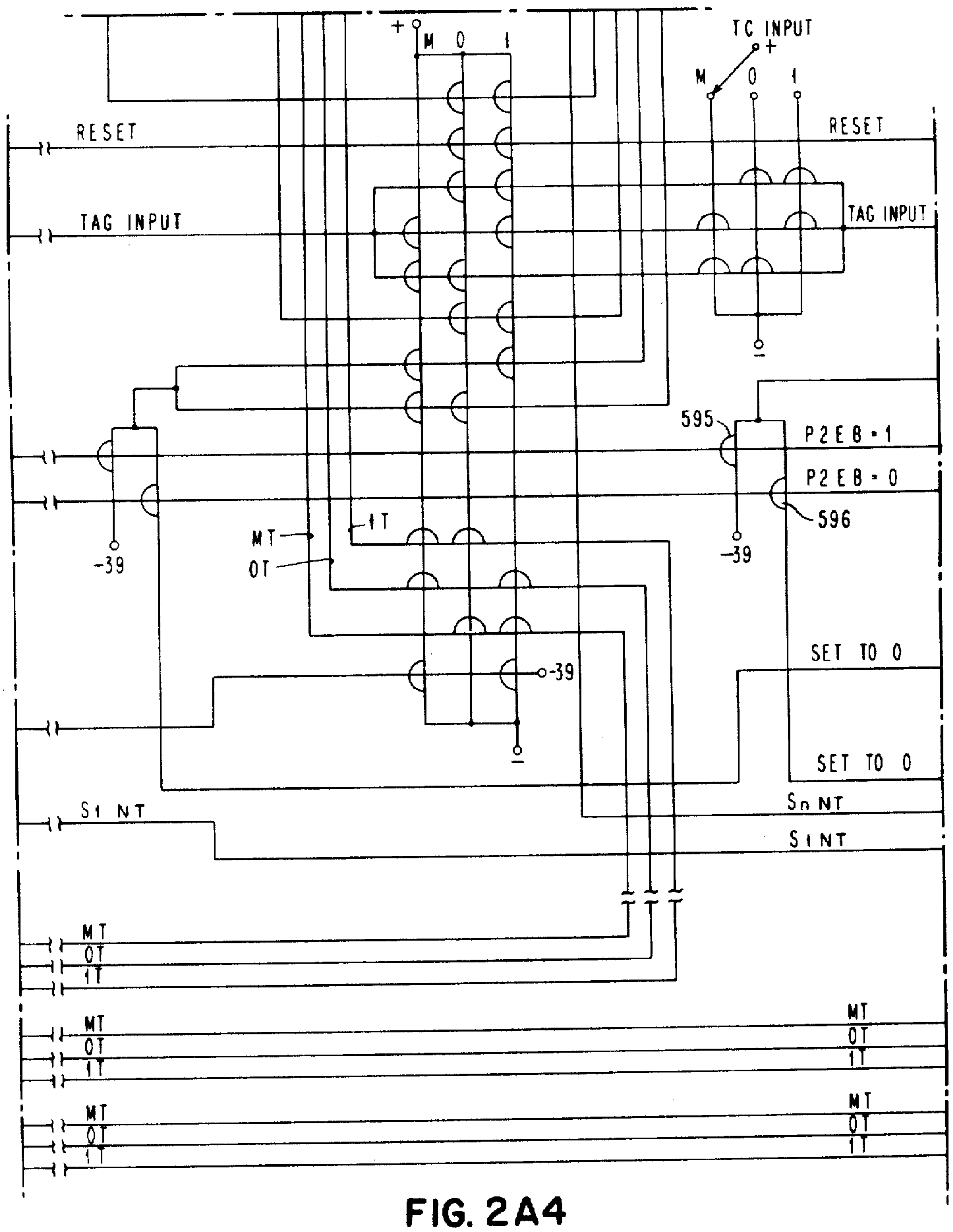
FIG. 2A4

Feb. 25, 1969 R. R. SEEBER ET AL 3,430,205
RANGE ASSOCIATIVE MEMORY WITH ORDERED RETRIEVAL
Filed March 24, 1966 Sheet 11 of 53
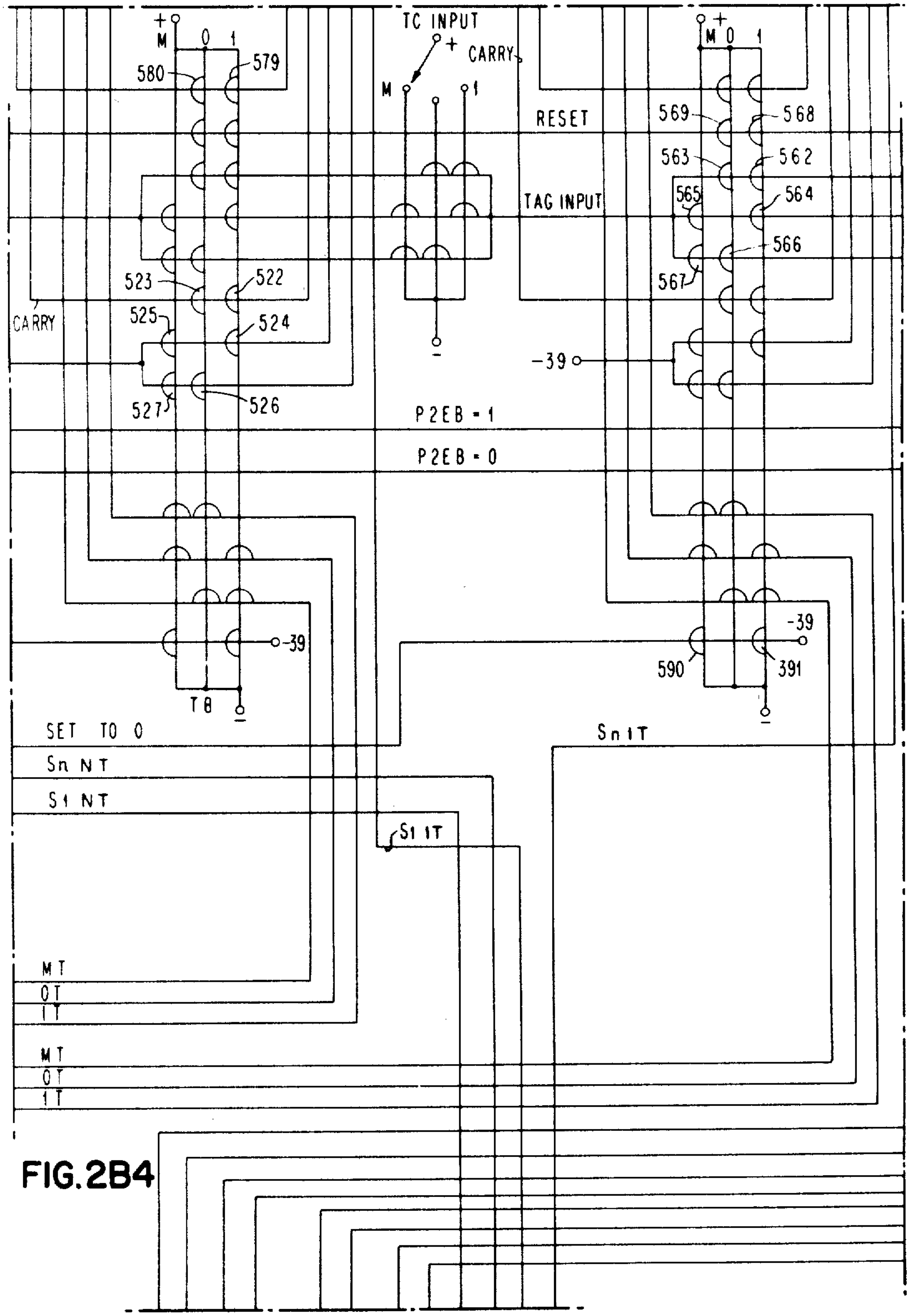
FIG. 2B4

FIG. 2C4
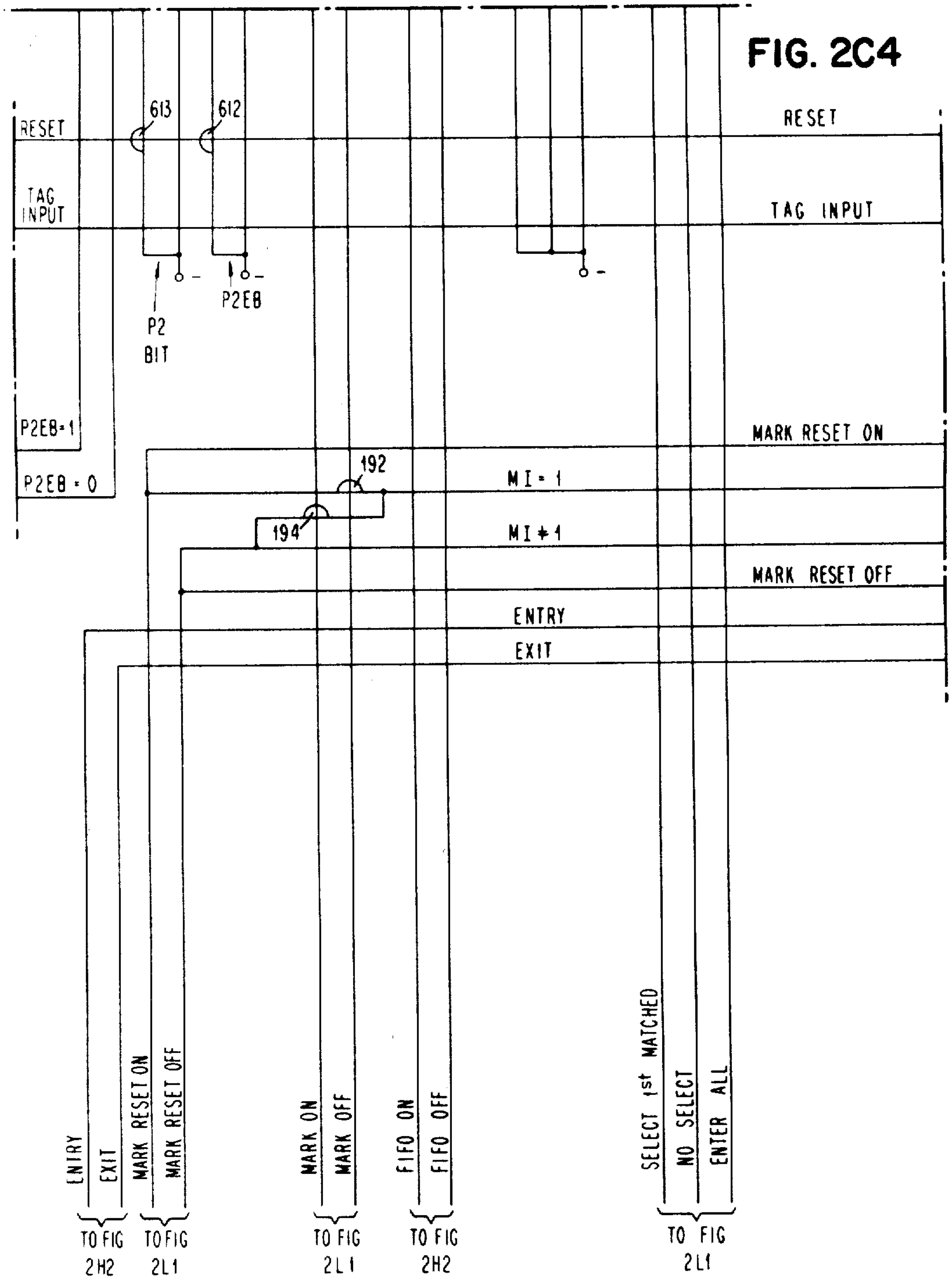

FIG. 2C3
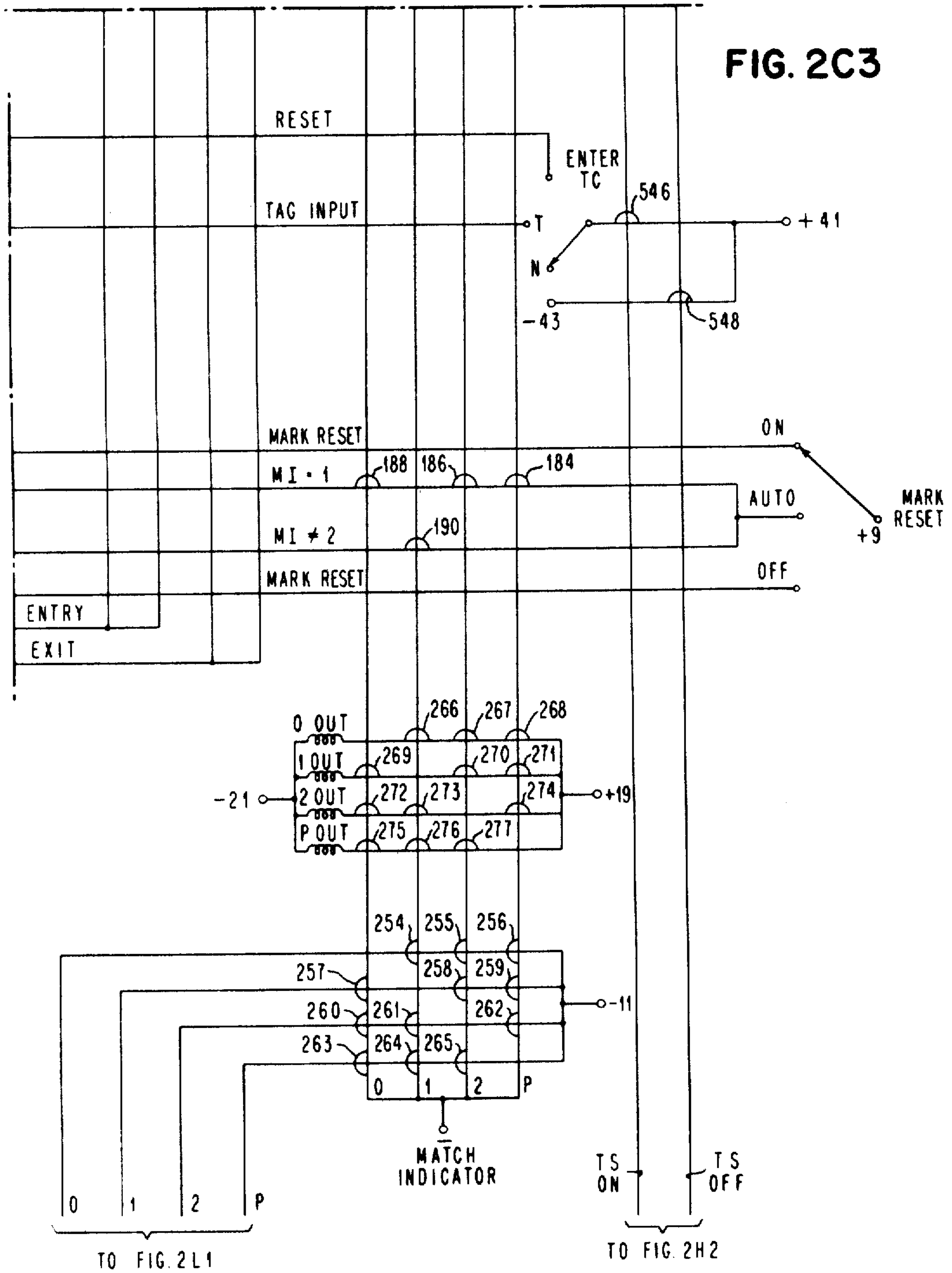

FIG. 2D1
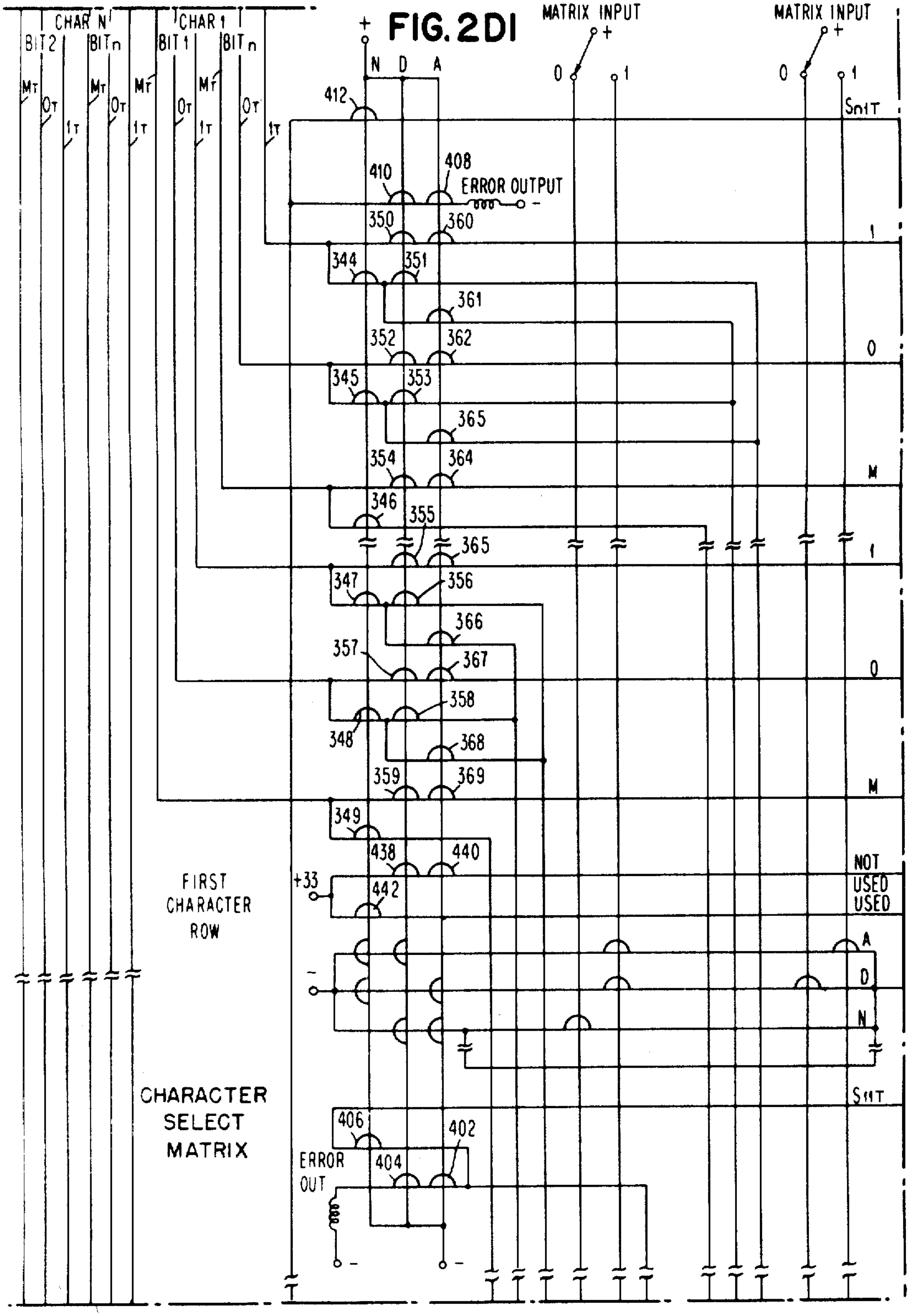

FIG. 2E1
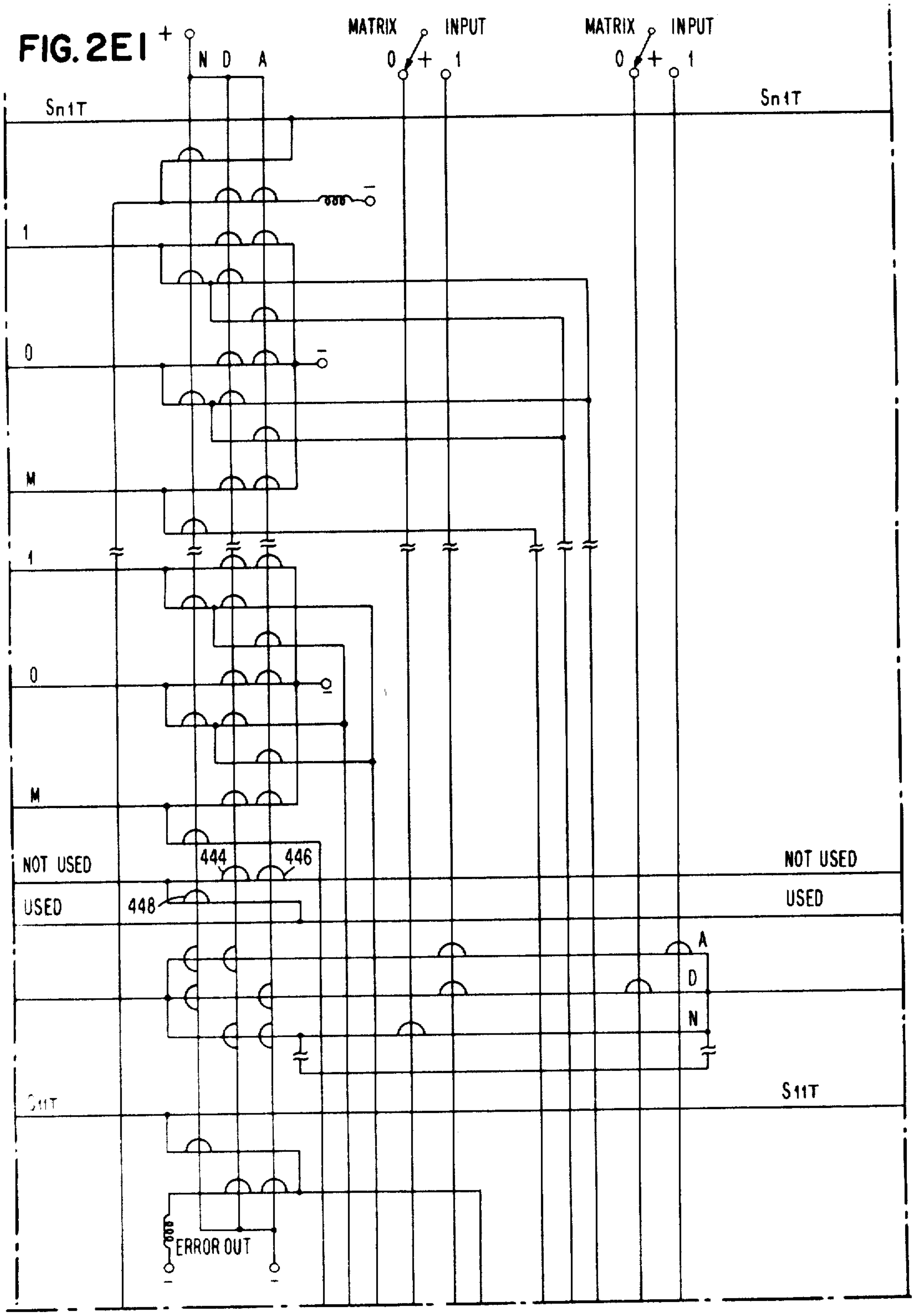

FIG. 2E2
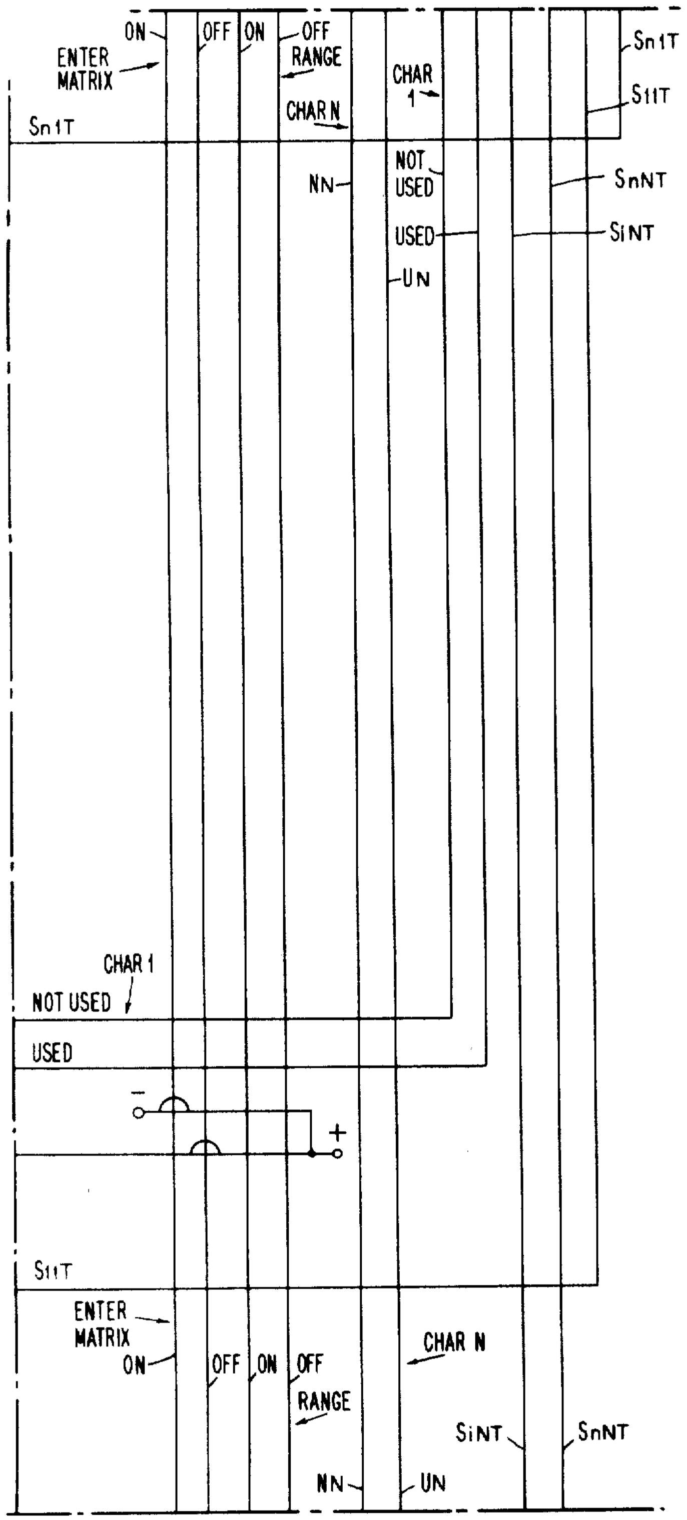

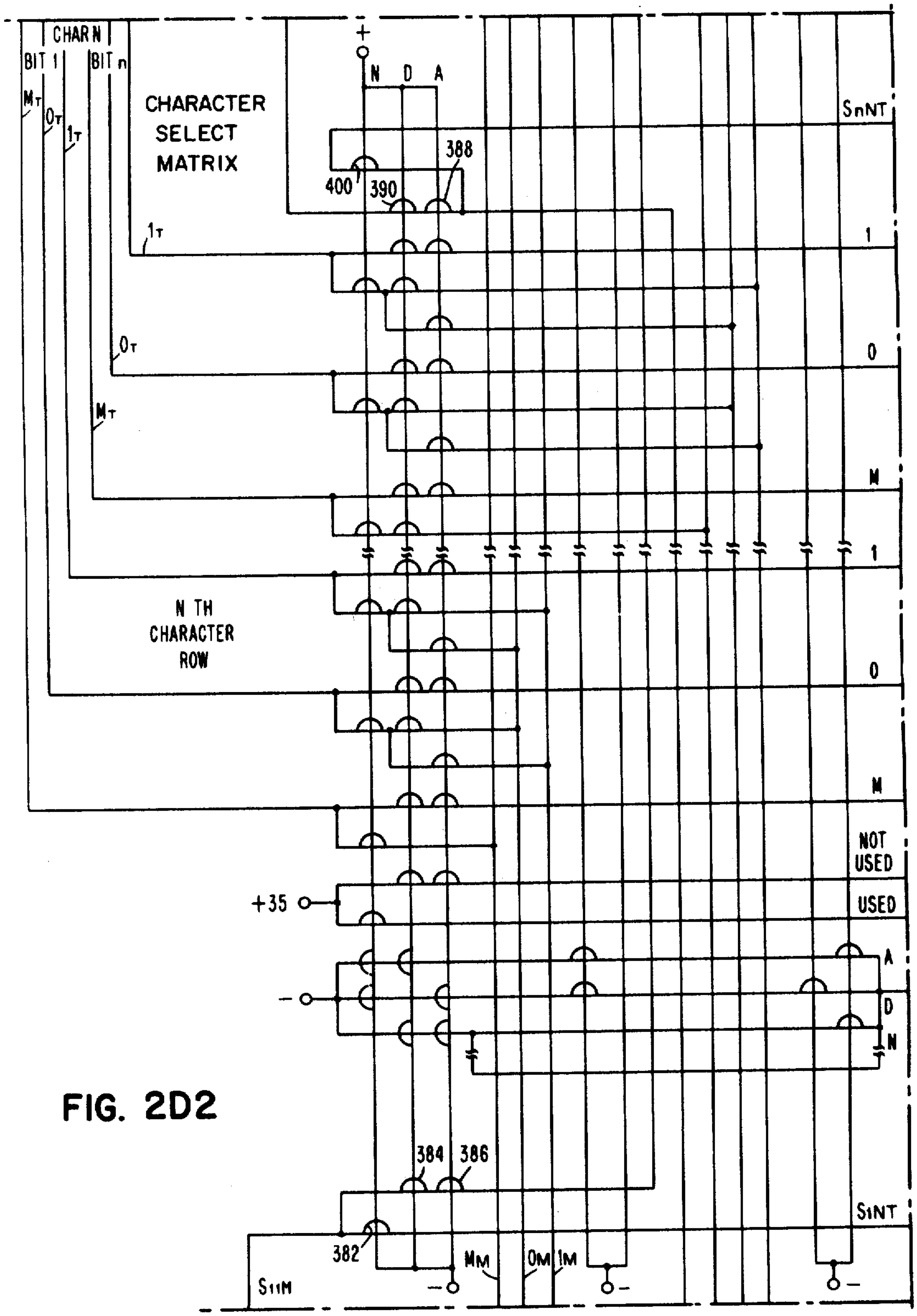
FIG. 2D2

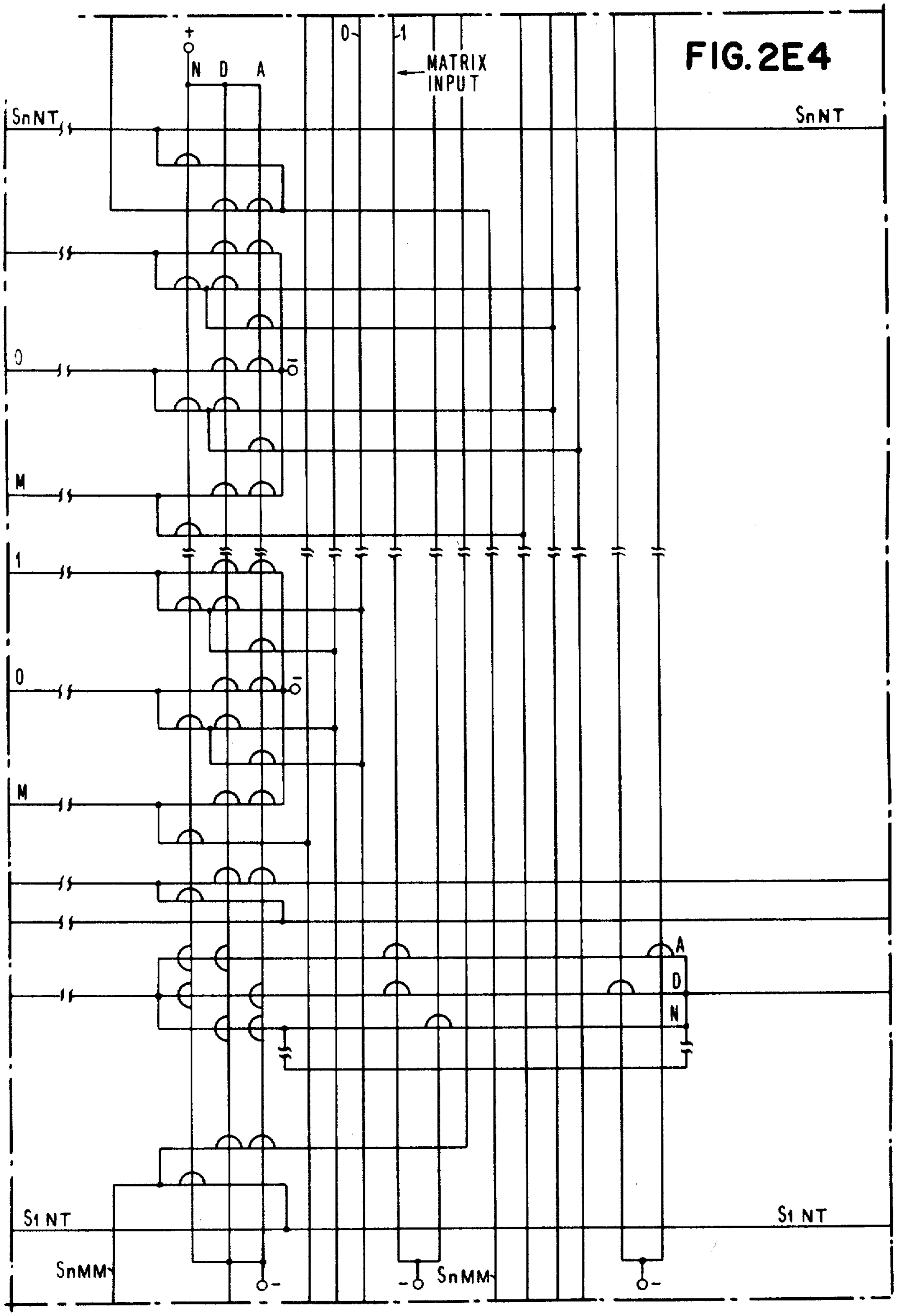
FIG. 2E4

FIG. 2E3
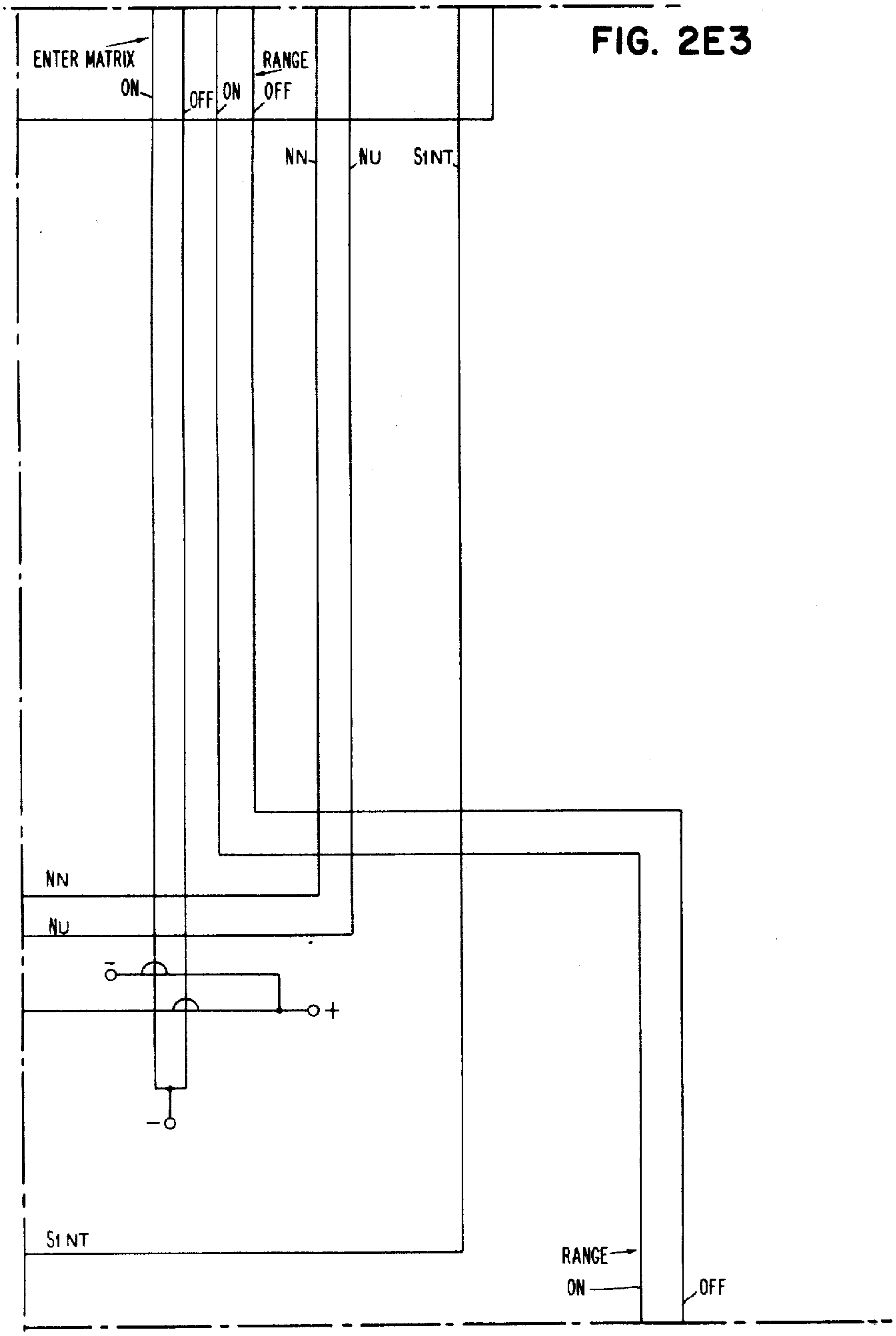

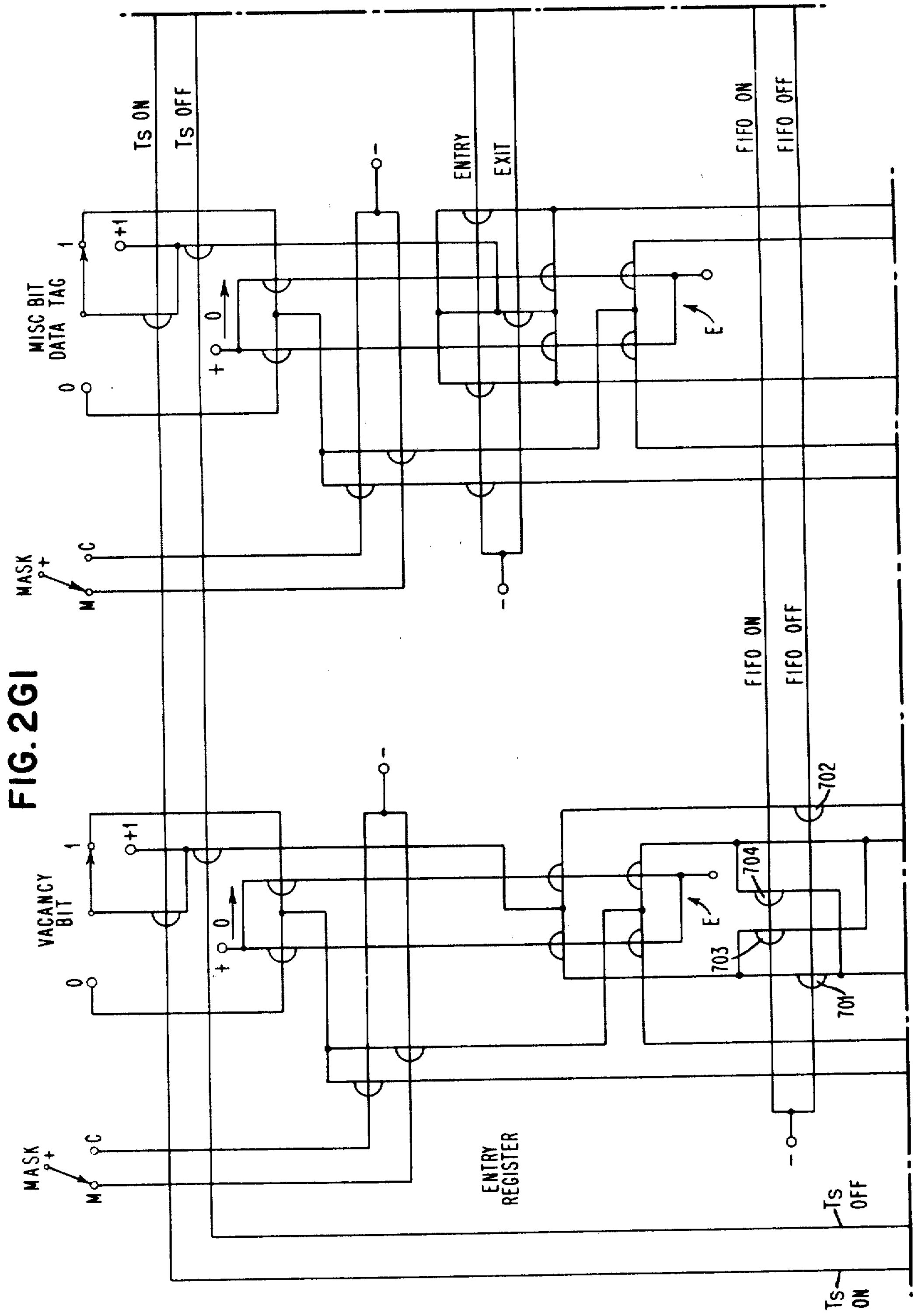
FIG. 2G1

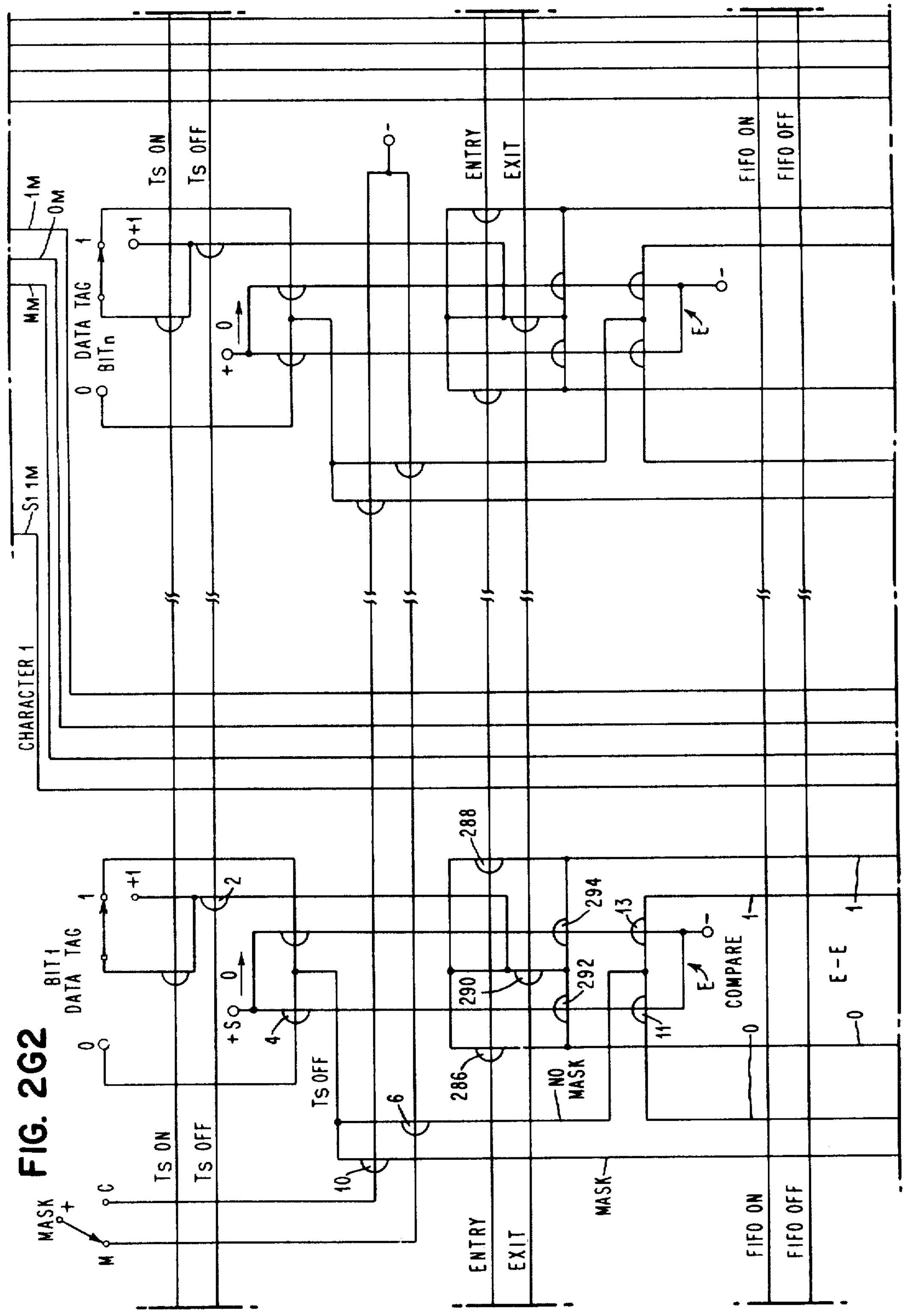
FIG. 2G2

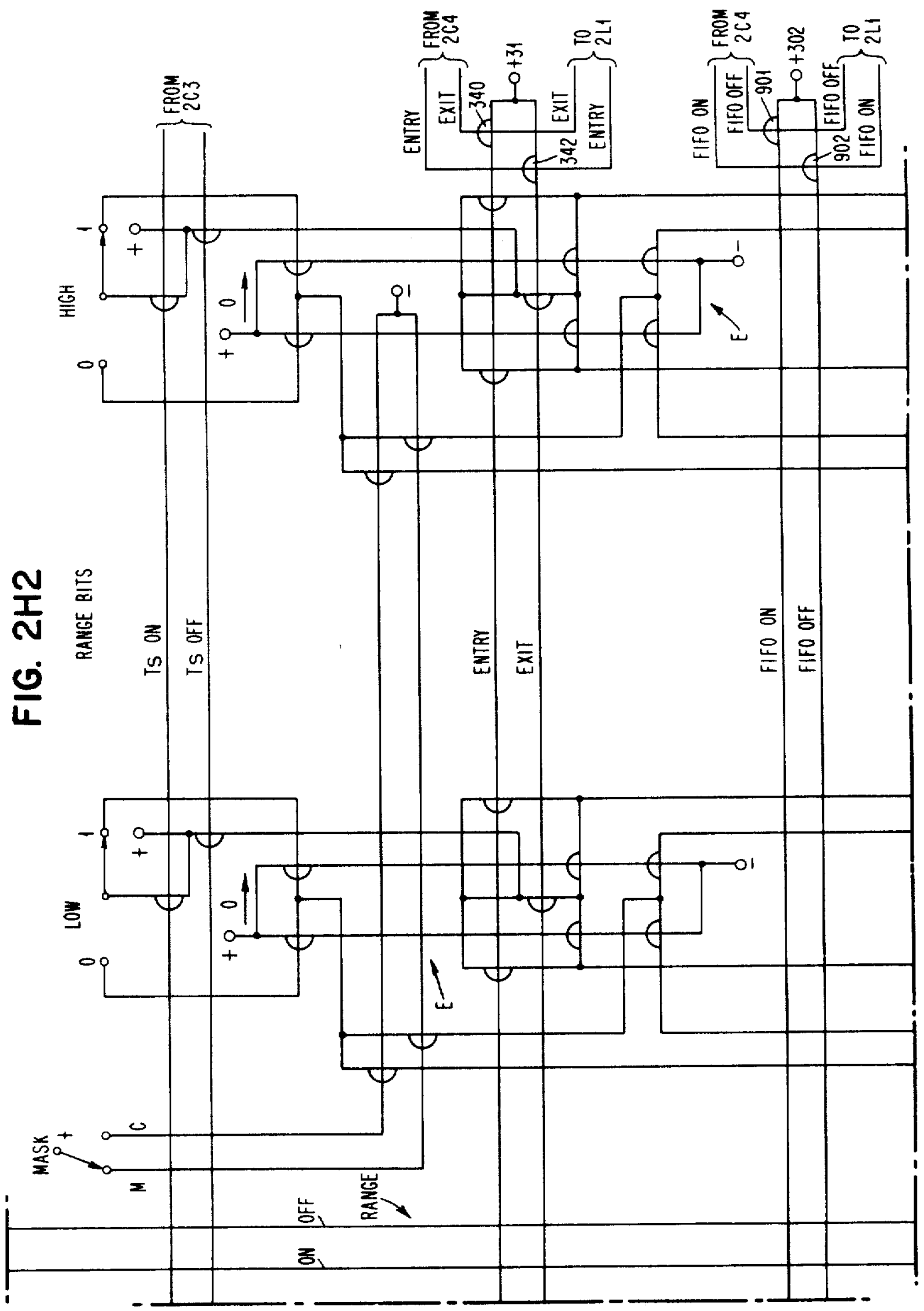
FIG. 2H2

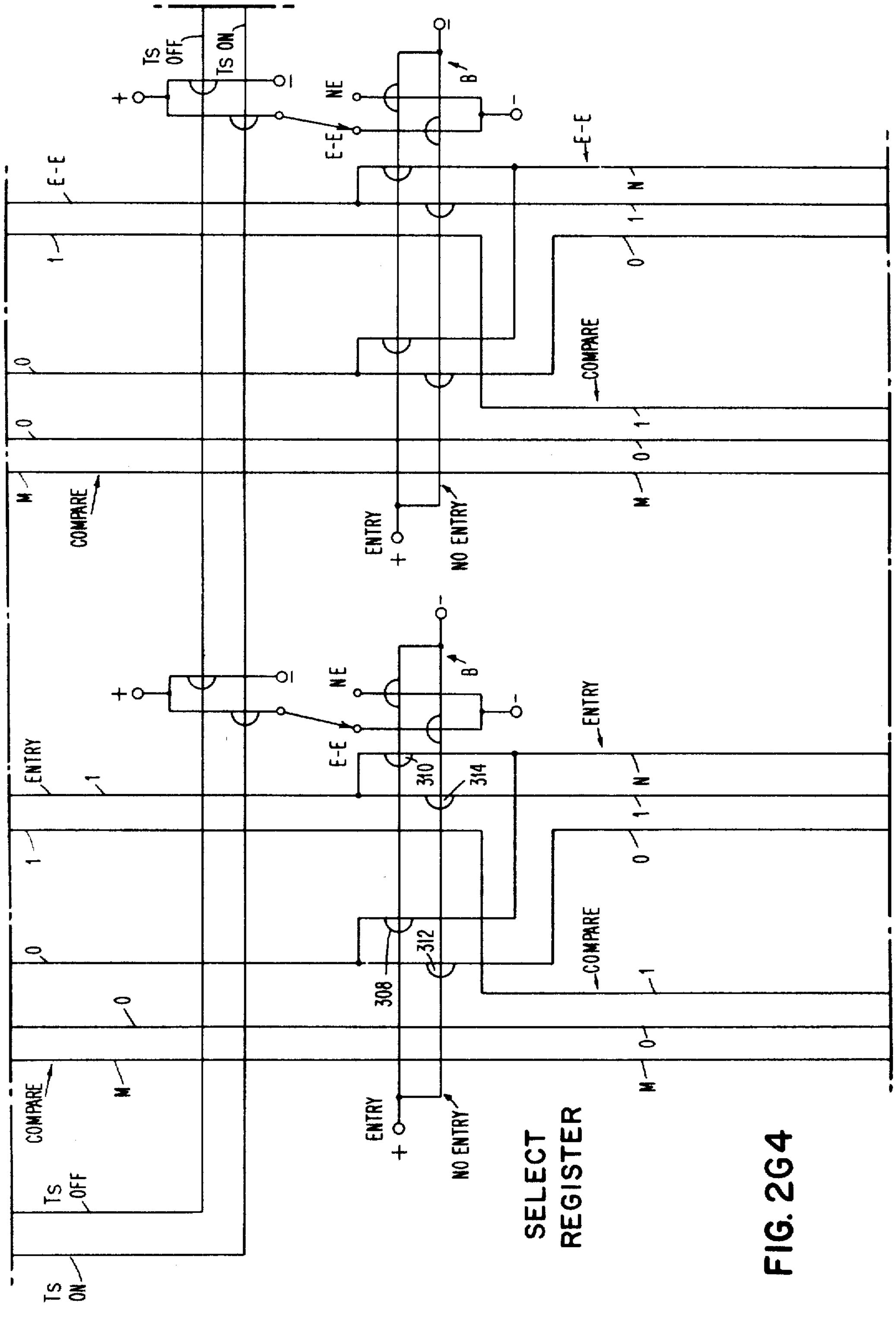
FIG. 2G4

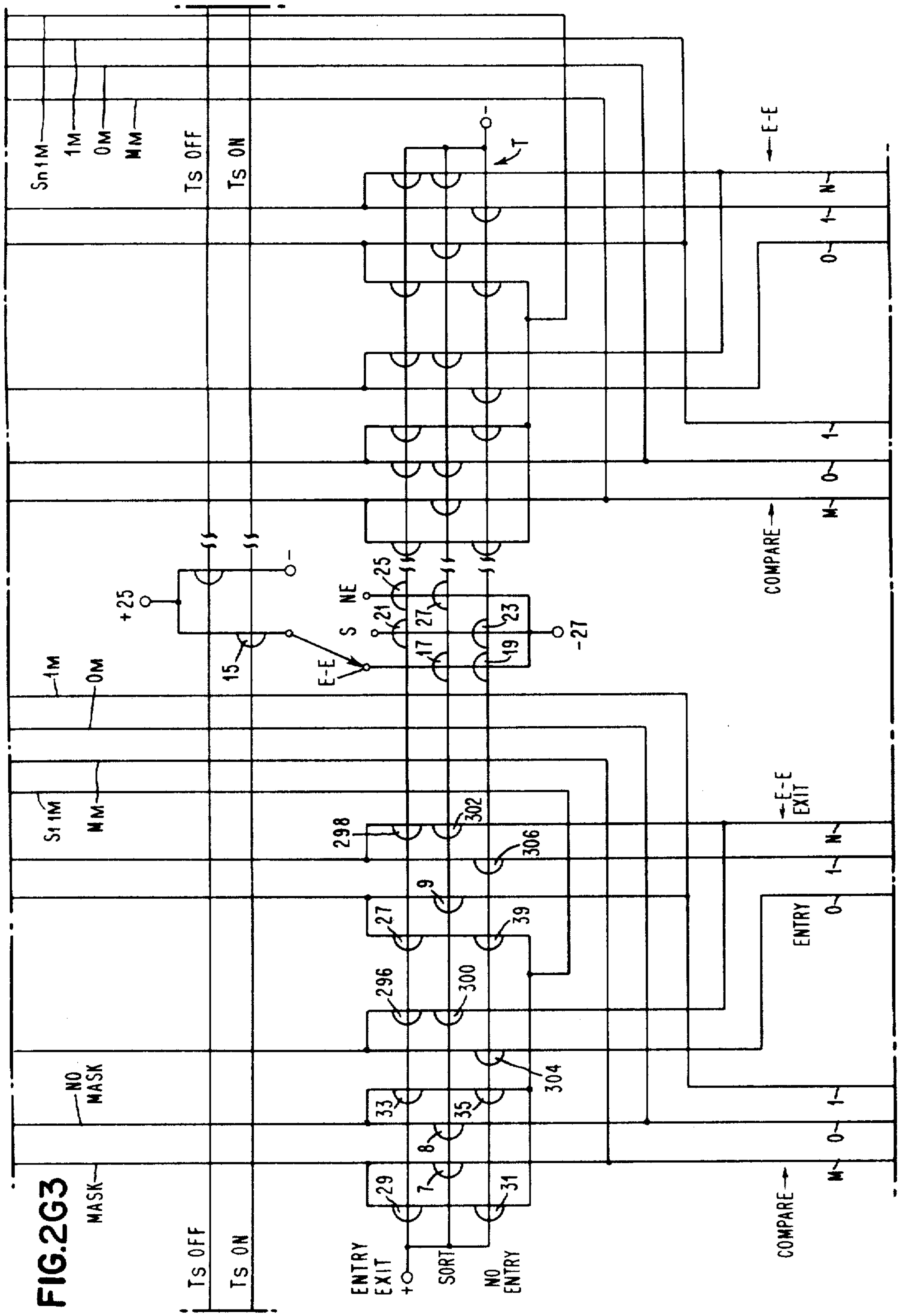
FIG.2G3

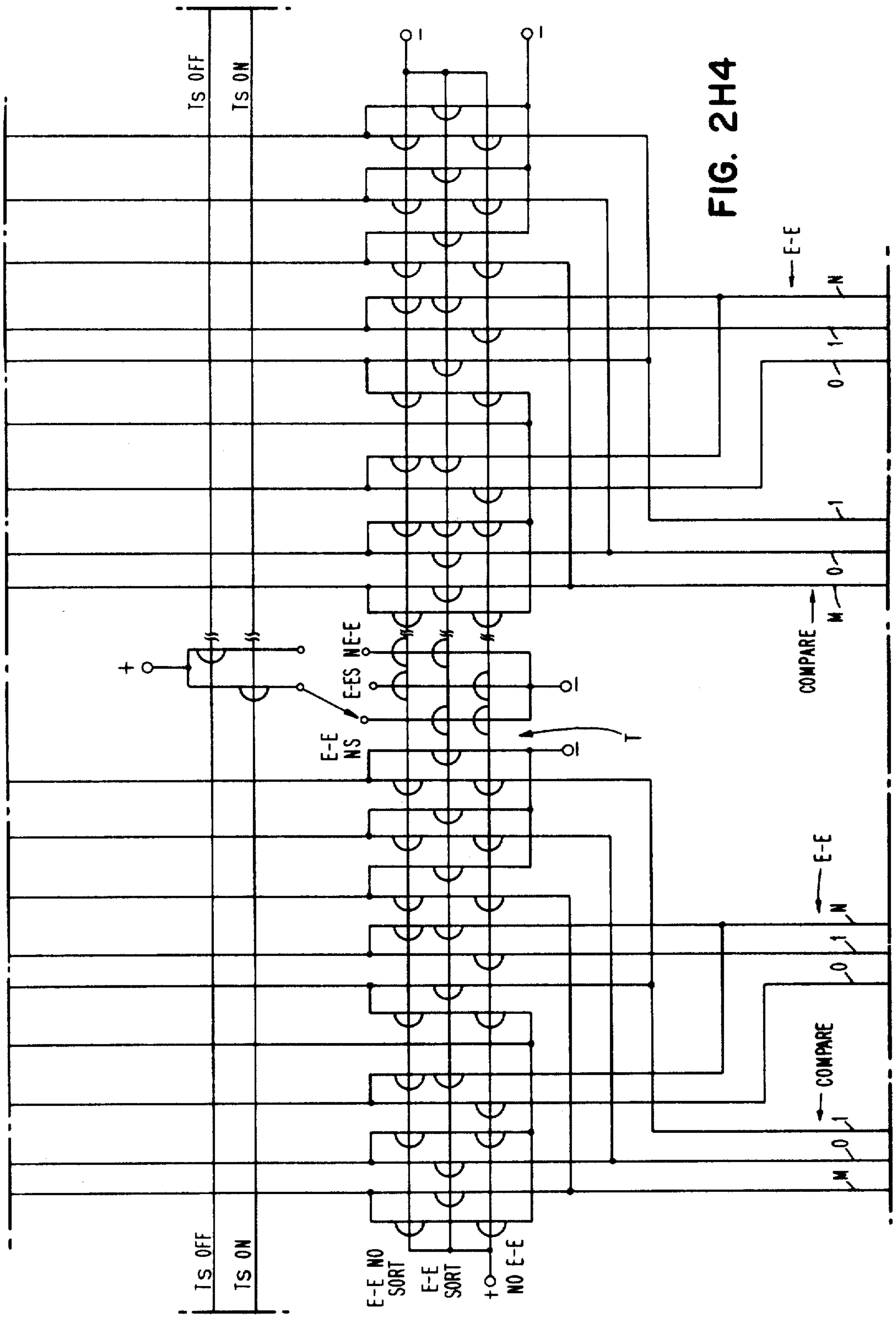
FIG. 2H4

FIG. 2H3
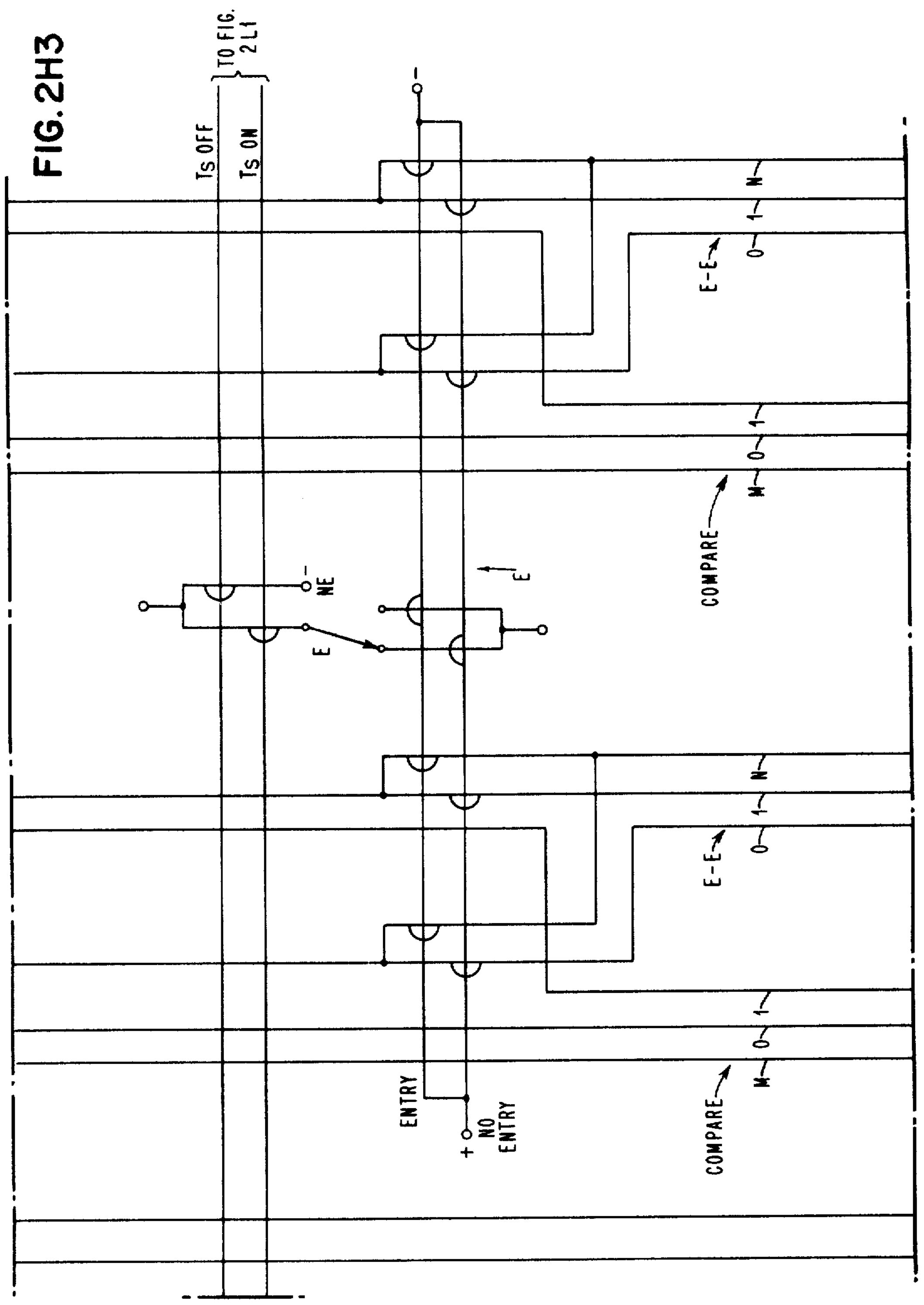

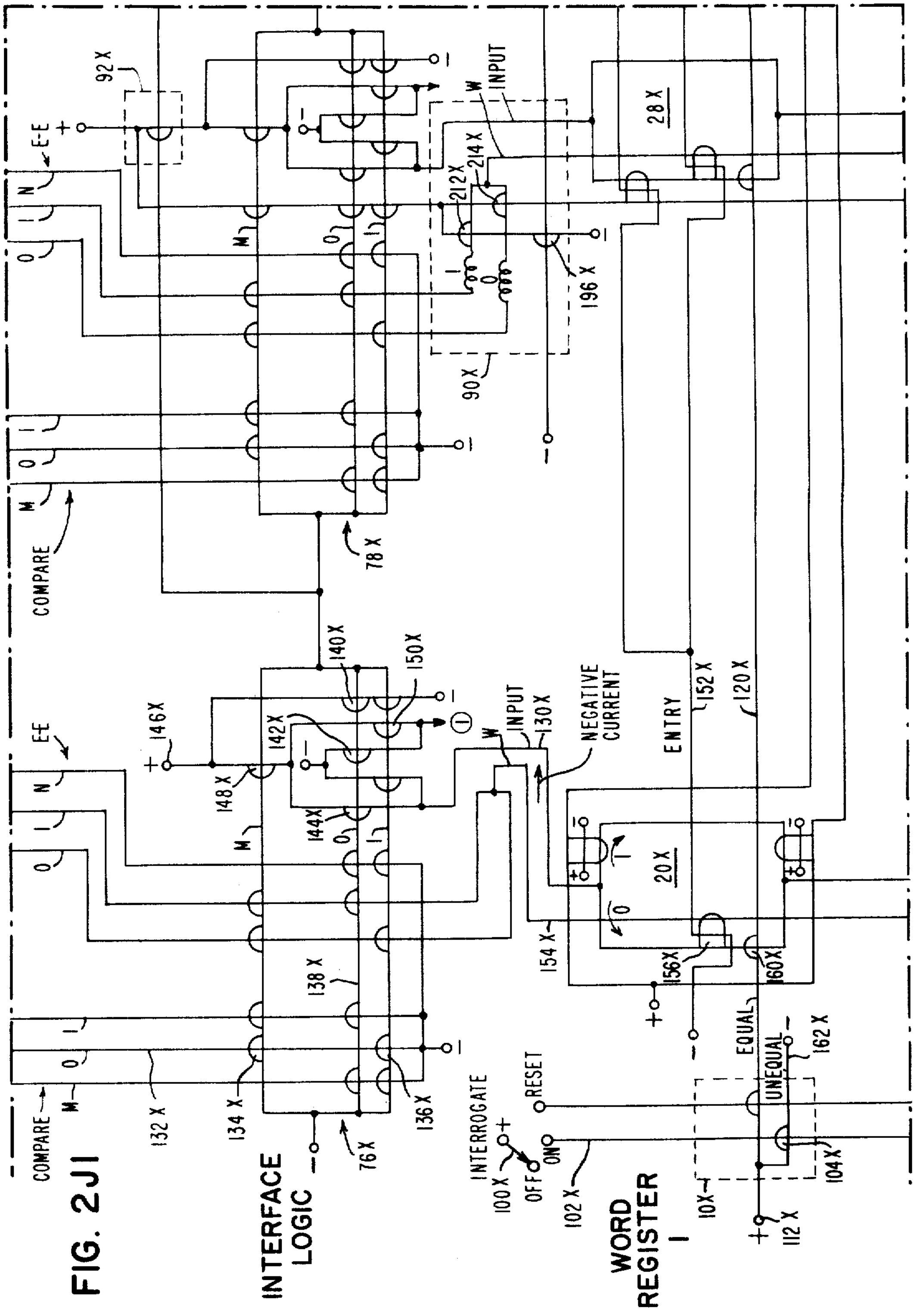
FIG. 2J1

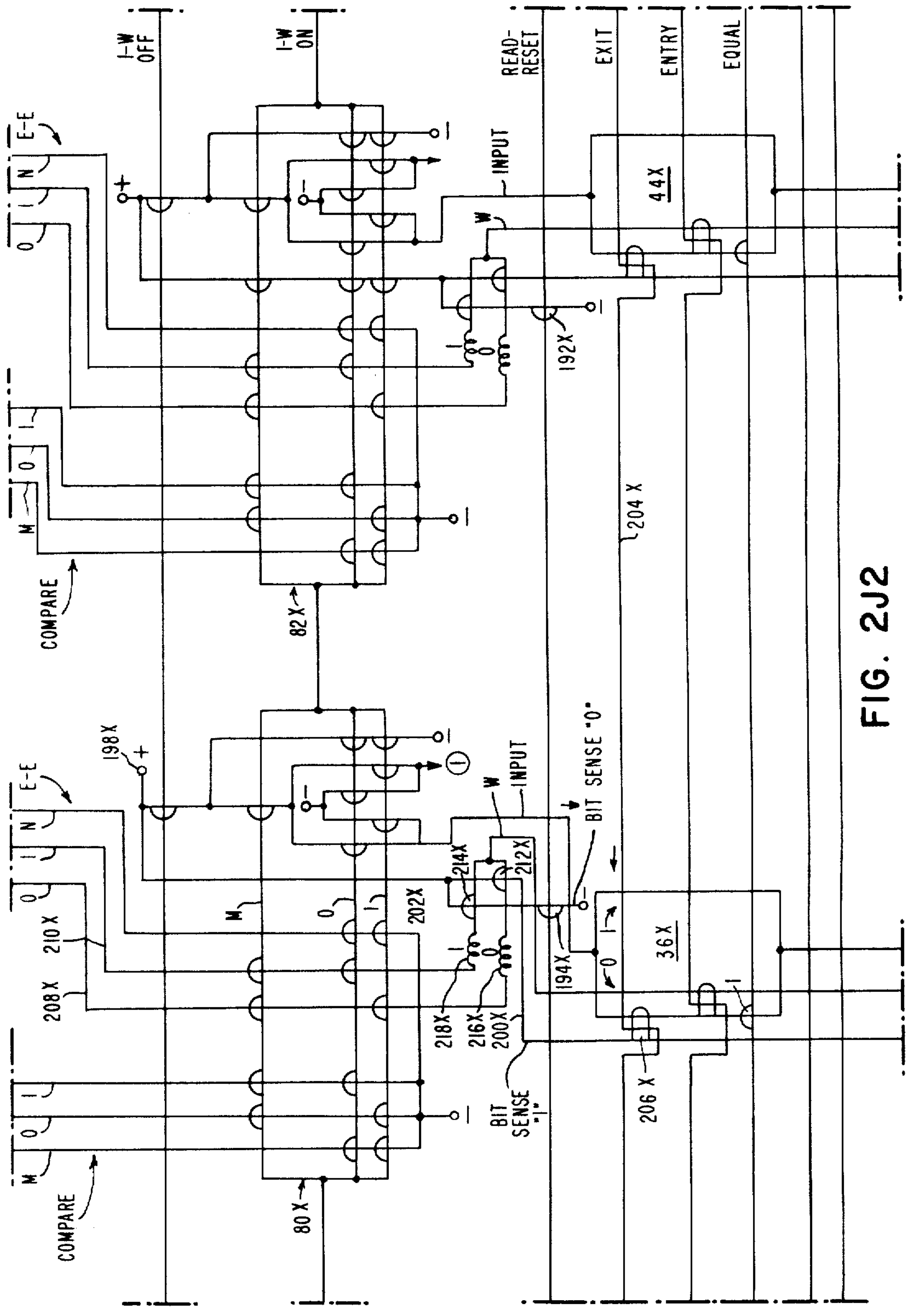
FIG. 2J2

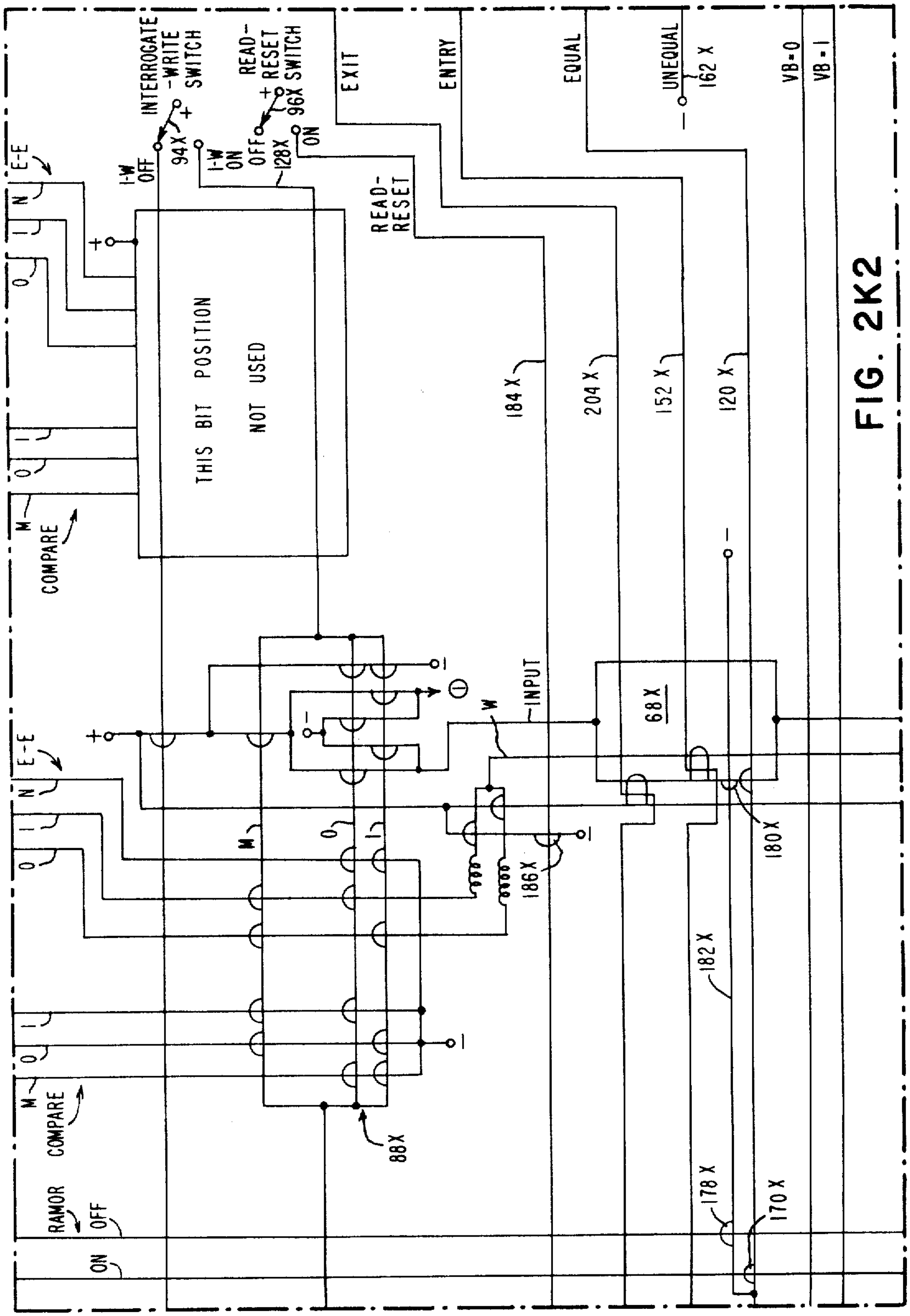
FIG. 2K2

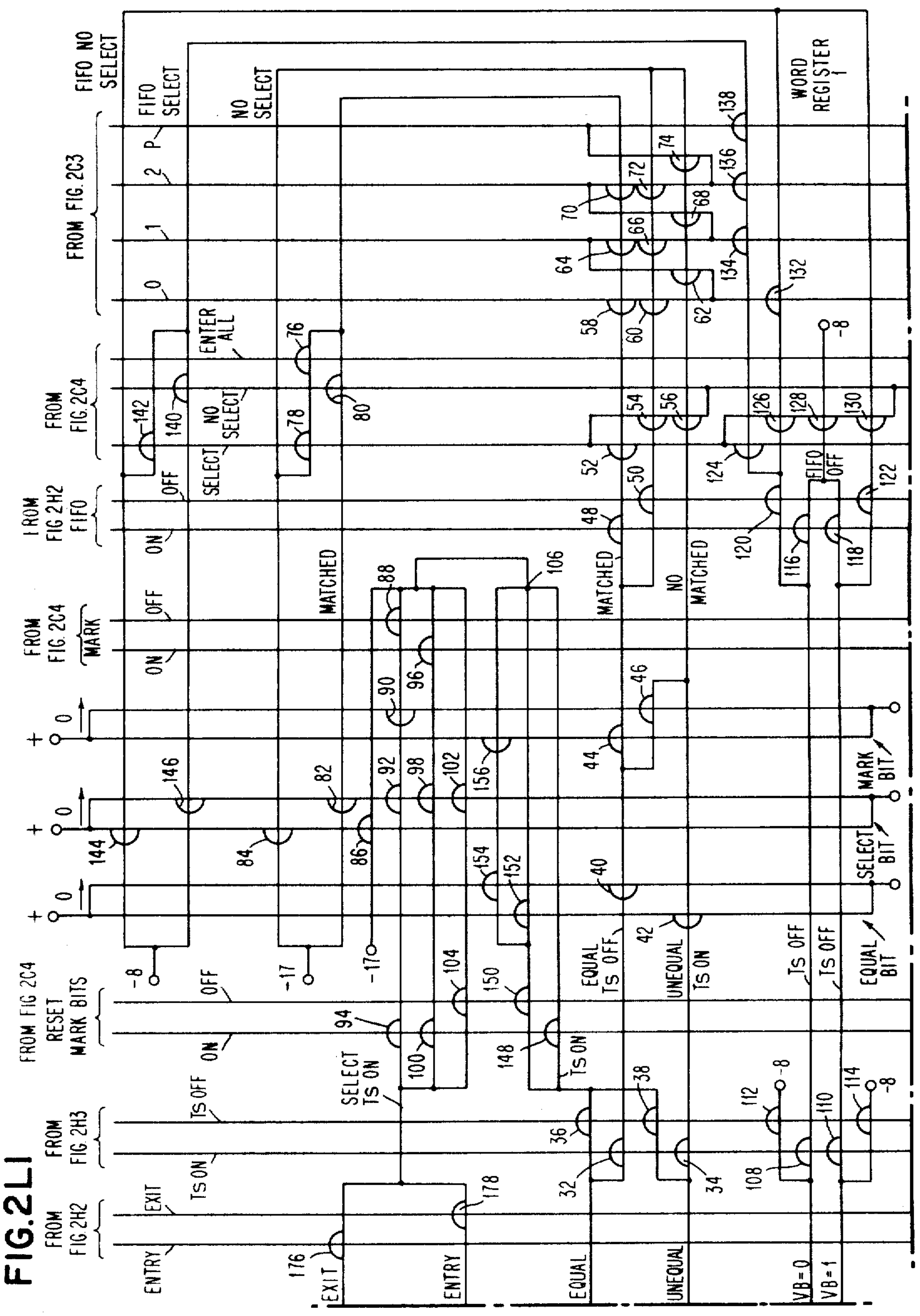
FIG.2L1

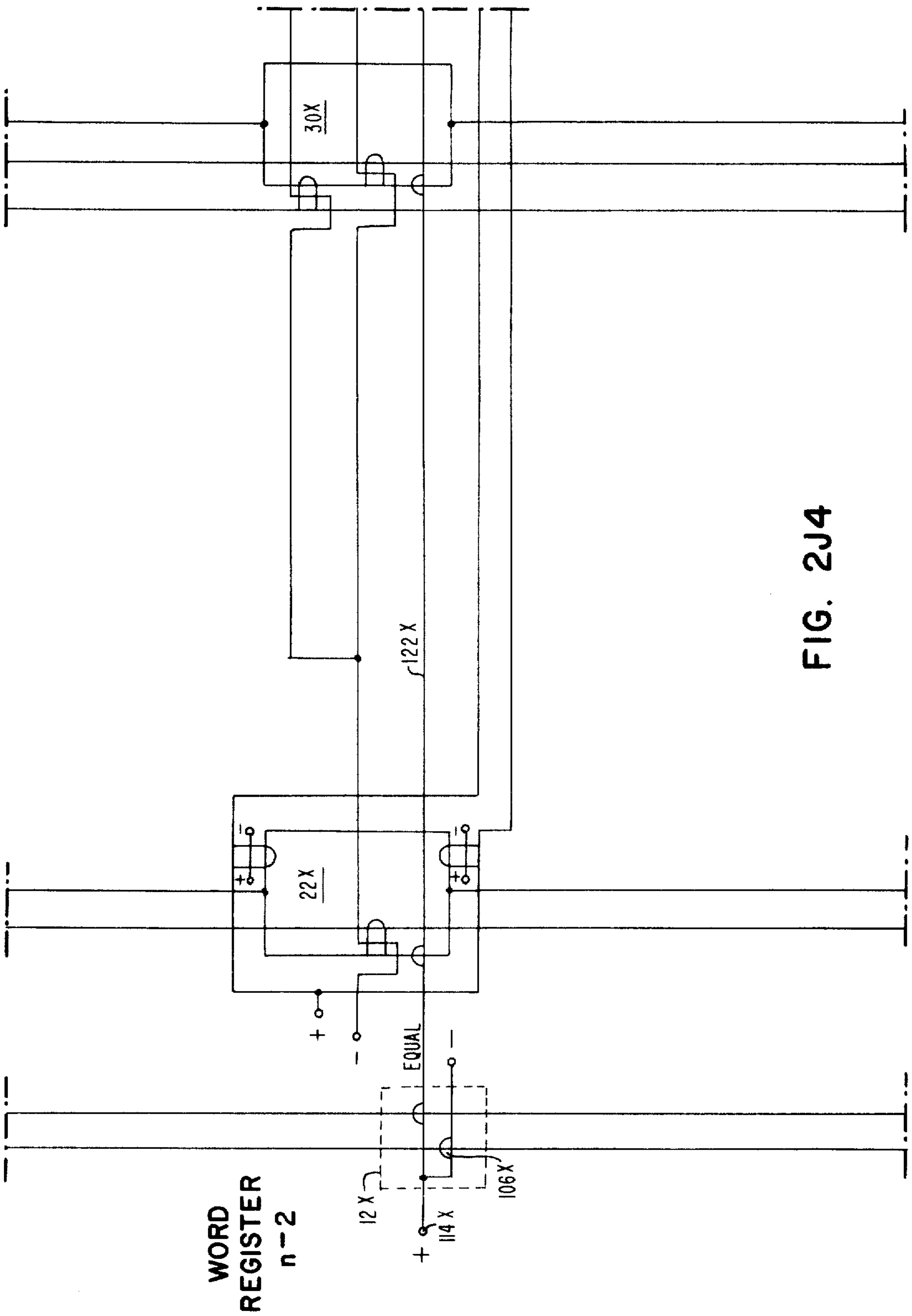
FIG. 2J4

FIG. 2J3
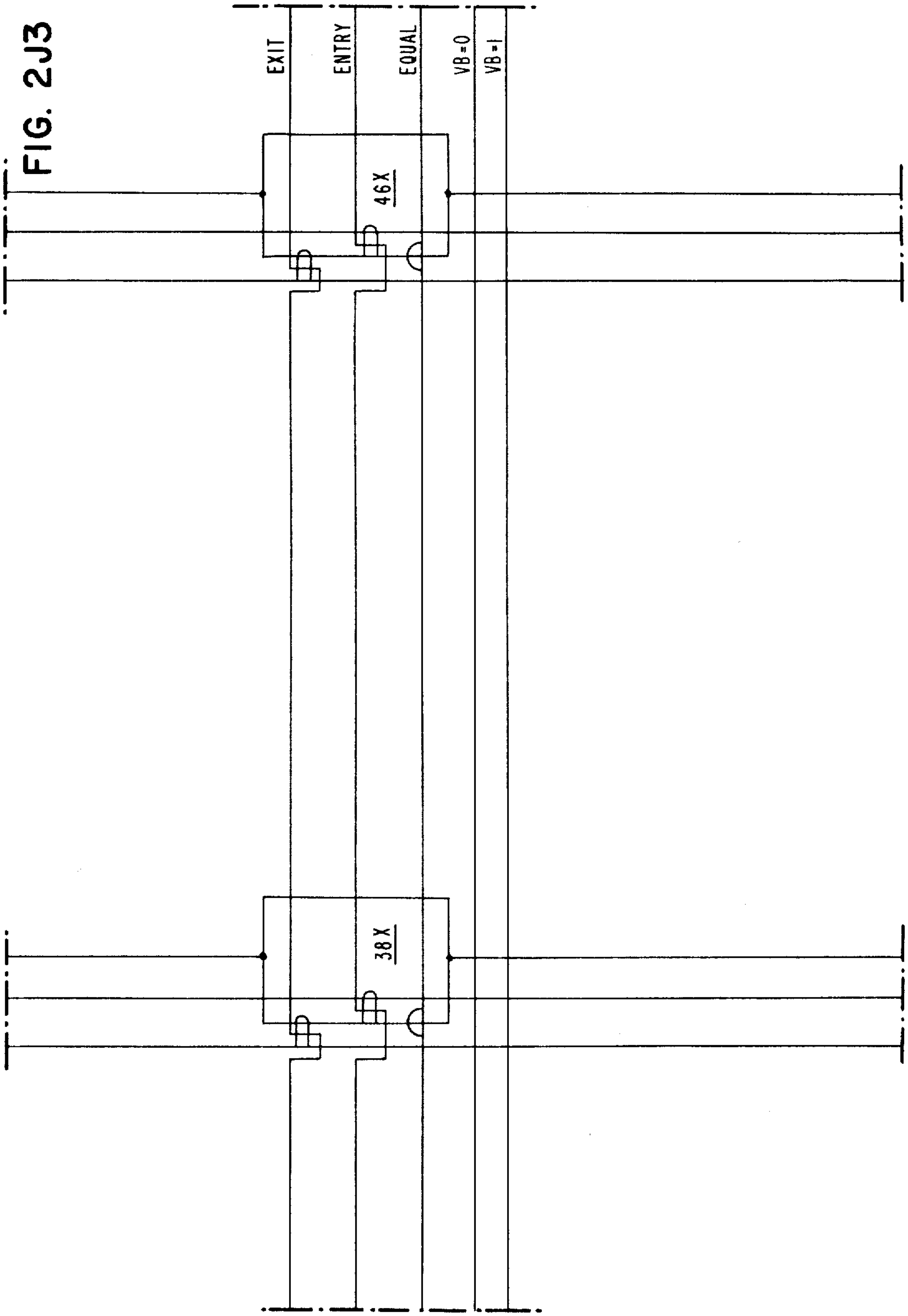

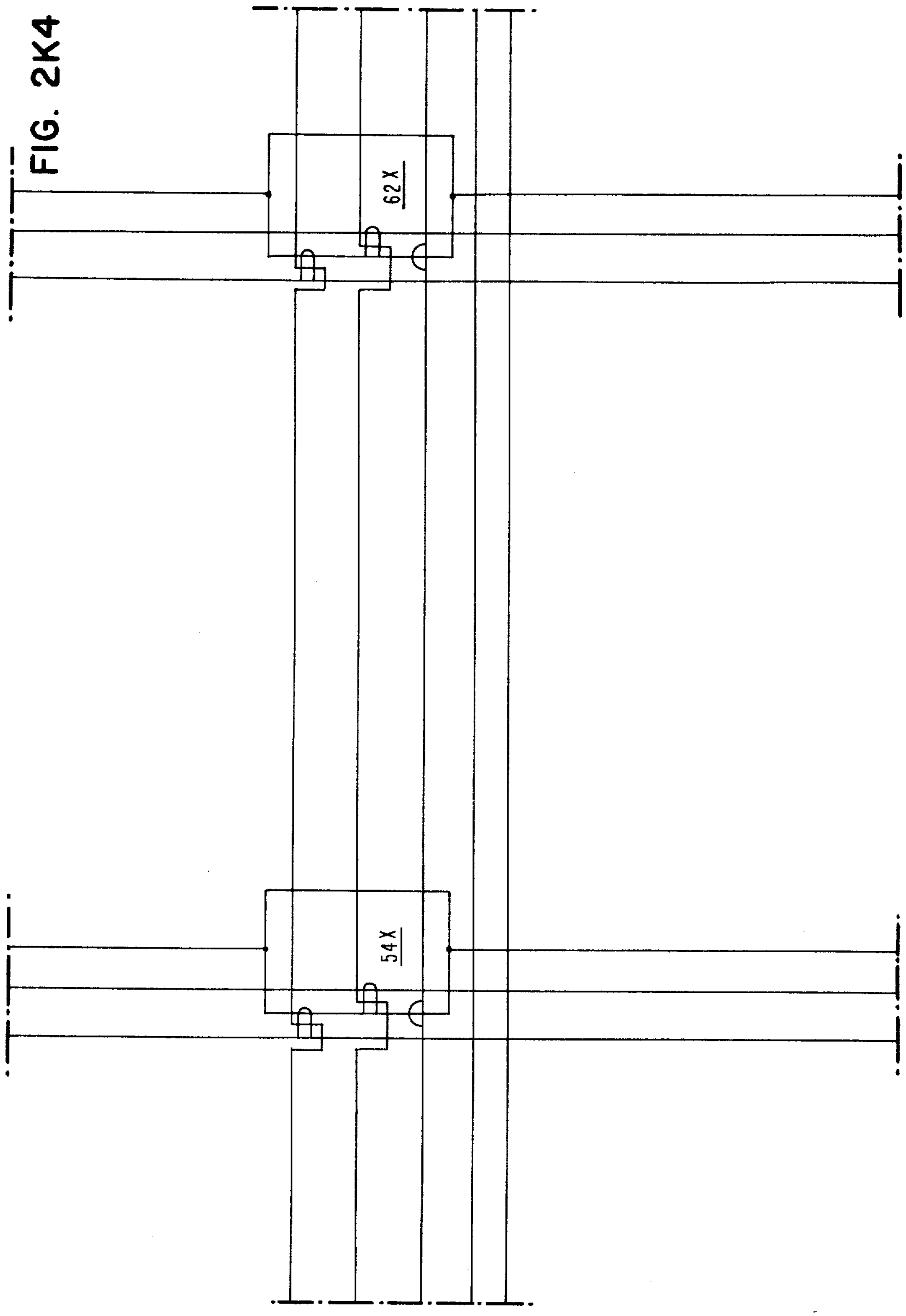
FIG. 2K4

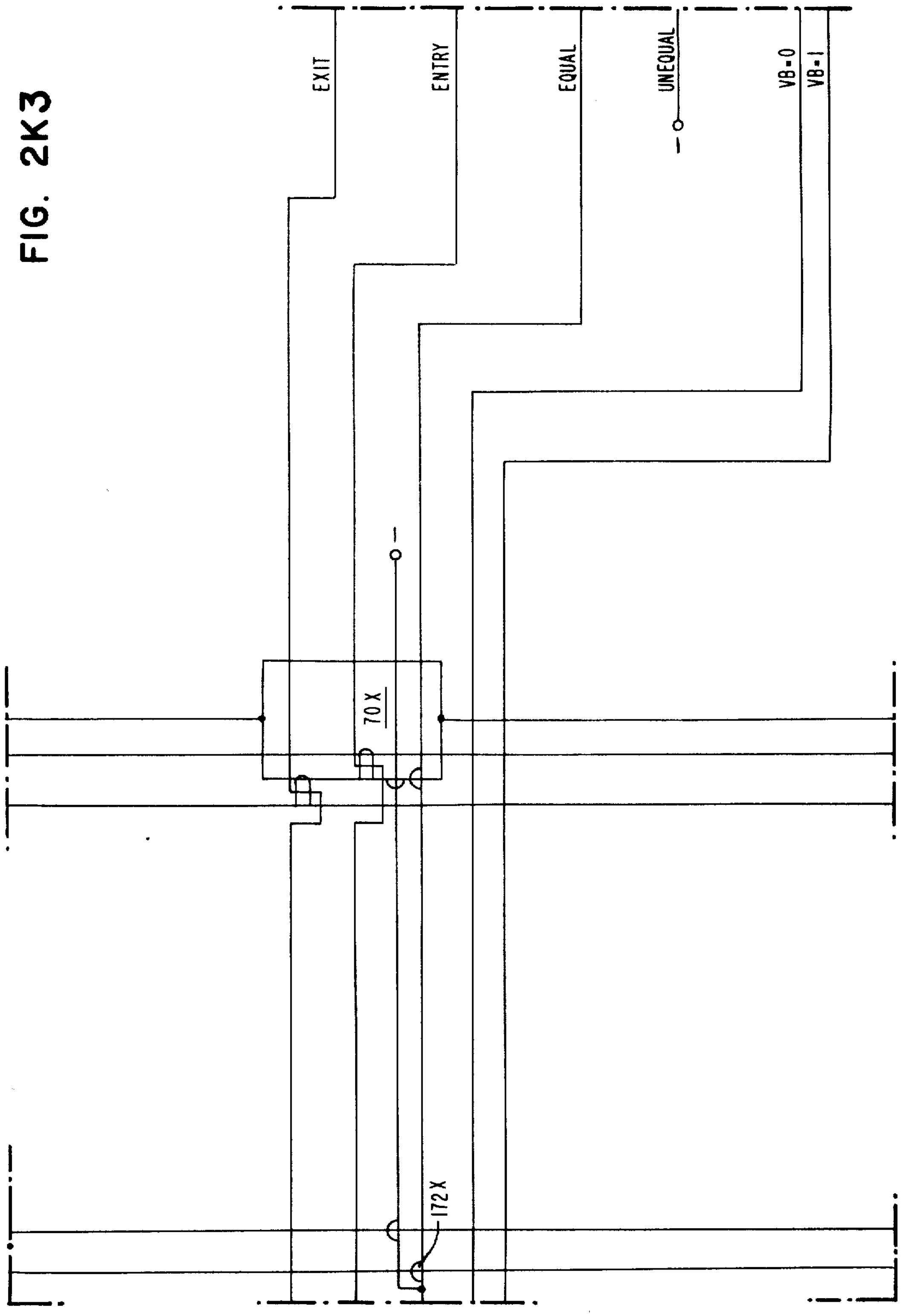
FIG. 2K3

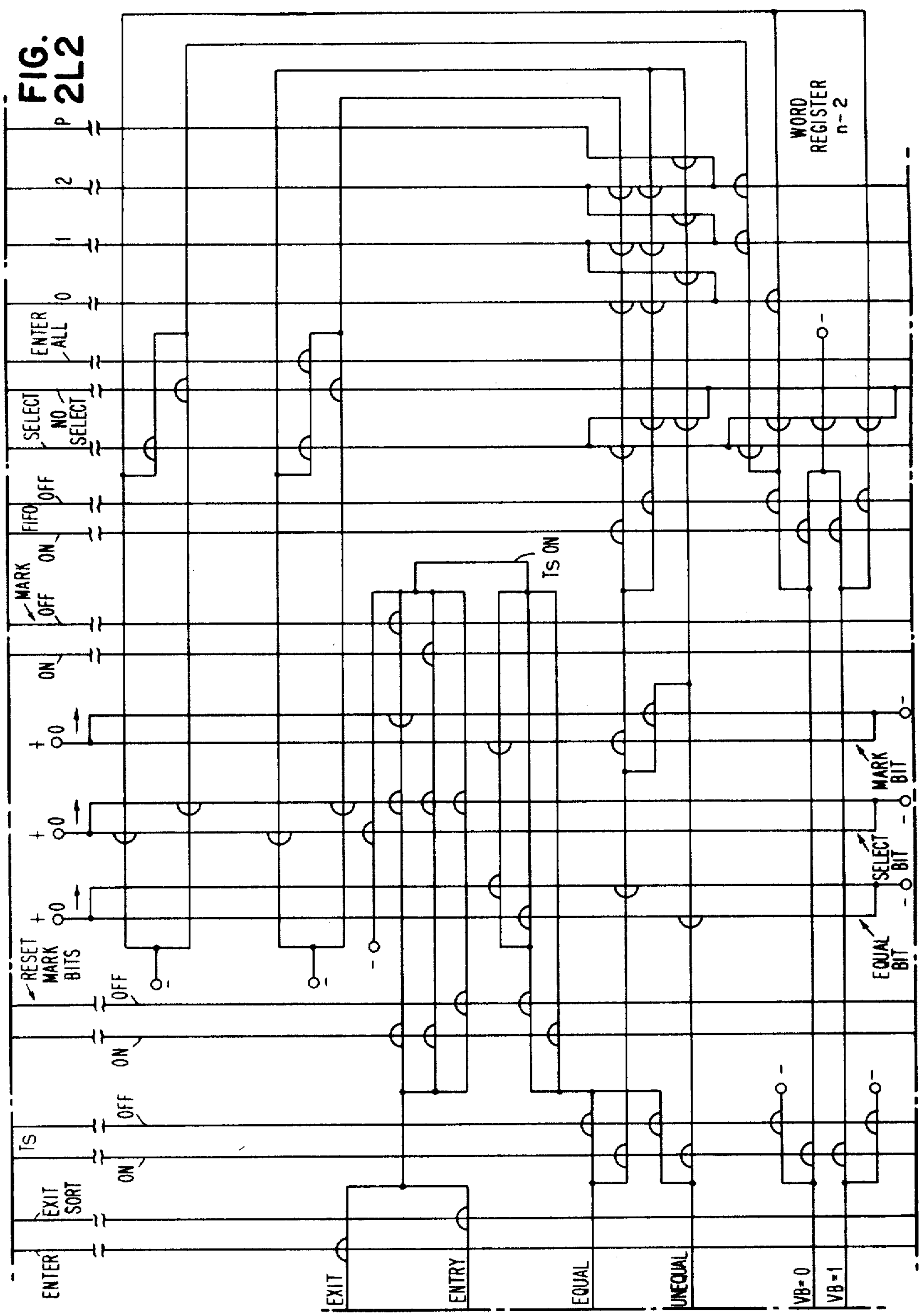
FIG. 2L2

FIG. 2M2
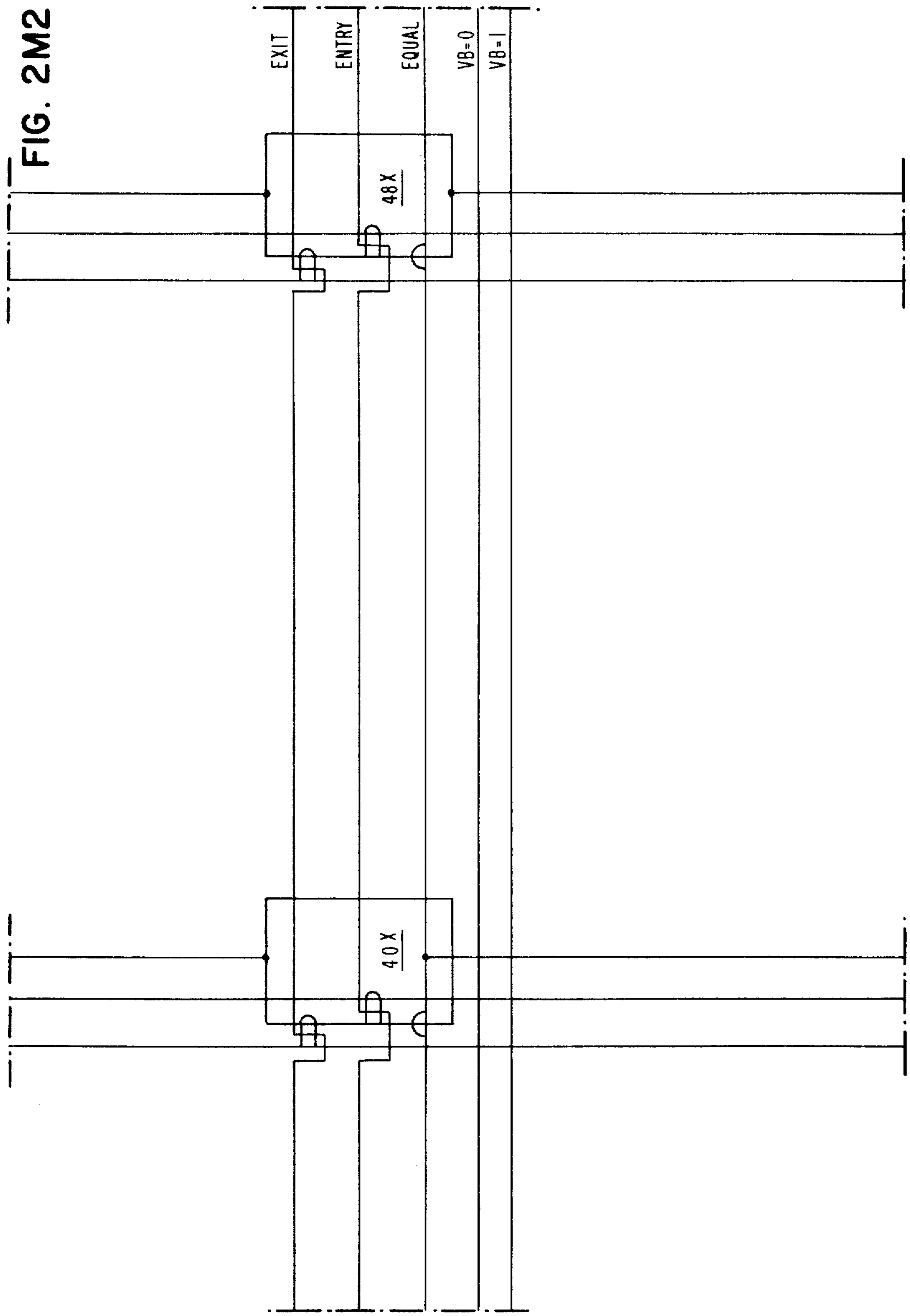

Feb. 25, 1969 R. R. SEEBER ET AL 3,430,205
RANGE ASSOCIATIVE MEMORY WITH ORDERED RETRIEVAL
Filed March 24, 1966 Sheet 41 of 53
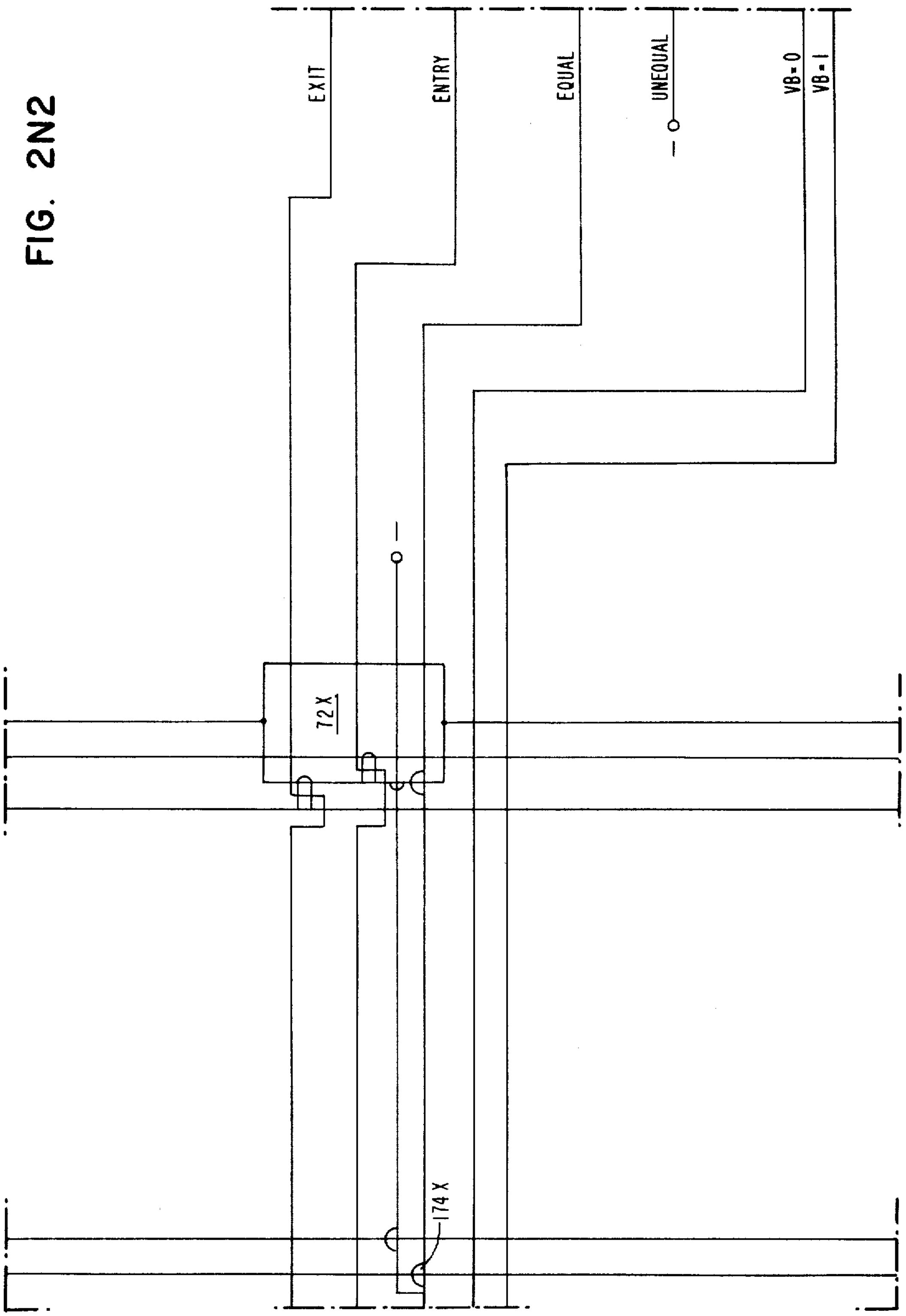
FIG. 2N2

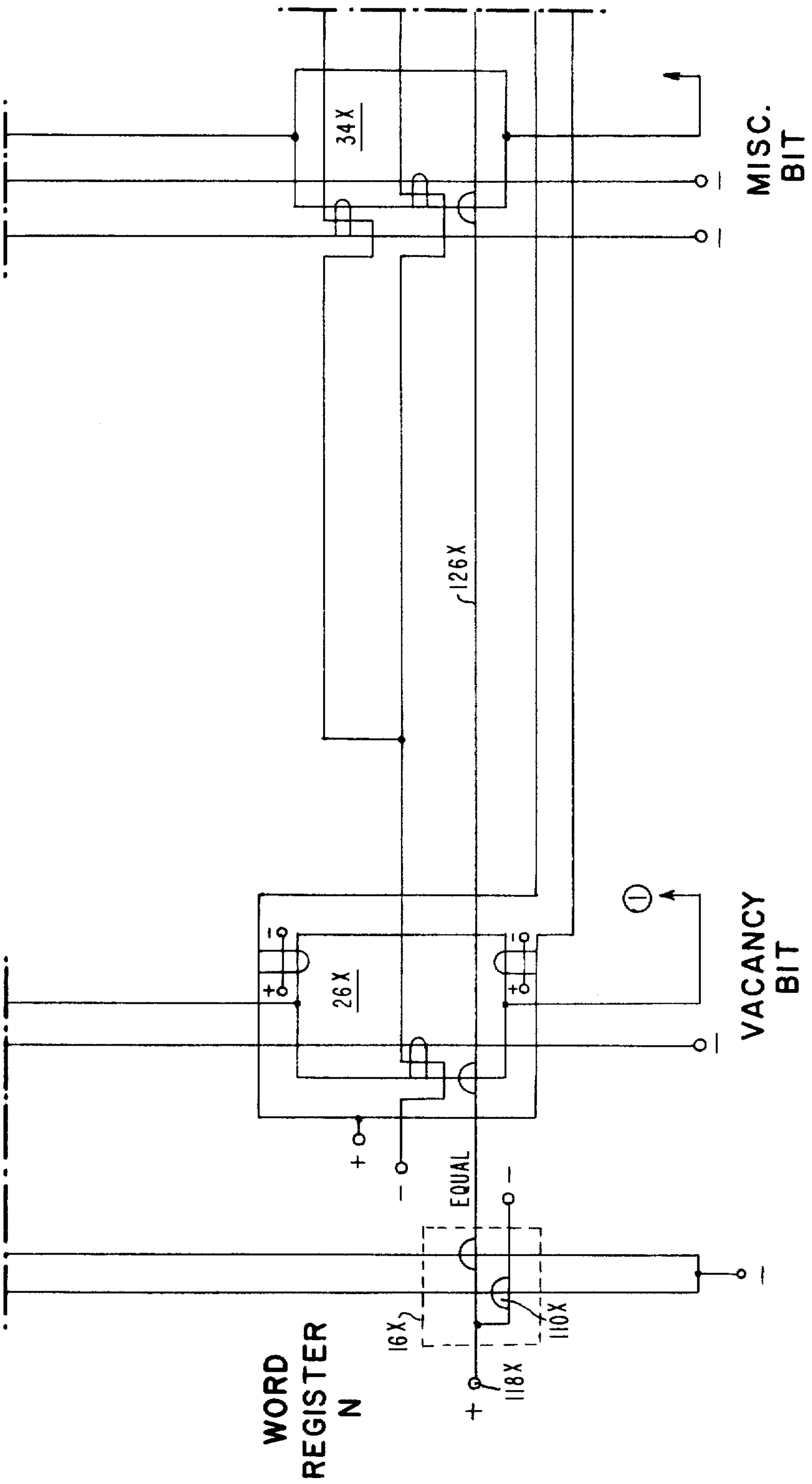
FIG. 2M4

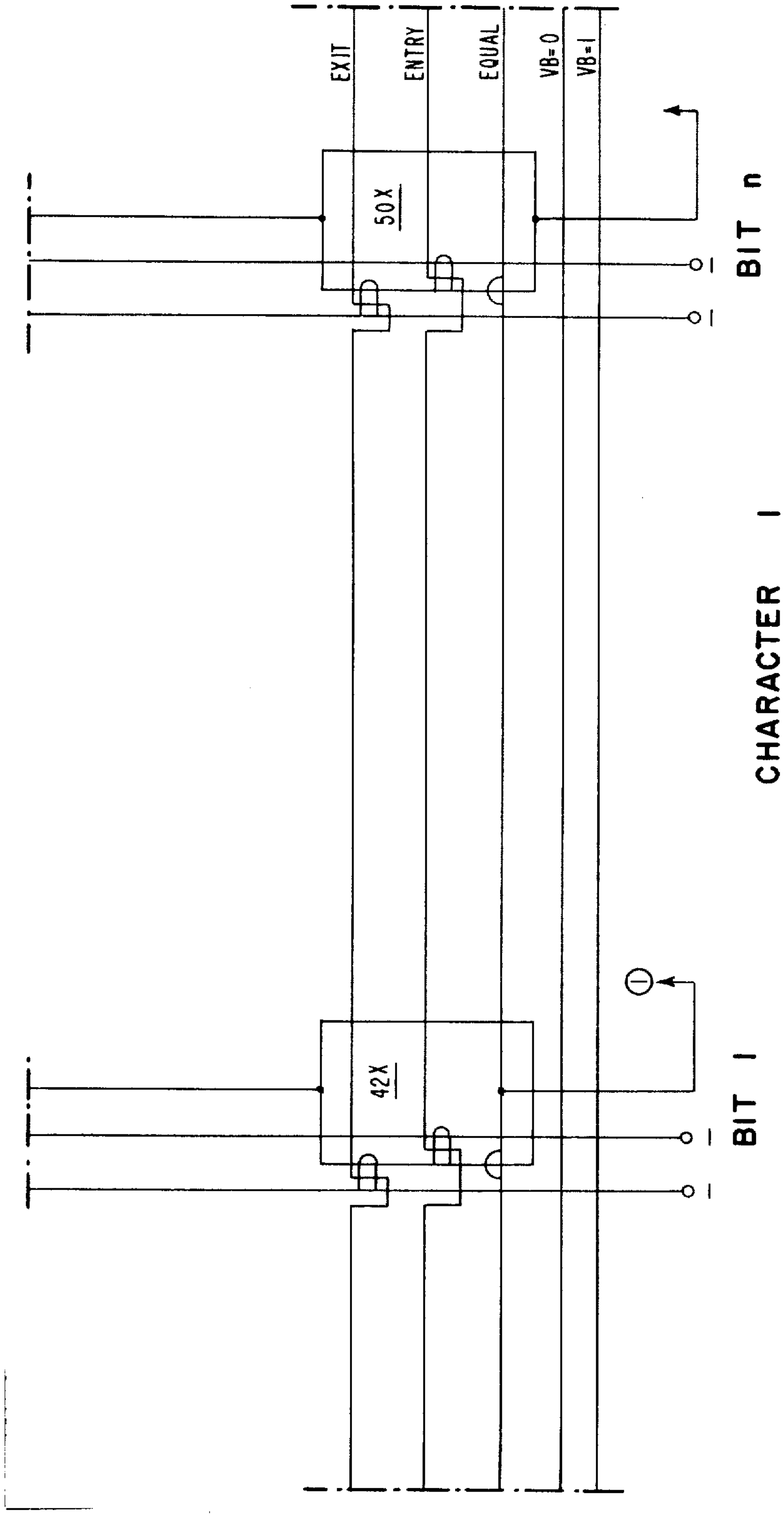
FIG. 2M3

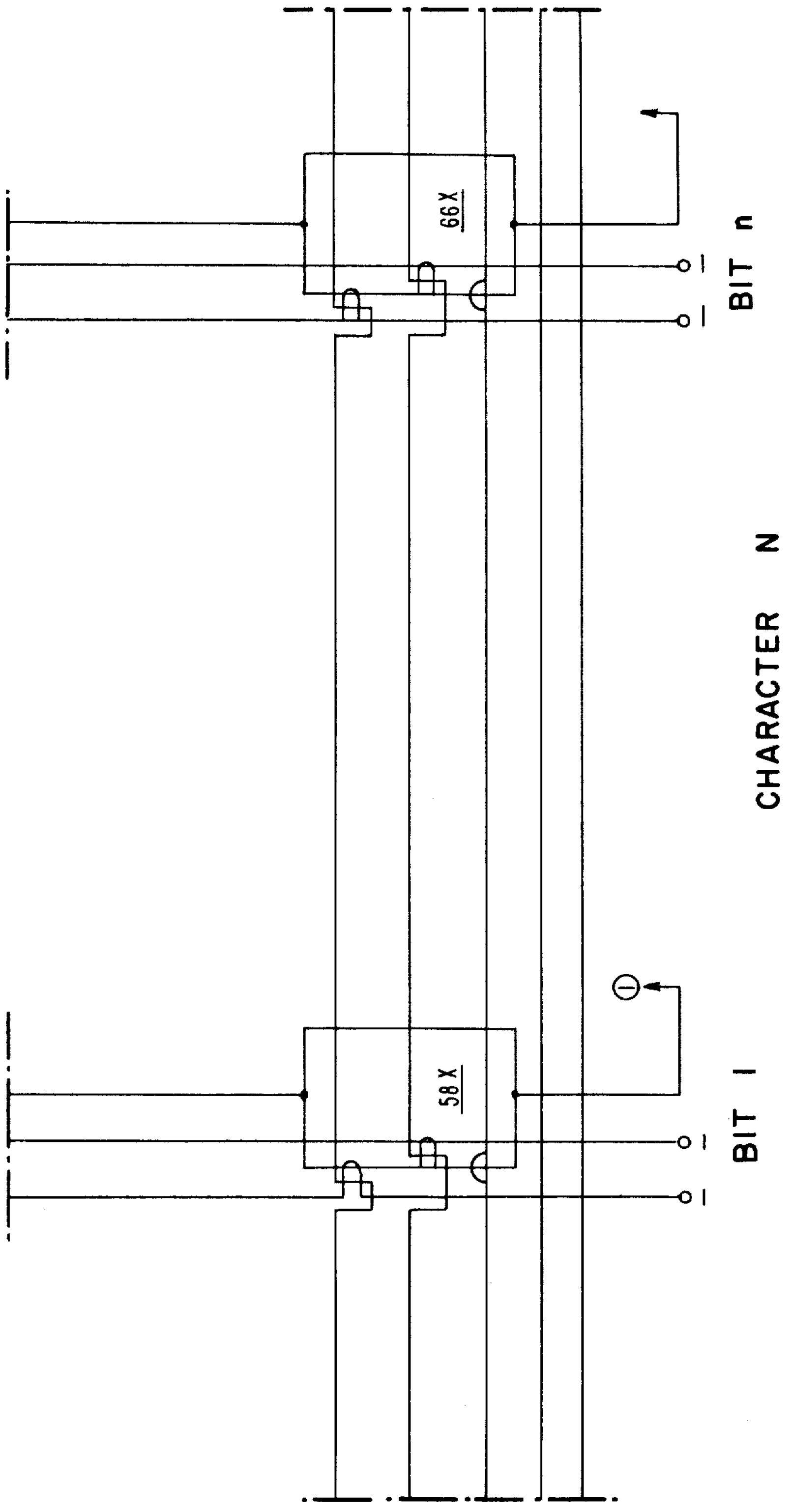
FIG. 2N4

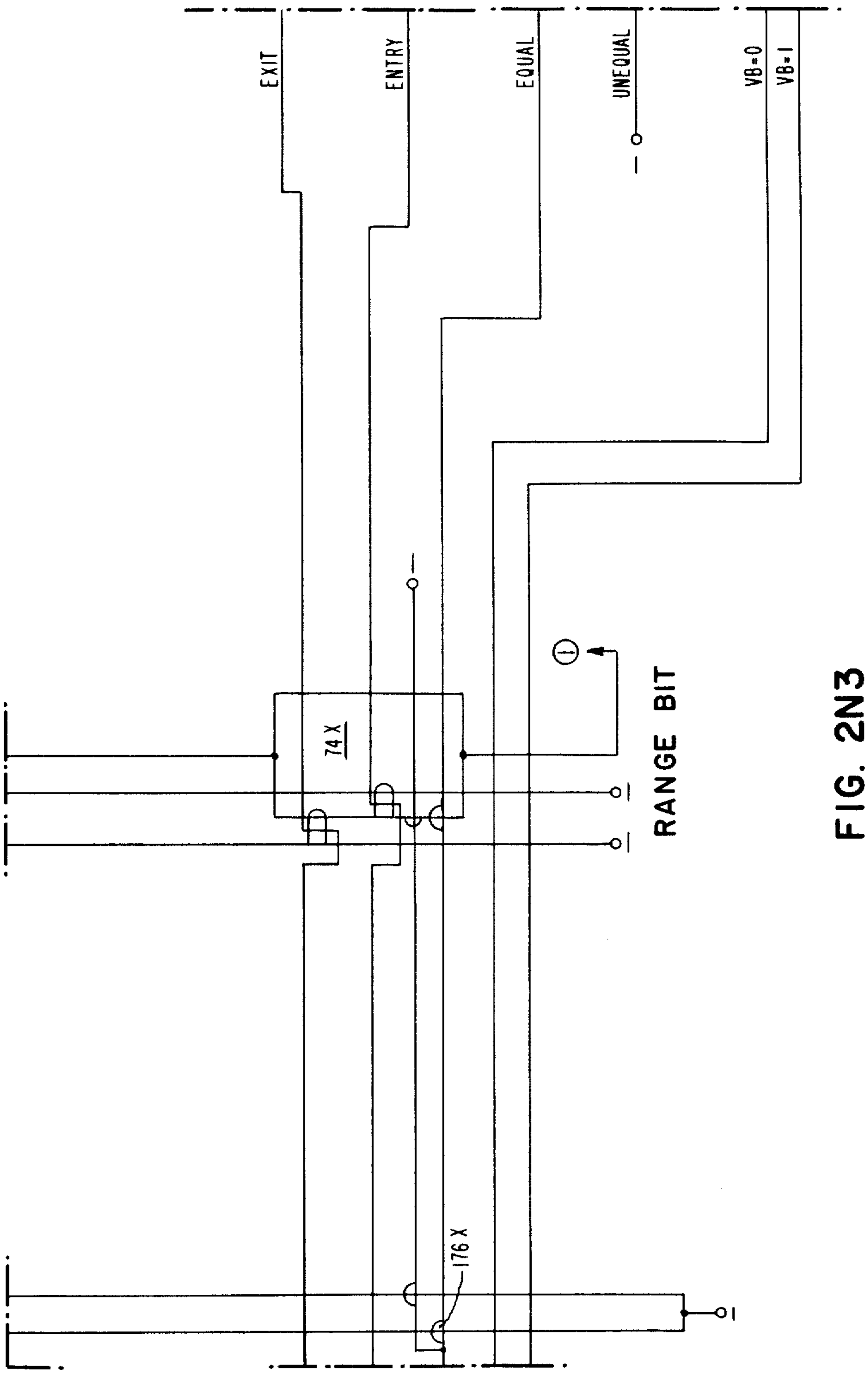
FIG. 2N3

RAMOR BIT CONTROL LOGIC

FIG. 8 RANGE BIT CONTROL

United States Patent Office 3,430,205
Patented Feb. 25, 1969

3,430,205
RANGE ASSOCIATIVE MEMORY WITH ORDERED RETRIEVAL

Robert R. Seeber and Arwin B. Lindquist, Poughkeepsie, N.Y., assignors to International Business Machines Corporation, Armonk, N.Y., a corporation of New York Filed Mar. 24, 1966, Ser. No. 537,141
U.S. Cl. 340—172.5 13 Claims
Int. Cl. G11b 13/00

ABSTRACT OF THE DISCLOSURE

An associative memory system in which the Range Retrieval feature is achieved by a simplified construction at the bit level, involving only an equal or unequal output. The associative memory system includes a plurality of word registers, each of which contains a plurality of bit positions, and in which a plurality of data words are randomly stored. All of the words in the word registers, a portion of whose content matches selected data in a predetermined range, are identified and words in their entirety may then be retrieved.

The Range Retrieval operation is performed by successively comparing the stored data with interrogating data that is applied in an ordered sequence so as to exclude the selected data in the desired predetermined range. In specific circuit implementation, by use of cryogenic or semiconductor technology, the arrangement in such that only a single Range Bit is required in each Word Register. All the Range Bits corresponding to the data words of interest are initially set to "1." Those Range Bits whose words have portions which match the values above and below the predetermined range are thereafter set to "0," leaving only those words whose portions do not match, i.e. are unequal to the interrogating data, with their Range Bits at "1."

This invention relates to memory systems in general, and more particularly to a fully associative memory system including sorting circuits and instructions supplied to such systems.

Memory systems can be classified by the manner in which selected discrete locations may be interrogated in order to perform read and write operations. Example of such memory systems include memory systems having addresses identified with the physical location of the unit of data and associative memory systems that include catalog and tag memories. One form of such memory systems having addresses identified with the physical location of the data is the coordinate address memory system in which groups of selection lines are arranged in such a manner that energization of particular lines in each group is effective to select a unique word location. Associative memory systems are those in which a unit of data, such as a word, is located and selected by specifying the information content of an arbitrary portion of its structure. Whether one retrieves or modifies such unit of data is determined by an appropriate instruction. The associative region may extend over the entire word or only a portion thereof. Catalog memory systems normally require manual intervention to change the contents of the memory and include means to indicate whether or not a particular word is contained within the memory system by comparing the information stored in each register with the information contained in the particular word. Provisions may be incorporated to read the word out of storage.

The sorting of data for processing is a recurring problem of major proportions, particularly in business data processing. The concept of an associative memory reduces the need for sorting. For example, when a binary search is employed in a table look-up operation, the data must be in sorted order so that the search may be made; however, with an associative memory, we may have direct access to items in a table by association without regard to the order in which they are stored, thus eliminating this need for sorting. There are still many places where sorting is necessary, however, particularly in preparing data for output. The associative memory proposed herewith, and to be described subsequently, applies to any sorting operation that involves a high-speed internal sort.

One embodiment chosen to illustrate the present invention employs a cryogenic memory and cryogenic switching circuits, but the principles of the invention can be carried out by means of other technologies. For example, by implementing the logic in a solid state semi-conductor technology, advantage may be taken of monolithic, integrated circuit techniques.

The present invention is closely related to a system entitled AMOR, which is an acronym for Associative Memory With Ordered Retrieval, previously described in a patent application, Ser. No. 163,233, now Patent 3,249,921, filed Dec. 29, 1961, in the name of Arwin B. Lindquist, one of the present inventors, and assigned to the same assignee as the present application. This previously-filed patent application described the AMOR system as eliminating the requirement of substantial additional hardware which is entailed when a conventional associative memory is modified such that the ordered sorting may be performed during the entering operation. The AMOR system, in contrast provides in addition to the circuits of a conventional associative memory only one relatively simple circuit extending throughout memory plus additional logic in the control circuits for such memory. An efficient algorism used with the AMOR system enables the locating of the lowest ranking word in memory, where the words may be in any random order and the sorting field may be selected at the time of sorting.

One of the most wanted features of an associative memory is the ability to retrieve all words whose tags fall between given limits, that is, Range Retrieval. One way of securing this is by providing, at the bit level, comparing circuits which give a high, equal, low output instead of just the equal, unequal output. Unfortunately, this complicates the bit structure considerably, perhaps by as much as a factor of two, with a consequent slowdown in overall speed of operation as well as an increase in the cost of the bit structure.

The present invention involves a highly sophisticated approach to the above-described problem. Unexpectedly, a way has been found to obtain the features of the high, equal, low comparison, but to retain a simple construction at the bit level where only the equal, unequal comparison is required. A modification of the AMOR algorism and the AMOR controls accomplishes this rather surprising result.

Before proceeding with a description of the system and particularly of the novel Range Retrieval aspects of the present invention, it is considered well, first, to review briefly the predecessor AMOR system and to indicate those general features which are incorporated into the system of the present invention.

With an associative memory, one may retrieve randomly stored words in order by using a counter to establish the interrogating tag. For example, if ninety employees have employee numbers consisting of two decimal digits and we wish to retrieve their records in employee-number order, we can start by retrieving employee number 00, then 01, 02 . . . 99. On ten of these retrieval tries, no retrieval will be made since only ninety of the codes have been used. But by advancing a counter a unit at a time, we have, in this case, a highly efficient ordered retrieval, since for 100 retrieval tries, we have succeeded in ninety cases. But if our sorting key was such that we had a non-dense set to be sorted, our efficiency would be quite different. For example, a ten-digit part number might be used where there were only a thousand part numbers. Employing the above method would require $10^{10}$ retrieval tries for $10^3$ successful retrievals.

For non-dense keys we need a more efficient algorism that will permit us to find the lowest-ranking key without examining all possible combinations. Consider how the human brain approaches the problem of sorting the following four keys.

```
2 6 3 4 5
4 6 9 2 1
8 6 4 7 1
4 7 5 2 7
```

By looking only at the first digit, we could complete our sort except for the second and fourth keys which both begin with 4. In these two cases we need look at only one more digit to determine their correct order. Thus the sort can be completed without any reference to many of the right hand digits. The following shows this separation into the digits used for the sort, to the left of the line, and those not used.

```
2 | 6 3 4 5
4 6 | 9 2 1
8 | 6 4 7 1
4 7 | 5 2 7
```

The AMOR algorism works on a very similar basis, working on the binary bits of the key. Starting with the leftmost bit, an interrogation is made, associatively separating the words in memory into those that match and do not match an interrogating zero in that single bit position. If there is more than one match, we must analyze the matching words further to the right to the point where, usually, there is but a single match. Having retrieved the lowest-ranking word, we can then proceed to the next higher word in much the same fashion.

What is contemplated, then, by the AMOR system is an implementation of an algorism for use with an associative memory. By circuitry to be described hereinafter, a set of randomly ordered words is retieved in order by some non-preassigned key. This is in contrast to the operation of table look-up where usually the words are in order and we desire to retrieve only one of them.

Before we get into the automatic ordered retrieval properties of AMOR, it is desirable to discuss the salient features of the associative portion and to indicate how they differ from other such memories. Such salient features are described fully in copending applications entitled "Tag Address Memory," Ser. No. 809,987, now Patent 3,230,511, filed on Apr. 30, 1959 in the names of J. J. Lentz and R. R. Seeber, Jr. and "Memory System," Ser. No. 836,753, now Patent 3,230,512, filed on Aug. 28, 1959 in the names of R. R. Seeber, Jr. and A. J. Scriver, Jr., both copending applications being assigned to the same assignee as the present applicants' assignee.

In the AMOR system, the memory cycle consists of two phases established by the memory controls. During the first phase, the contents of the unmasked positions of an interrogation register condition the comparing circuits to their corresponding positions in the memory. For the positions that were masked, a mask signal is sent through the memory. A mask signal forces that position in memory to indicate an equal condition.

In the memory, a comparing current is established on an equal line going into the high order position of each word. As long as the memory positions are equal to their corresponding positions in the interrogation register or are masked, the comparing current will remain on the equal line. If at any position, there is an unequal condition, the comparing current will be diverted to the unequal line. At the end of each word register in memory, an indicator bit is set to 1 by current on the equal line, indicating an equal word register, or to a 0 by current on the unequal line. The indicator bit is part of the register select controls and is referred to as the equal bit. An equal word is defined as having its tag equal to the interrogating tag.

During the second phase of the memory cycle, the equal word register is read out of or written into depending upon the operation desired. These operations are performed by the memory control, register select control, and the read-write circuits. Details of these circuits will be discussed in conjunction with the drawings hereinafter.

In this memory system, provision is made for storage of data into the first vacant word register. A vacancy bit in each register is used to indicate whether that register is occupied or vacant. A 0 or 1 in the vacancy bit may respectively represent a vacant or occupied word register. The vacancy bit is designed so that it is possible to write into it during a read operation as well as during a write operation. Thus writing a 0 into the vacancy bit of a word register while reading that register results in a destructive read operation.

Provision is also made in this memory for handling multiple matched words. When a plurality of matched words results from an interrogation, the first matched word register is read and marked. By definition, a matched word is an unmarked equal word. The matched and marked word registers are identified by match and mark bits respectively. These bits, like the equal bit, are part of the register select controls. Therefore, during the next memory cycle, using the same tag, the next matched word is read and marked. This time the matched word is the second equal word. After all matched words have been read and marked, the mark bits are reset for all equal words.

Thus this associative memory system is basically a memory that has enough logic so that a simultaneous comparison may be made between the contents of the word registers and an interrogation register. This comparison indicates whether each word in the memory is equal or unequal (and with high and low indications) with respect to the information contained in the interrogation register. This comparison may be made on the entire word or on any portion thereof. The following features of the AMOR system have been generally incorporated in the present associative memory with ordered retrieval, but with certain important changes to be described in detail in conjunction with the drawings hereinafter.

(1) Enter under tag selection.—Information in an entry register may be entered into the first match word or into all matched words in memory during one memory cycle.

(2) Exit under tag selection.—Matching words are retrieved, destructively or nondestructively. In the case of multiple matched words, one word at a time is retrieved until all words have been selected either destructively or non-destructively. This also applies to instruction words.

(3) Selected field entry.—Substitution of portions of a matched word or words in memory is provided without having to bring the word or words out of memory.

(4) Automatic ordered retrieval of randomly stored data words.—Simultaneous ascending and/or descending sequences of words identified by desired tags may be retrieved from randomly stored data. In this system, it takes, on the average, less than 3N memory cycles to sort out N words in storage regardless of the size or number of tags in the word to be sorted on.

High ordered tags need not be placed physically to the left of lower ordered tags in the construction of a word.

Program control of the tags is by character in this system. However, the system may be changed to bit control of the tags, if desired.

(5) Ordered retrieval modifications.—By adding additional circuits, the average number of memory cycles to sort out N words is reduced from 3N to 2.5 N. Also, when doing table look-up on a set of randomly stored data words, it may be desirable to do interpolation. This system provides a means for obtaining the next highest and next lowest tag as an aid for interpolation.

(6) Range Retrieval.—It is possible to retrieve data lying in the range between two limits. Also, that which is less than the lower limit, or higher than the higher limit, may be separately retrieved.

Having noted the basic features of the AMOR system, attention is now turned to the improvements of that system, and to the algorism used in conjunction therewith, in accordance with the present invention.

With regard to the aforenoted feature of Range Retrieval, the present invention provides for Range Retrieval in an associative memory but the basic storage cell is now such as to give only a match or no match indication (equal or unequal). The previously described Range Retrieval feature of patent applicaiton Ser. No. 163,233, now Patent 3,249,921, filed Dec. 29, 1961, provided that the basic storage cell, that is, the basic unit of the word register, would have high, low indications in addition to the match, no match signals.

Since the system of the present invention retains the basic features of the AMOR system, the term RAMOR (Range Associative Memory With Ordered Retrieval) will be employed to refer to the system and technique of the present invention.

Accordingly, it is a primary object of the present invention to provide an improved memory system that is associative.

Another object of the invention is to provide the ability to retrieve all of the randomly stored data words whose values or tags fall between any given lower value (bound) and any given upper value (bound).

A further object is to enable the execution of the retrieval of data words whose criteria for selection is based on the ranges of fields within a data word.

Yet another object is to simplify the bit structure in an associative memory in order to facilitate high-speed operation and to keep down the cost of such bit structure.

A further object is to obtain the desirable features of an associative memory with ordered retrieval but by means of simpler storage cells which enable more efficient operation.

The foregoing and other objects, features and advantages of the invention will be apparent from the following more particular description of preferred embodiments of the invention as illustrated in the accompanying drawings.

Figure 5:
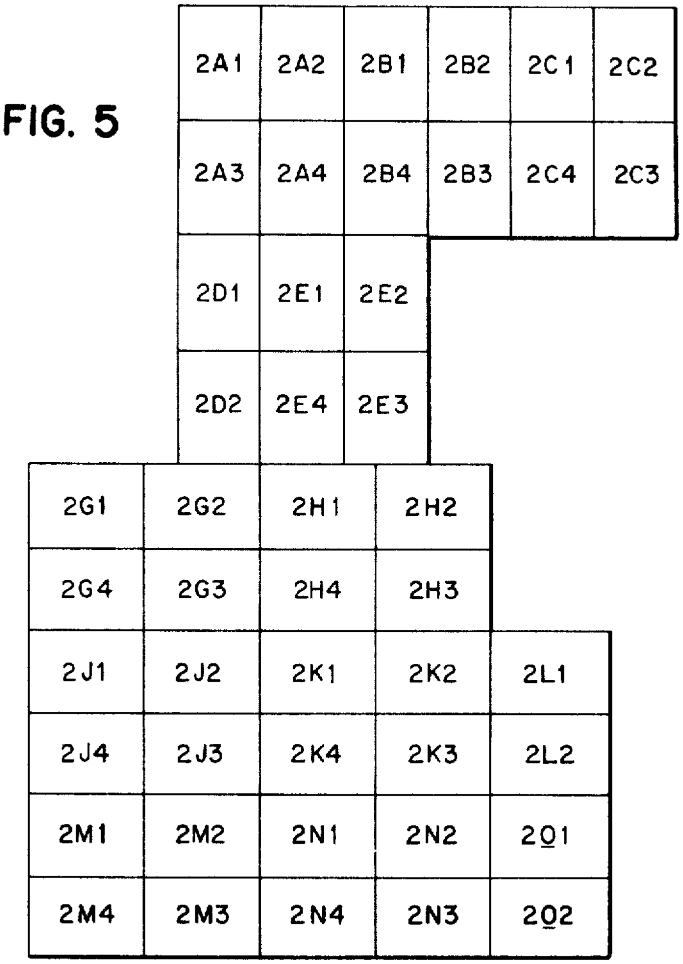

FIG. 5 is a diagrammatic layout of FIGS. 2A, 2B, 2C, 2D, 2E, 2G, 2H, 2J, 2K, 2L, 2M, 2N, and 2O. However, because more than one sheet is needed to illustrate such figures in detail, FIG. 2A has been further broken down as a quartet of figures, namely, FIGS. 2A1, 2A2, 2A3 and 2A4. FIG. 2B is the quartet of FIGS. 2B1, 2B2, 2B3 and 2B4; FIG. 2C is the quartet of FIGS. 2C1, 2C2, 2C3 and 2C4; FIG. 2D is broken down into the set labeled FIGS. 2D1 and 2D2; FIG. 2E is the quartet of FIGS. 2E1, 2E2, 2E3 and 2E4; FIG. 2G becomes FIGS. 2G1, 2G2, 2G3 and 2G4; FIG. 2H becomes FIGS. 2H1, 2H2, 2H3 and 2H4; FIG. 2J becomes 2J1, 2J2, 2J3 and 2J4; FIG. 2K becomes FIGS. 2K1, 2K2, 2K3 and 2K4; FIG. 2L becomes 2L1 and 2L2; FIG. 2M becomes FIGS. 2M1, 2M2, 2M3 and 2M4; FIG. 2N becomes 2N1, 2N2, 2N3 and 2N4; FIG. 2O becomes FIGS. 2O1 and 2O2.

Figure 1:
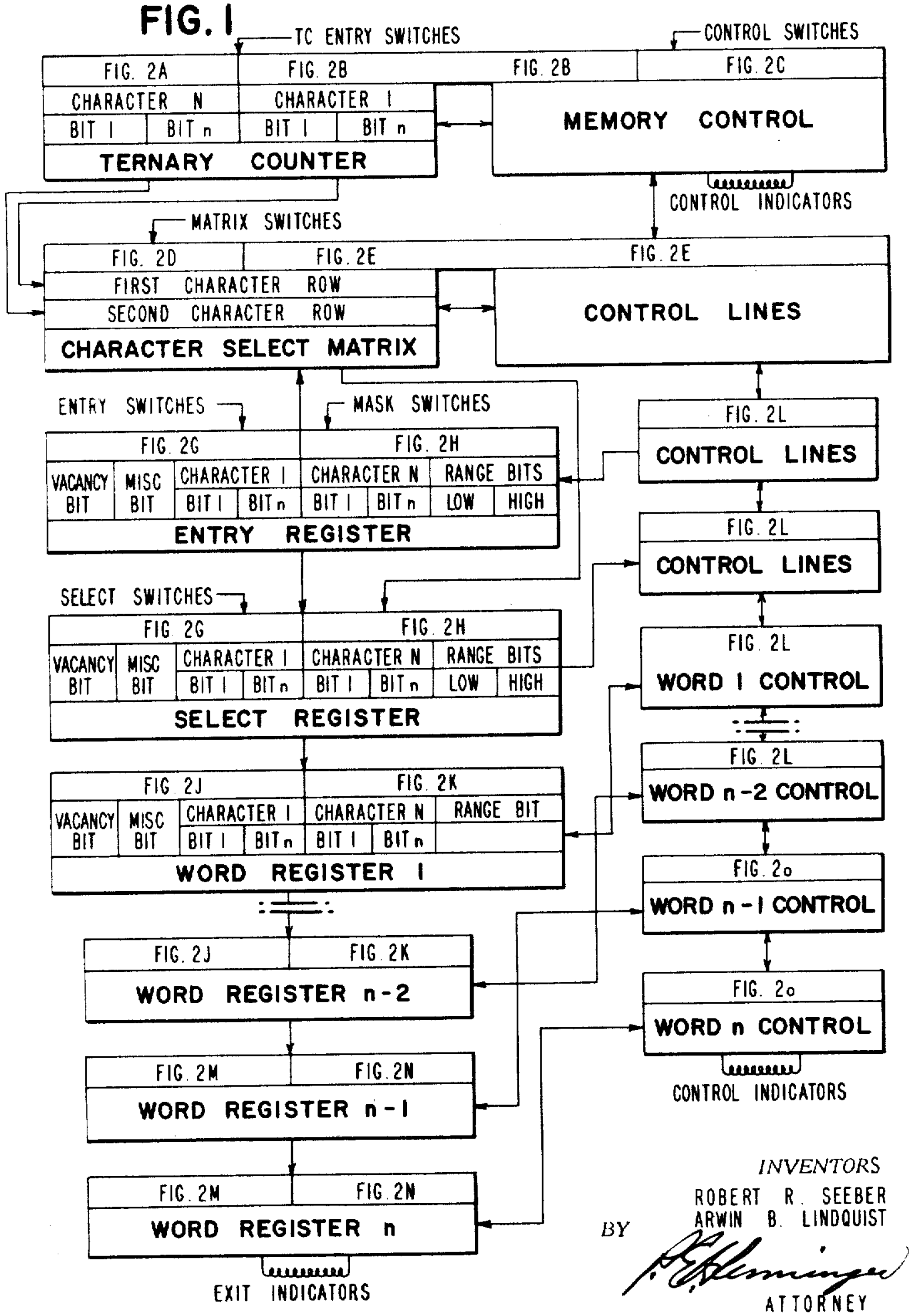
FIGURE 1 is a block diagram of the system in accordance with the present invention and also indicates the manner in which the FIGS. 2A to 2O are to be interconnected.
Figure 2H:
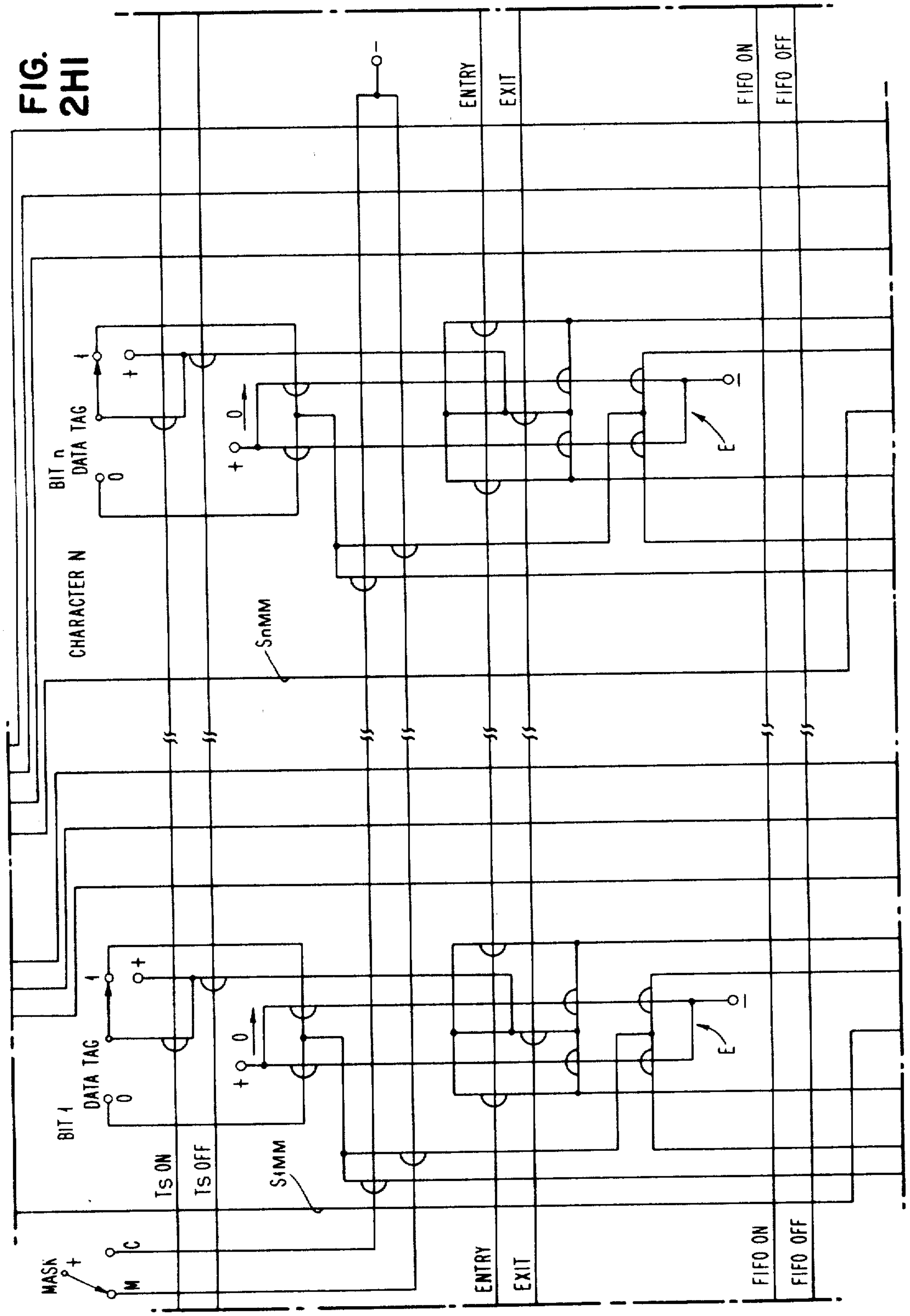
FIGS. 2G and 2H show the details of the Entry Register and Select Register of the system and 2J and 2K show the details of the first Word Register in memory.
Figure 2K:
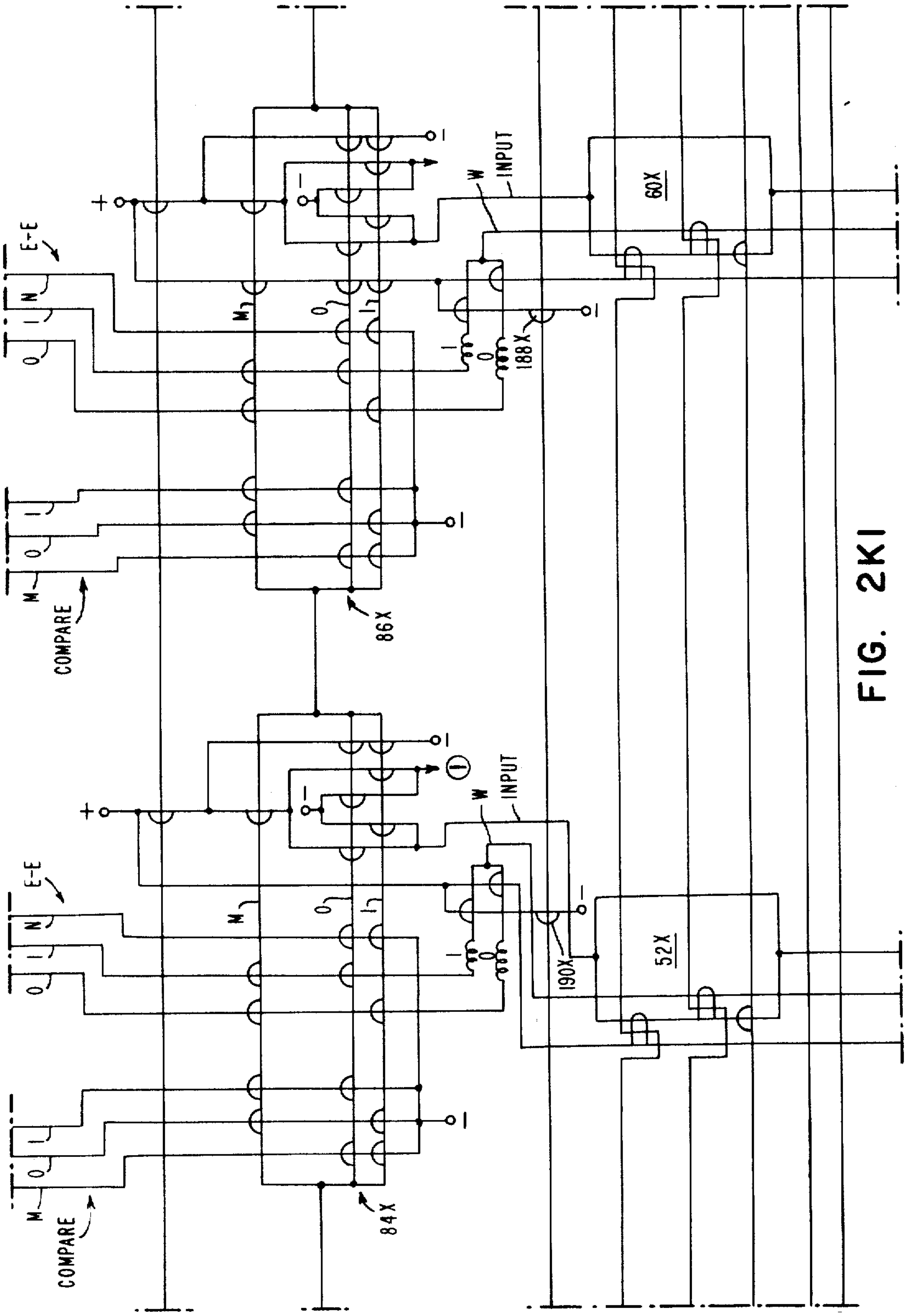
FIGS. 2A and 2B show the ternary counter employed as part of the ordered retrieval system. A portion of FIG. 2B also includes a portion of the Memory Control circuitry, of which the main portion is shown in FIG. 2C.
FIGS. 2D and 2E depict the Character Select Matrix of the system as well as the control line interconnections for the Memory Control and the Character Select Matrix.
FIGS. 2M and 2N represent additional Word Registers in memory.
FIGS. 2L and 2O are additional controls for such additional corresponding Word Registers.
Figure 2M:
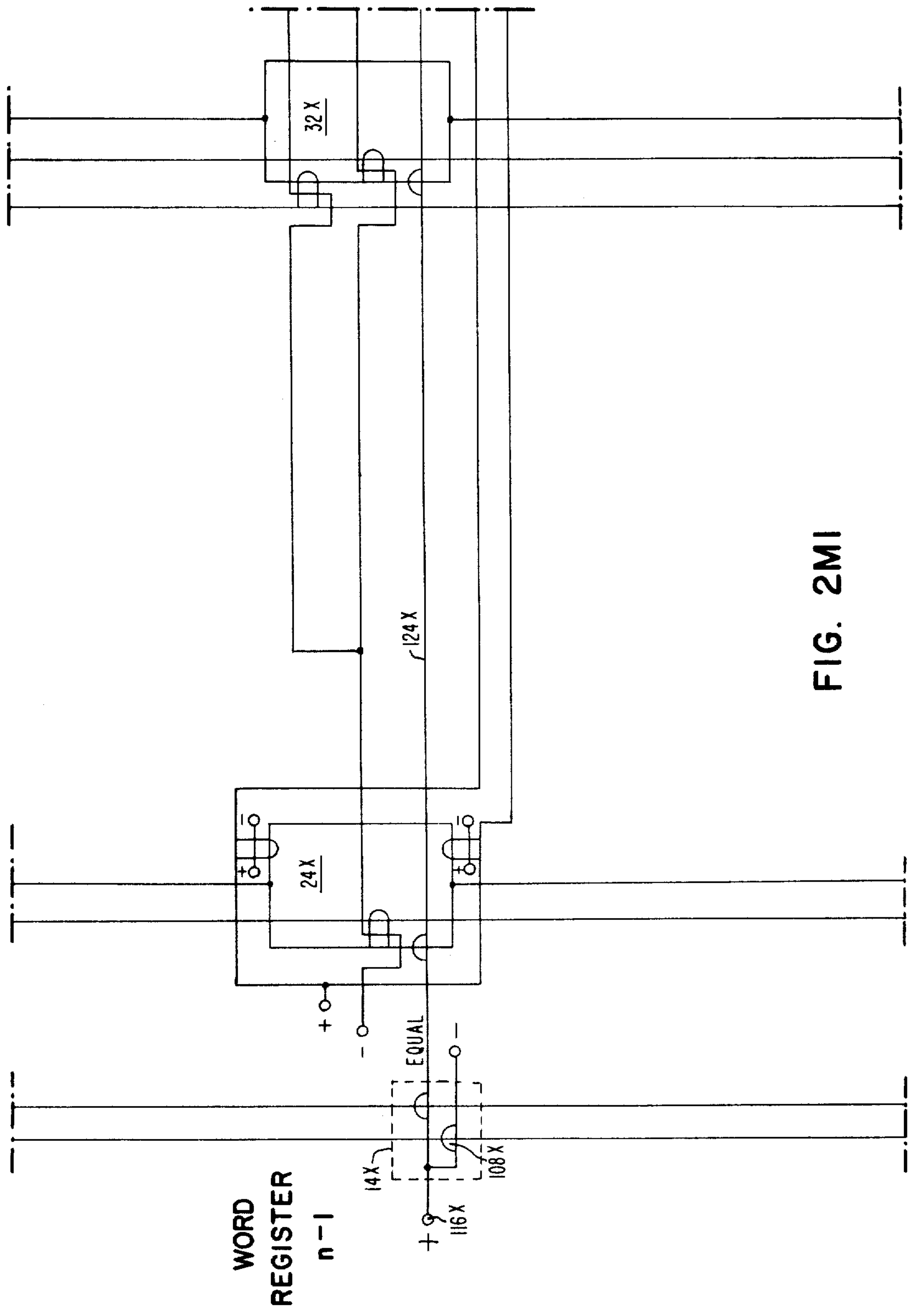
Figure 2N:
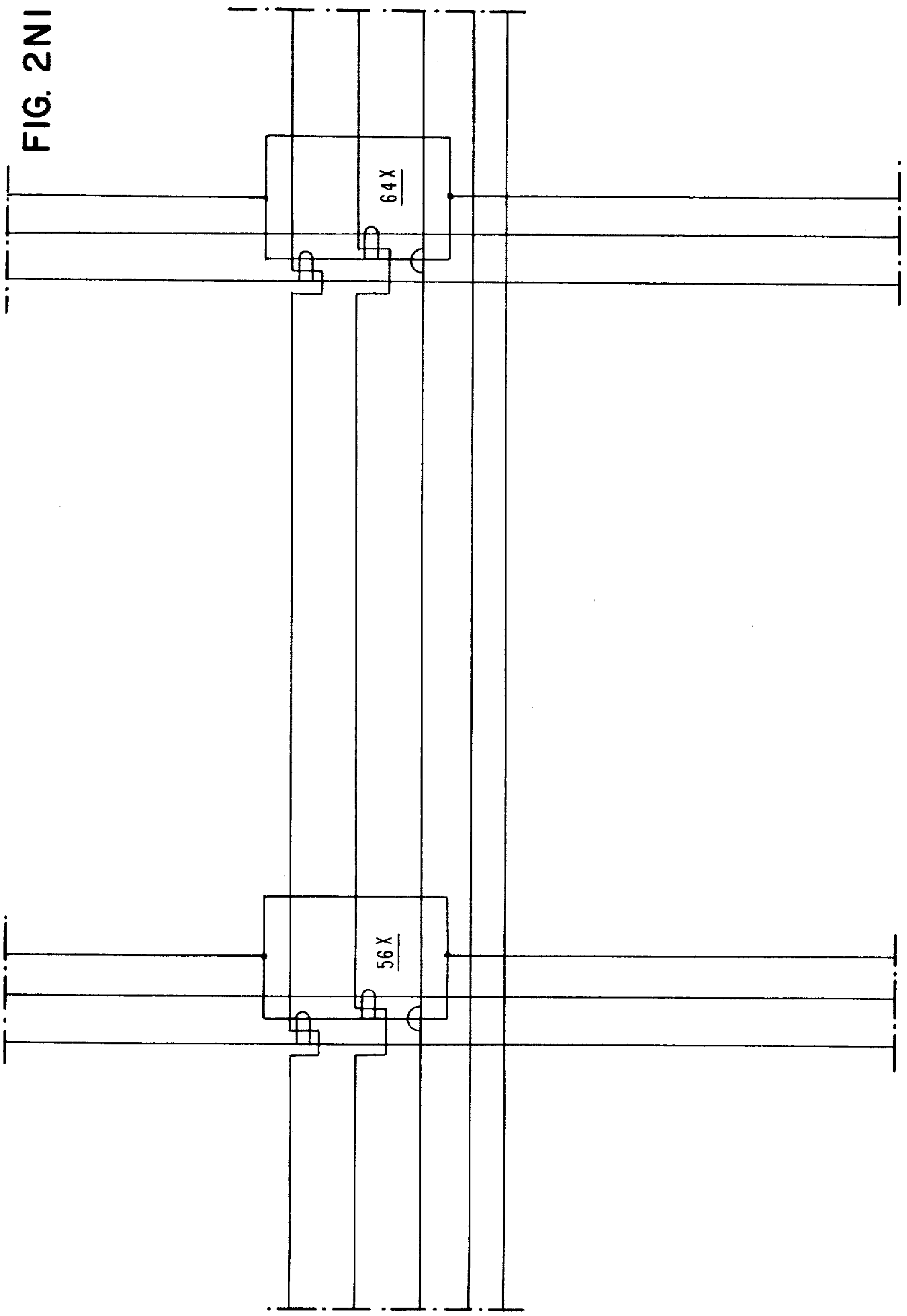
Figure 201:
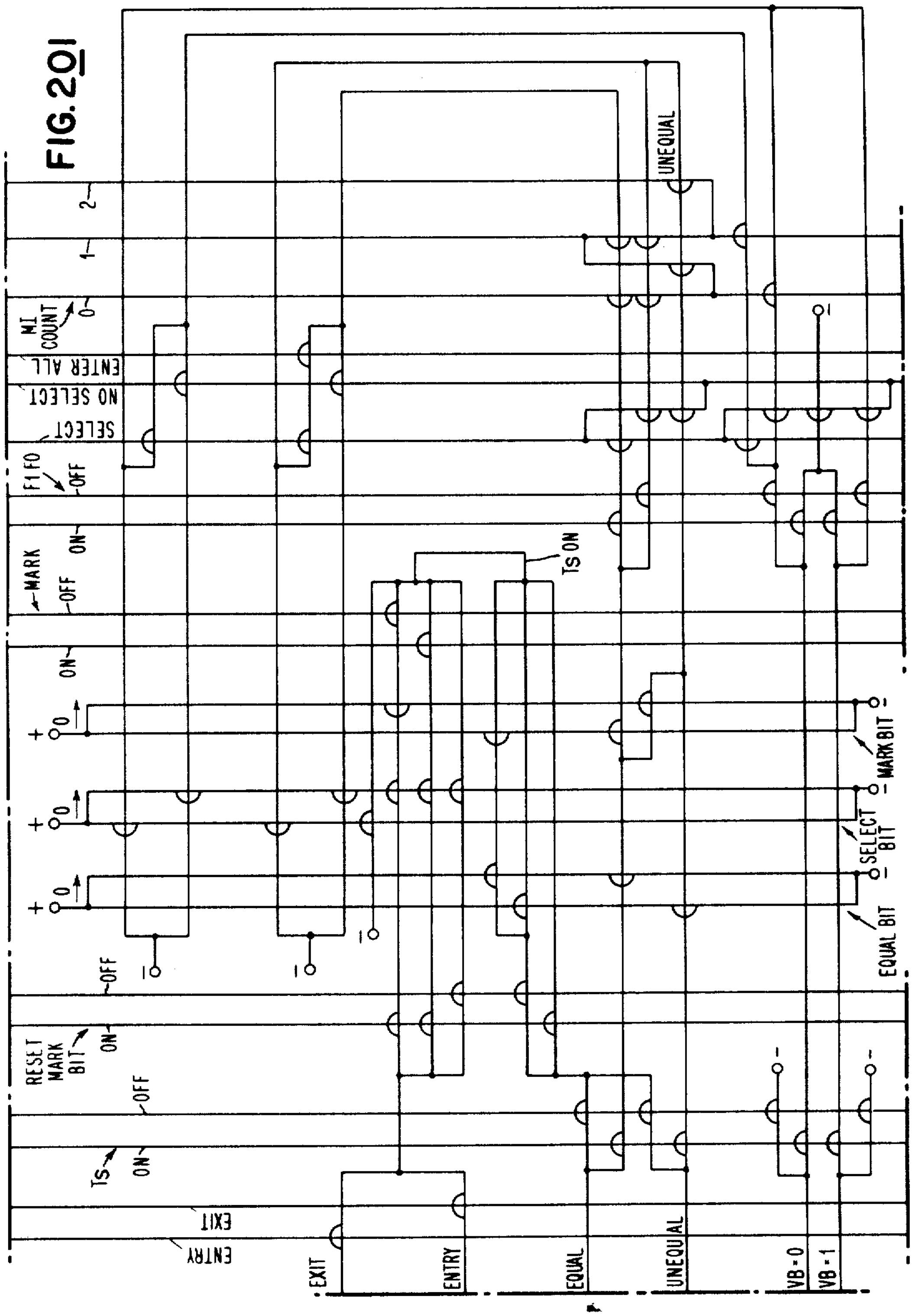
Figure 202:
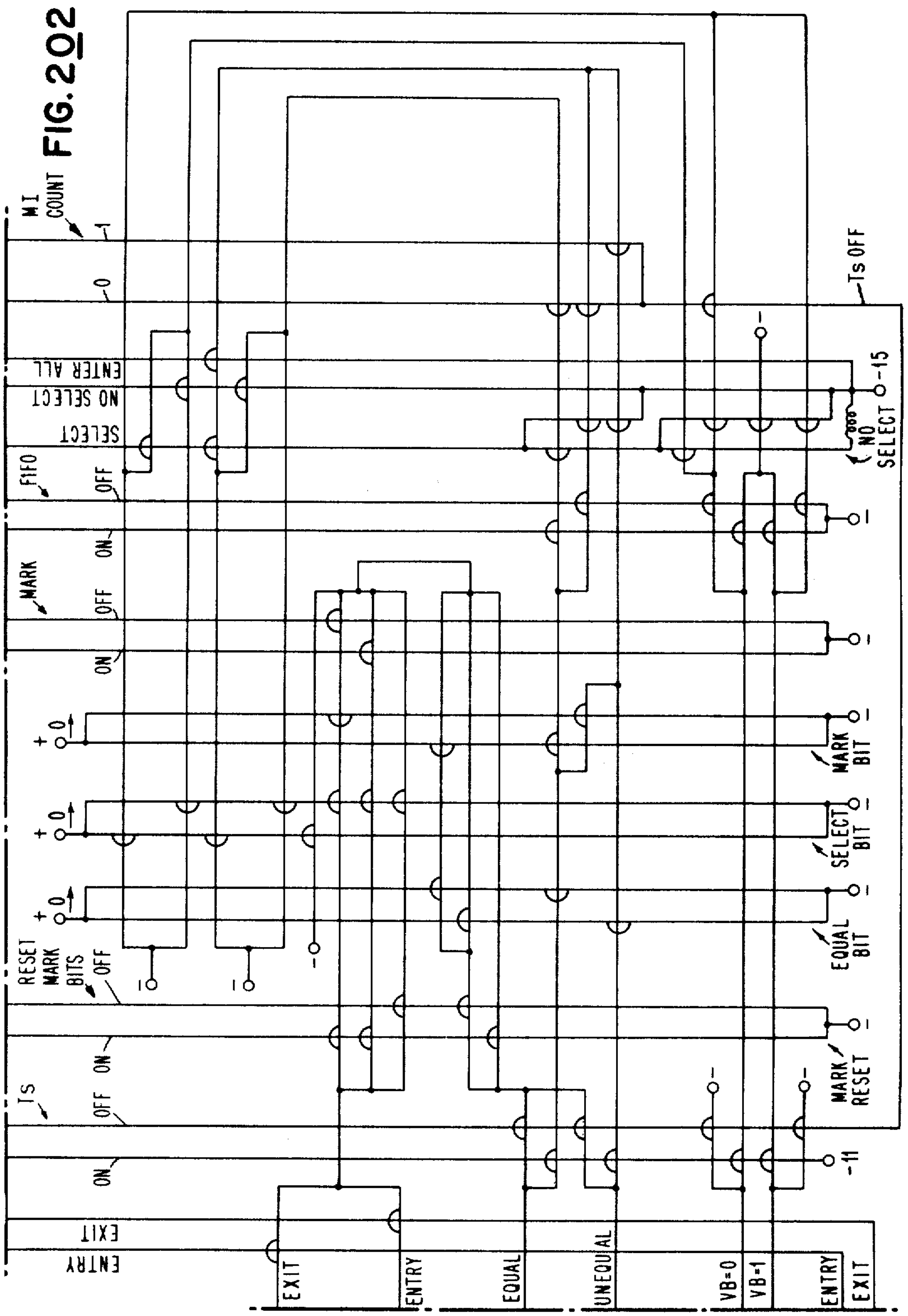

Throughout the specification, a reference to any of the detail FIGS. 2A, 2B, 2C will include a reference, by incorporation, to any of its quartet or duet of FIGS. 2A1, 2A2 . . . or 2B1, 2B2, etc.

Figure 6:
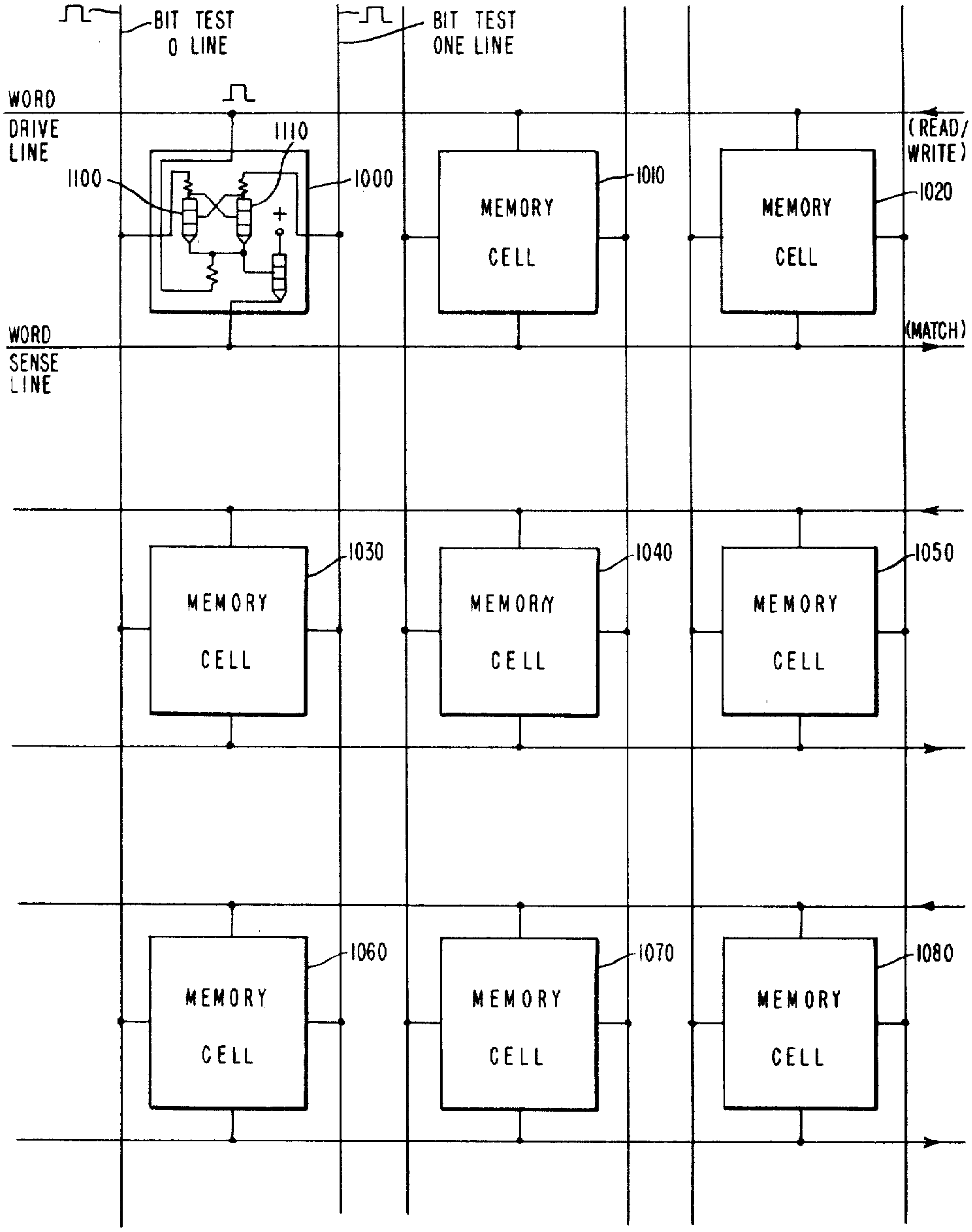

FIG. 6 is a diagram of a transistor memory cell in an associative memory array useful in another embodiment of the present invention.

Figure 7:
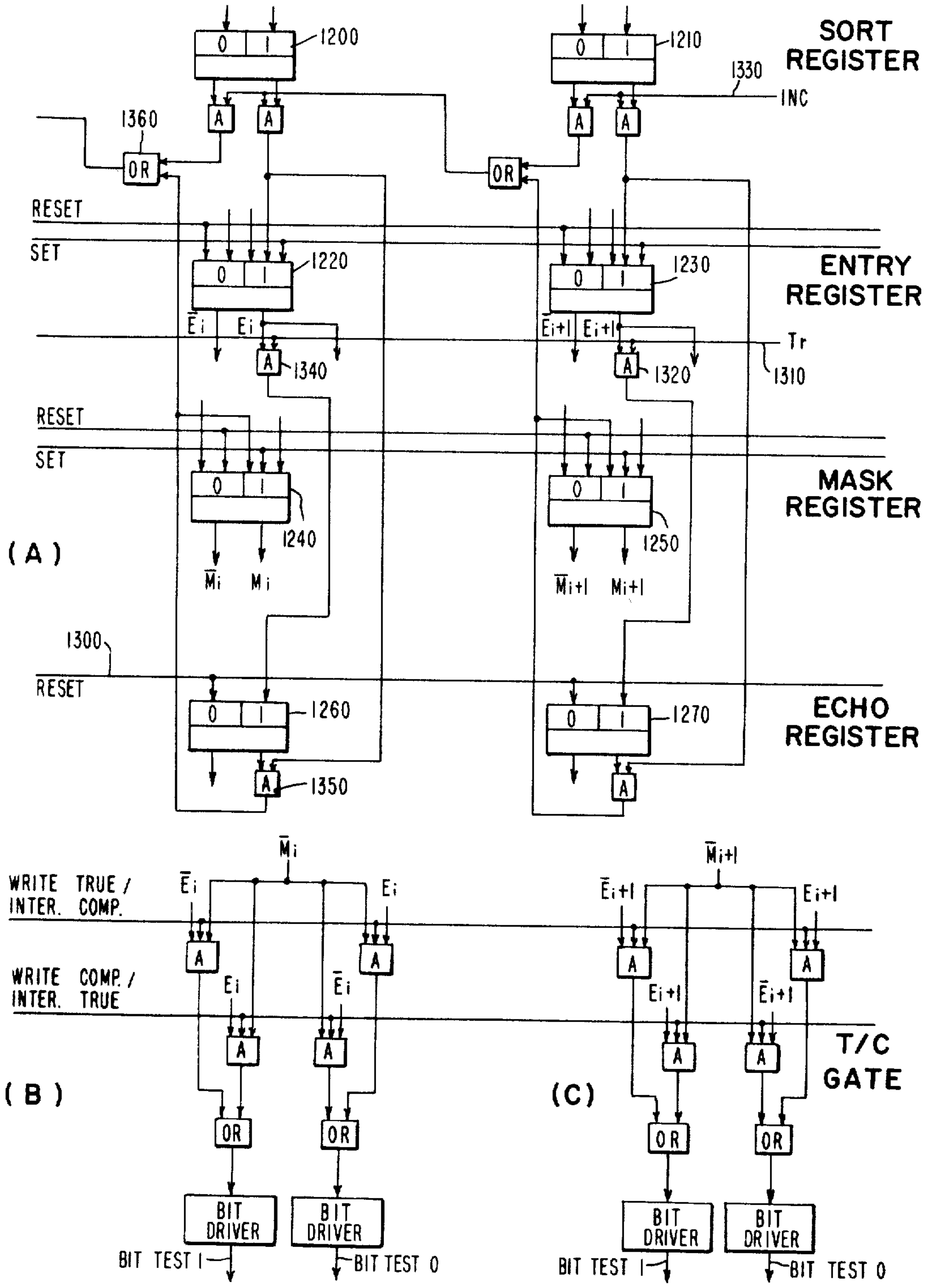

FIG. 7 is a diagram of the Bit control logic that is employed in this other embodiment.

Figure 8:
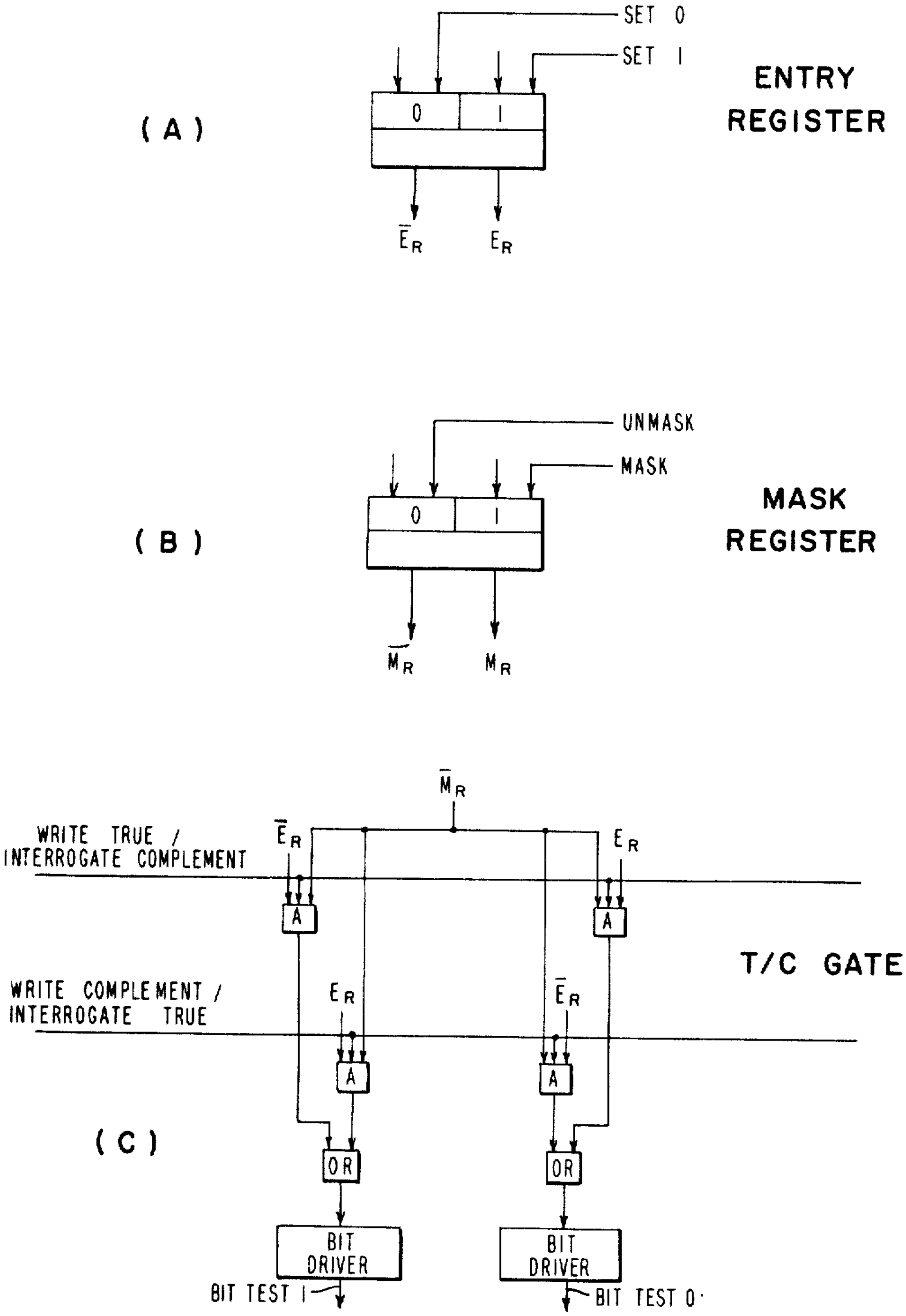

FIG. 8 is a diagram of the Range Bit control for such alternative embodiment.

Figure 9:
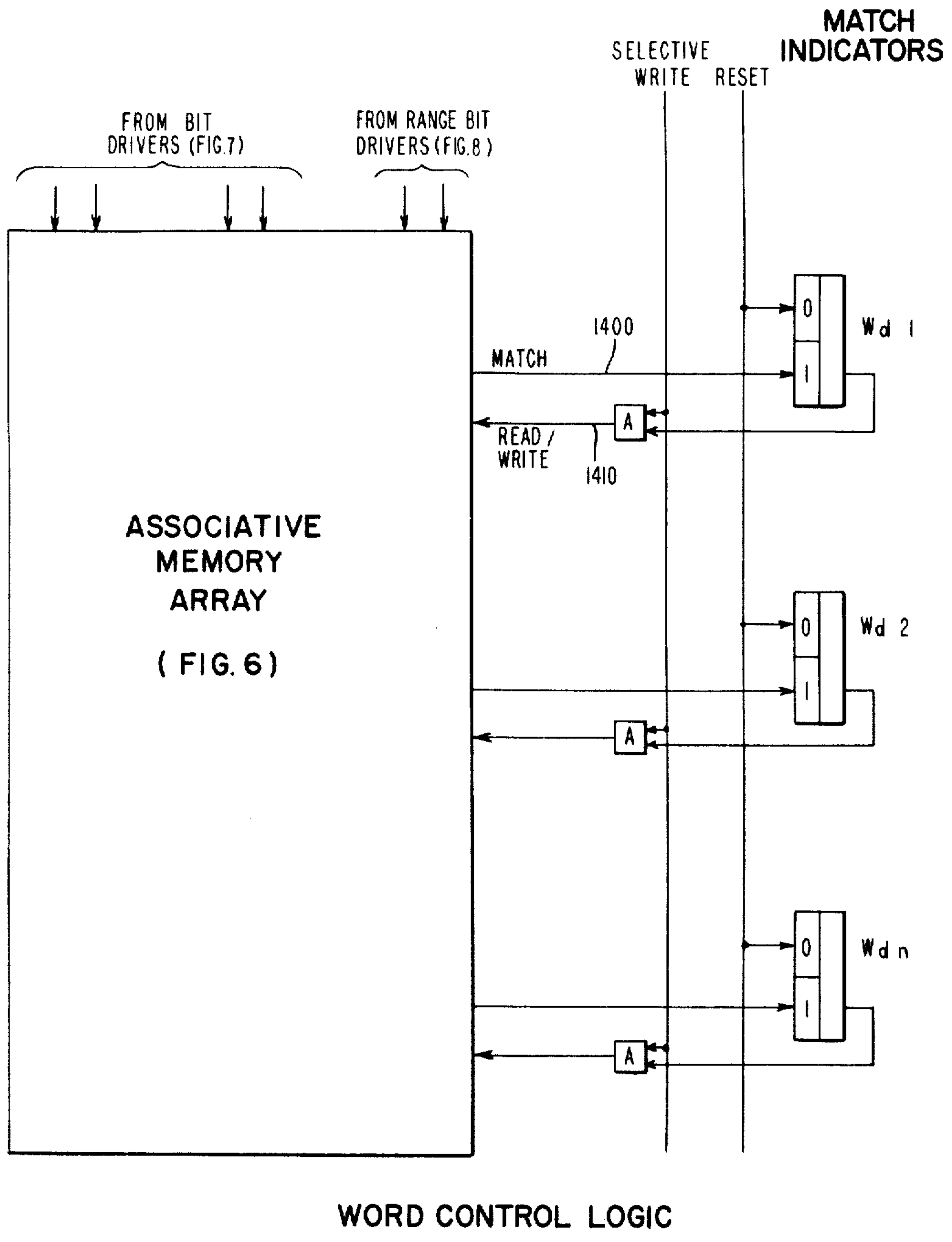

FIG. 9 is a diagram of the Word control logic for such alternative embodiment.

GENERAL DESCRIPTION

FIG. 1 shows the block diagram for the system of the present invention. The lines with the arrows indicate the communication between the blocks. Communication between the associative memory and the rest of the computing system is accomplished by switches and indicators. Such interconnections of the Memory Controls, the Ternary Counter, the Entry Register, the Select Register, the Word Register N, and the Word N controls are shown diagrammatically and the specifics of such interconnections are shown in FIGS. 2A . . . to 2O.

In this block diagram, only four word registers of seven bits are shown. The word registers consist of a Vacancy Bit, Miscellaneous Bit, Character Bits and Range Bit. The Vacancy Bit is used to distinguish between the occupied and unoccupied word register. The Miscellaneous Bit is used in a selected field entry operation and Character Bits represent main storage of data. The Range Bit is used in a range retrieval operation. The purpose of these bits and blocks will become clear as the main features of the system are discussed in detail.

The main features of the system which were noted previously will be described generally prior to setting forth their implementation, using FIGS. 2A to 2O to aid in understanding such implementation.

(1) Enter under tag selection

To enter any information into the memory, the Mask Switches of the Entry Register (see FIG. 2G) must be set to indicate which array of bits or characters should be used for comparing. With the exception of the Vacancy Bit, the Miscellaneous Bit, and the Range Bit, masking is done on a character basis. It is understood that a character could include any number of bits. If it is assumed, for example, that a character has 6 bits and if six characters are needed to define a field, then 36 (6×6) bits are needed in making a field comparison, not including the Vacancy Bit, the Miscellaneous Bit and the Range Bit.

The information that is to be used as the tag and information to be entered into the memory is brought into the Entry Register through Entry Switches. An interrogation of the memory is performed using the designated tag fields, and the Word Registers containing the matched tags are indicated. Now depending upon the desires of the programmer, the first matched word or the first vacant word after a group of matched words, or all matched words, are filled with the information that was stored in the Entry Register. Some examples of entry operations follow:

(A) *Enter into first vacant Word Register*

To enter into the first vacant Word Register, the Vacancy Bit is the only bit that is used as a compare bit. Let us say a 1 stored in the Vacancy Bit position represents an occupied Word Register and a 0 represents a vacant Word Register. The Memory Controls are set to enter into the first matched Word Register, the Mask Switches are set to compare only on the Vacancy Bit, and a 0 is entered into the Vacancy Bit portion of the Entry Register along with the other information to be stored. The memory is interrogated and the first matched word, in this case the first vacant word, is located and then the contents of the Entry Register are transferred to that matched register. The Vacancy Bit is designed so that, although a 0 is entered into the Entry Register and a 0 is compared, a 1 is stored in the Vacancy Bit position of the selected Word Register, once entry of a word from the Entry Register to a Word Register takes place, thus indicating an occupied register.

(B) *Add a word to the end of a list*

When adding a word to an already existing list of words in a memory such that a first-in-first-out (FIFO) system is insured, the name of the list is used as a tag and the Entry First and FIFO control switches are turned on. Then during an interrogation, the first vacant Word Register after the last matched word will be conditioned to accept the contents of the Entry Register. For a FIFO operation, a 1 is entered into the Vacancy position of the Entry Register and a 1 is compared and stored.

(C) *Reset all memory bits to 0*

To reset all memory bits to 0, the memory controls are set to enter into all matched words, the Mask Switches are set to all mask, i.e. no compare condition, and all 0's are entered into the Entry Register. The memory interrogation would indicate all words in memory as matched, and so all 0's will be entered into the memory.

(2) Exit under tag selection

A word in storage is retrieved by association of at least a portion of its information content. In this system only one word at a time may be retrieved. In the case of multiple-like tags, two options are at the discretion of the programmer. These options area available through program control of the Memory Control Mark Switch.

With the Memory Control Mark Switch set to on, as each word is retrieved, it is marked to indicate that it has been retrieved. In this manner, all words containing the matched tags will be retrieved, and, as the last word of the group is retrieved, the marks are reset so that the group of words may be retrieved again if required at some later time. With the Memory Control Mark Switch set to the off position, the word is not marked as it is being retrieved. This implies that on the next interrogation of memory, with the same tag, that same word will be retrieved again. It should also be added here that the programmer may reset a group of Mark Bits at any desired time with the aid of a Reset Mark-Bits Switch.

The Vacancy Bit of the Entry Register will normally be used as part of the tag in an exit operation, and so such Vacancy Bit will contain a 1 if an exit of its associated word is desired. Recall that a 1 in the Vacancy Bit position indicates a non-vacant Word Register. The Vacancy Bit is also designed so that the complement of the contents of the Vacancy Bit position in the Entry Register may be entered in the Vacancy Bit position of a selected word register during an exit operation. Thus, it is possible to perform a non-destructive or destructive read-out by, respectively, setting the Vacancy Bit to no-entry or entry during an exit operation.

(3) Selected field entry

It is sometimes desirable to enter into, modify, or substitute only a portion of a selected word or words in the memory without taking the word out of memory. These operations are accomplished with the aid of the Select Register. With the exception of the Vacancy Bit, the Miscellaneous Bits, and the Range Bit, control of the Select Register is by character through the Select Switches. These switches have three states: The "Entry-Exit" state, the "Sort" state, and the "No-Entry" state.

When a Select Switch is set to the No-Entry state, the information contained in that particular bit or character position in the Entry Register will not affect the contents of the corresponding position in the matched Word Register. Selected field entry is helpful in updating of records. Take for example a payroll operation, wherein this invention makes it possible to associate on an employee number and selectively enter into the matched employee record a new employee rate without taking that record from storage.

Another more elaborate example would be where it was desirable to change a department number from 540 to 610 in a group of payroll records. The procedure here would be to first tag on the payroll record code and selectively enter 0 into a Miscellaneous Bit position of all the payroll records. Then match on the department field of the payroll record code using the department code 540 and enter a 1 into the Miscellaneous Bit positions of all matched words that were previously set to 0. Next tag on the same payroll record code and compare on this Miscellaneous Bit position with a 1 and selectively enter 610 into the department field of these matched word registers.

(4) Automatic ordered retrieval of randomly stored data words

This is a principal feature of this fully-associative memory ssytem. The sorting technique has a certain similarity to a binary sort or to a punch-card block sort. For example, a human being is faced with sorting the following five numbers in order:

2 6 3 4 5
4 6 9 2 1
8 6 4 7 1
4 7 5 2 7 as was indicated as a problem earlier in this specification. He can do most of the sorting by looking only at the first digit. Only in the cases of the second and fourth numbers must he look beyond the first digit. The present system works much in the same fashion, dealing with a bit at a time, working from left to right, i.e., from highest order bit to lowest order, but continuting to the right only so far as necessary to identify the single next-higher word.

The interrogation of the sorting field is done through a Ternary Counter in which the settings are modified as the sorting proceeds. The Ternary Counter keeps track of the bit-values being interrogated. The three states of each Ternary Counter position are designated as "M, 0, 1" representing "Mask, Binary 0, Binary 1." Carry left and right provisions are provided for. When a counter is in the M position, matching of a word in memory is not required in that bit position. When the counter is in the 0 position, a Binary 0 is searched for in that position and similarly for a Binary 1.

Except for the start of the sort operation, the rules for the operation of the Ternary Counter are a function of the Match Indicator. This indicator tells how many words in memory match the setting of the Ternary Counter but only in abbreviated form:

*MI* equals 0=no matches
*MI* equals 1=one match
*MI* equals *P*=more than one match At the start of the sort operation, all of the positions of the Ternary Counter are set to the M state. After the first interrogation of the memory, using the state of the Ternary Counter and possibly some fixed tags in the Entry Register, for identifying the words on which the sort is to take place, the highest ordered position of the sorting field in the Ternary Counter is located and advanced. The rightmost position of the Ternary Counter is defined as the lowest ordered position of the sorting field and positions to the left thereafter are considered as successively higher ordered positions. Thus in the memory, if a field to be sorted consists of ten positions, the rightmost ten positions of the Ternary Counter will be used as the sorting or interrogating tag.

After each of the memory interrogations, the Match Indicator is consulted to determine the next state of the Ternary Counter. Before the rules are stated for establishing the next state of the Ternary Counter, it is desirable to mention two definitions. First, the lowest ordered position of the Ternary Counter whose state is either a 0 or a 1 will be defined as the Operating Position (OP). Second, the position immediately to the right of the OP will be defined as the Next Position (NP). The rules that are now stated tell not only how to advance the Ternary Counter, but also when to select a word out of memory so that it will be retrieved in an ascending order.

Rule 1.—When the *MI*=*P*, if the OP is the lowest order position of the Ternary Counter, indicating multiple like sorting keys, retrieve the first matched word and mark the retrieved word; if the OP is not the lowest order position, do not retrieve. Also, when the *MI*=*P*, the NP is to be advanced in preparation for the succeeding interrogation. (It should be observed that when the OP is the lowest order position of the Ternary Counter, the state of the Ternary Counter does not change until all multiple like sorting keys have been retrieved, at which time the Mark Bits are reset.)

Rule 2.—When *MI*=1, retrieve the matched word and advance the OP.

Rule 3.—When *MI*=0, do not retrieve but advance the OP.

In addition to the above ordered retrieval rules, when a Ternary Counter position is advanced from the 1 state to the M state, a carry is produced and directed into the next higher ordered position. When a carry is directed into a position whose state is M, this indicates the end of sort operation.

EXAMPLE 1

| Interrogations | State of Ternary Counter Bit Position | | | | | | State of MI | Rule Applied |
|---|---|---|---|---|---|---|---|---|
| | 1 | 2 | 3 | 4 | 5 | 6 | | |
| 1 | M | M | M | M | M | M | P | Start of Sort |
| 2 | 0 | M | M | M | M | M | P | 1 |
| 3 | 0 | 0 | M | M | M | M | P | 1 |
| 4 | 0 | 0 | 0 | M | M | M | P | 1 |
| 5 | 0 | 0 | 0 | 0 | M | M | 1 | 2 |
| 6 | 0 | 0 | 0 | 1 | M | M | 1 | 2 |
| 7 | 0 | 0 | 1 | M | M | M | 0 | 3 |
| 8 | 0 | 1 | M | M | M | M | 1 | 2 |
| 9 | 1 | M | M | M | M | M | P | 1 |
| 10 | 1 | 0 | M | M | M | M | P | 1 |
| 11 | 1 | 0 | 0 | M | M | M | 0 | 3 |
| 12 | 1 | 0 | 1 | M | M | M | P | 1 |
| 13 | 1 | 0 | 1 | 0 | M | M | 1 | 2 |
| 14 | 1 | 0 | 1 | 1 | M | M | 1 | 2 |
| 15 | 1 | 1 | M | M | M | M | 1 | 2 |
| | M | M | M | M | M | M | | End of Sort |

| Register Number | Word Bit Position | | | | | | Interrogation When Retrieved |
|---|---|---|---|---|---|---|---|
| | 1 | 2 | 3 | 4 | 5 | 6 | |
| 1 | 1 | 0 | 1 | 1 | 0 | 1 | 14 |
| 2 | 1 | 1 | 0 | 1 | 0 | 1 | 15 |
| 3 | 0 | 0 | 0 | 1 | 0 | 1 | 6 |
| 4 | 0 | 1 | 1 | 0 | 0 | 1 | 8 |
| 5 | 1 | 0 | 1 | 0 | 1 | 1 | 13 |
| 6 | 0 | 0 | 0 | 0 | 1 | 0 | 5 |

Example 1, above noted, shows the steps involved in sorting six words on six bits. Only six bits of the Ternary Counter and six bit positions of the memory are shown. The interrogations are numbered 1 through 15 and the states of the Ternary Counter and Match Indicator are shown for each interrogation. In addition, there is shown the rule that is applied to obtain the state of the Ternary Counter for the next interrogation. There is also shown to the right of each word a number which indicates the interrogation when this word was retrieved. Note that at the start of the sort operation, the Ternary Counter is in the all M state. Then, after the first interrogation, the high order bit position of the sorting field in the Ternary Counter, bit position 1 in the example, is advanced to a 0. Thereafter the Match Indicator dictates how the Ternary Counter is to be advanced. For example, after the seventh interrogation, using a tag of 001MMM, the *MI*=0 which, according to Rule 3, tells us to advance the OP. The OP, as defined, is bit position 3 for the interrogation and since it is in the 1 state it is advanced to the M state which results in a carry into bit position 2. Bit position 2 is thus advanced from the 0 state to the 1 state and the state of the Ternary Counter for the next interrogation, interrogation 8, is 01MMMM.

In summary, note that the last two positions of the sorting field did not enter into the sort operation. Also note that fifteen retrieval tries were required to recover the six words. Extended trials on small random sets of words and mathematical analysis indicates the mean number of tries in about three for each successful retrieval.

(5) Ordered retrieval modifications

By modifying the previously stated ordered retrieval rules, it is possible to reduce the average number of retrieval tries from three to about two and one-half. These modified rules are the ones that are actually implemented in the schematic showing of the invention in FIG. 2 and are as follows:

Rule 1.—When the *MI*=2 or P, if the OP is the lowest order position of the Ternary Counter, indicating multiple like sorting keys, retrieve the first matched word and mark the retrieved word; if the OP is not the lowest order position, do not retrieve. Also when the *MI*=2 or P, the NP is to be advanced in preparation for the succeeding interrogation. (It should be observed that when the OP is the lowest order position of the Ternary Counter, the state of the Ternary Counter does not change until all multiple like sorting keys have been retrieved, at which time the Mark Bits are reset.)

Rule 2.—When *MI*=1 (except when Rule 5 applies), retrieve the matched word and advance the OP.

Rule 3.—When *MI*=0, do not retrieve but advance the OP.

Rule 4.—At the start of a Match Indicator Cycle, record the position of the OP. The Match Indicator Cycle is defined as starting when the *MI*=2 and ending when the *MI*=1, providing that at some time between these two indications there was a *MI*=1 or a$MI=2_M$ where $2_M$ means a *MI*=2 during a multiple like tag.

Rule 5.—At the end of a Match Indicator Cycle, reset to M all Ternary Counter positions to the right of the recorded position (see Rule 4) and advance the recorded position. Also retrieve the matched word and reset the recorded bit.

Rule 6.—When $MI=0$, which has been preceded by either a $MI=2$ or P, advance the NP and do not select. But since Rule 3 also applies, the OP is also simultaneously advanced.

EXAMPLE 2

| Interrogation | State of Ternary Counter Bit Position | | | | | | MI | Rules Applied |
|---|---|---|---|---|---|---|---|---|
| | 1 | 2 | 3 | 4 | 5 | 6 | | |
| 1 | M | M | M | M | M | M | P | Start of Sort |
| 2 | 0 | M | M | M | M | M | P | 1 |
| 3 | 0 | 0* | M | M | M | M | 2 | 1, 4 |
| 4 | 0 | 0* | 0 | M | M | M | 2 | 1 |
| 5 | 0 | 0* | 0 | 0 | M | M | 1 | 2 |
| 6 | 0 | 0* | 0 | 1 | M | M | 1 [1] | 5 |
| 7 | 0 | 1 | M | M | M | M | 1 | 2 |
| 8 | 0 | 1 | M | M | M | M | 1 | 1 |
| 9 | 1 | M | M | M | M | M | P | |
| 10 | 1 | 0* | M | M | M | M | 2 | 1, 4 |
| 11 | 1 | 0* | 0 | M | M | M | 0 | 3, 6 |
| 12 | 1 | 0* | 1 | 0 | M | M | 1 | 2 |
| 13 | 1 | 0* | 1 | 1 | M | M | 1 [2] | 5 |
| 14 | 1 | 1 | M | M | M | M | 1 | 2 |
| | M | M | M | M | M | M | | End of Sort |

| Word Bit Position | | | | | | Interrogation When Retrieved |
|---|---|---|---|---|---|---|
| 1 | 2 | 3 | 4 | 5 | 6 | |
| 1 | 0 | 1 | 1 | 0 | 1 | 13 |
| 1 | 1 | 0 | 1 | 0 | 1 | 14 |
| 0 | 0 | 0 | 1 | 0 | 1 | 6 |
| 0 | 1 | 1 | 0 | 0 | 1 | 7 |
| 1 | 0 | 1 | 0 | 1 | 1 | 12 |
| 0 | 0 | 0 | 0 | 1 | 0 | 5 |

[1] End of MI cycle.
[2] End of a Match Ind. cycle.

Example 2, noted above, shows the same data that was sorted in Example 1. However, in Example 2, the modified ordered retrieval rules were applied which resulted in a saving of two retrieval tries. The asterisks above the 0's shown at interrogations 3 through 6 and 10 through 13 indicate that these positions were the OP when Rule 4 was applied.

It is also possible with the aid of a Character Select Matrix to provide enough flexibility such that higher ordered sorting fields need not be placed physically in the memory to the left of lower ordered sorting fields. In addition, this matrix allows for simultaneous ascending and descending ordering of the desired sorting fields. All that is necessary to perform a descending sort on a desired field is to complement the output of that field as it comes from the Ternary Counter. The complement of M, 0, 1 is defined to be M, 1, 0 respectively.

The Character Select Matrix is controlled by the characters that are contained in a sort field select word which immediately precedes a sort instruction word. The character code in a character position of the sort field select word determines whether that character position is to be used for sorting or not for sorting. If the character is to be used for sorting, the code further tells what order in the sorting field the character position should take and also whether the sort on this position is to be ascending or descending.

Take a word in a memory register relative to personnel records that is composed of the following twelve characters:

| | | | |
|---|---|---|---|
| 12345 | 678 | 9 | 101112 |
| JONES | 216 | 1 | 510 |

It may be desired to sort by shift, which is field number 9, and the latter needs only one character to identify it, and by employee number, which is composed of three characters, 6, 7 and 8. It may also be desired to obtain the names of those who work on the first shift (character $9=1$) in a descending order but obtain a sort of employee numbers by ascending order. A seven bit code is arbitrarily chosen to identify each character. An example of a 7 bit character code would look like this:

1 character portion of the sort field select word

| | |
|---|---|
| 0 0 0 0 0 0 0 | No sort |
| 0 0 0 0 0 1 0 | Ascending Sort, 1st (low order) position of sorting field |
| 0 0 0 0 0 1 1 | Descending Sort, 1st position of the sorting field |
| 0 0 0 0 1 0 0 | Ascending Sort, 2nd position of the sorting field |

etc.

With this code, a 64 character sorting field may be uniquely classified as to its ascending or descending ordering and to what relative position each character should take. The first bit, reading from right to left, indicates the kind of sort desired; for example, a "0" indicates ascending sort and a "1" a descending sort. Remaining six bits indicate the order in the sorting field the associated character position should take.

In the example given, the 6th character would be written as 0000110, the seventh character as 0000100, the eighth character as 0000010. All three characters state that they are part of an ascending sort and that character 6 is the 3rd position of the sorting field going from low to high order, character 7 is the 2nd position in going from low to high order, and character number 8 is the 1st position of the sorting field in going from low to high order. The ninth character, pertaining to the employee's work shift (e.g., 1st work shift, 2nd work shift or 3rd work shift) is written as 0001001, indicating that a descending sort on this character is desired and it occupies the 4th position of the sort in going from low to high order. Thus, the Character Select Matrix, when its inputs have been the previous coded information, the sort will treat character 9 as being of a higher order than character 8, even though in all the Word Registers in Memory, character 9 appears as a lower order character than characters 6, 7 and 8.

Another modification is that input circuits have been added to the Ternary Counter so that an external number may be stored in the counter. This allows the system to start sorting from a given number or numbers, either in an ascending order, descending order, or combination thereof. It should be noted here that in order to perform a descending sort starting from a given number, that number must be stored in its one's complement form in the Ternary Counter. Also, these circuits allow for resetting of all Ternary Counter positions to the M state. These two features, being able to start sorting from a given number and being able to reset the Ternary Counter to all the M state at any desired sort cycle, allow a programmer to quickly find the next higher or next lower number from a given number in a set of randomly stored tags.

Range retrieval

The last bit of each word register is called the Range Bit. This bit in each register contains all of the properties of the other bits in such register. The Range Bits are used to identify those words in memory that fall within the prescribed range.

CIRCUIT DETAILS

FIGURE 2 refers to the details of the system. This figure is divided into sections labeled 2A through 20.

Before getting into the details of the system of the present invention it is considered well to note at the outset the places where various changes have been made in the circuits previously described in the AMOR system of patent application Ser. No. 163,233. In particular, circuit changes have been made in FIGS. 2C1 and 2C2 of the previous AMOR system, and these changes with their attendant effects will be pointed out as the detailed description proceeds. Also, the system of the present invention as indicated previously, utilizes simpler storage cells embodying persistent current circuits in the Word Registers. Persistent current circuits, per se, and their mode of operation have been described before in patent application Ser. No. 277,233, now Patent 3,262,122, filed May 1, 1963. The Word Registers, as implemented in these persistent current circuits and as shown in 2J, 2K, 2M, and 2N, however, now provide only match or no match indications in contrast with previously known word register arrangements.

The persistent current circuits referred to above comprise a combination of several types of basic cryotron devices, namely, the in-line cryotron, as described in previous U.S. patent application Ser. No. 16,431, now Patent 3,191,055, filed on Mar. 21, 1960, and the so-called crossed film cryotron. The crossed film cryotron is illustrated in FIG. 4*a* and described herewith.

Figure 4A:
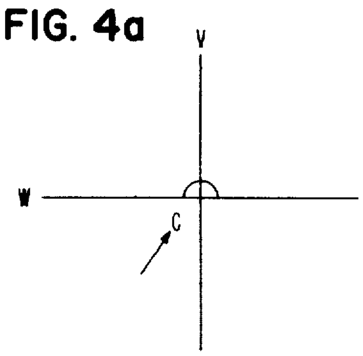
FIG. 4A shows a basic cryotron element used in the present system and FIG. 4B shows a bistable storage device employing such cryotron elements.

The crossed film cryotron shown in FIG. 4*a* is used in the design of the system and is represented symbolically as a thin-film, single cross-over cryotron C. The gate conductor W is identified by a straight line having the diameter of a semicircle superimposed on a straight line. The control conductor V is identified by a straight line at right angles to the gate conductor W and bisecting the diameter of the semicircle.

Figure 4B:
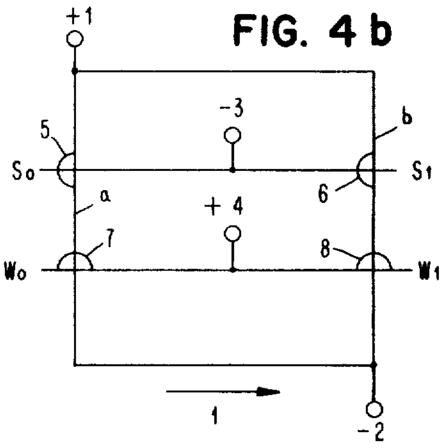

For example, refer to FIGURE 4*b* which shows a two state storage device and its associated input and output circuits. The storage device consists of curent source +1, current sink −2, and two paths between the source and sink labeled *a* and *b*. Current flowing through path *a* represents a 1 in storage whereas current through path *b* represents a 0 in storage.

To store a 0, current is put on the $S_0$ line and no current on the $S_1$ line. This makes cryotron 5 resistive and leaves cryotron 6 superconductive. Thus the current from source +1 is directed through path *b* to current sink −2. Once the current from source +1 is established in path *b*, the current on line $S_0$ may be removed. However, the current on line *b* will continue to flow and no current will flow on line *a* even though line *a* is now superconductive.

To sense the state of the bistable storage device of FIG. 4*b*, current is applied to node +4. With current on the *b* line of the storage device, cryotron 8 would be resistive and cryotron 7 superconductive. Thus the current at node +4 would be directed through path $W_0$ indicating a 0 stored. If superconducting current had been flowing in path *a*, indicating a stored 1, cryotron 7 would be resistive and current entering at node +4 would be directed through path $W_1$, indicating the reading of a 1.

Adding another path to the storage device, as shown hereinafter, would make it a three stage storage device. The input and output circuits would use the same principles as the two state device.

In illustrating the invention, "+" and "−" signs have been used to designate the connections to a current source, but the actual polarity of the connections of each source and sink may be interchanged. Also, many separate pairs of "+" and "−" signs are shown, but these separate circuits may be connected in series to a single common source. To retain constant input current during switching operations where slightly different characteristics of cryotrons would cause transient conditions, an inductance may be connected in series between outputs and inputs of the circuits to be described.

The memory circuit details will be discussed in three sections:

(1) Memory Controls
(2) Interrogation, Read, Write Operations
(3) Range Retrieval

(1) Memory controls

The explanation of the memory controls will be oriented around the external memory control switches by which the rest of the computing system communicates with the associative memory system. Such memory control switches can be actuated by programmed instruction words through circuits not shown. The reasons for the switches and how they affect the rest of the memory control circuits will be discussed hereinafter.

(A) *Timing signal switch*

The Timing Signal (TS) switch (Section 2C) generates the TS on the TS off signals which provide the clocking for the associative memory system. During the TS off time, information may be stored in the Ternary Counter (FIGS. 2A and 2B), Entry Register, and Select Register (FIGS. 2G and 2H) through their corresponding input switches and character Select Matrix. Also, an interrogation of the Word Registers (FIGS. 2J,, 2K, 2M and 2N) is performed by an ever-present comparison current and the Select Bits (FIGS. 2L and 20) of the memory controls are set according to the type of operations desired. If the Select Bit of a word is set to 1 during the TS off time, then during the following TS on time that Word Register will be available to either enter information from the Entry Register or exit information to the output circuits. During the TS on time, the memory entry or exit information is actually performed, and in the case of a sort operation, the Ternary Counter is advanced. In summary, one TS off signal followed by one TS on signal constitutes one memory cycle or memory access.

Since the TS on and TS off lines affect so many circuits, it will be desirable to discuss the details of these lines as we discuss the other circuits. It would, however, at this time be helpful to trace the TS on and off lines through the associative memory system starting from the TS switch and ending at the current sink −11 shown at the bottom of FIGS. 2C and 20. TS on and off lines pass through cryotrons 513, 514 . . . 477, 484, 546, 548, to establish four memory control conditions, then traverse the Entry Register and Select Register to permit entry of information into those registers, proceeds downward through the Word Registers to provide appropriate timing for them, and the TS on line ends in sink −11. The TS off line retraverses all the Word Registers in memory to provide current for the count lines of the Match Indicator circuits prior to ending in the same sink −11. Each of the four memory control conditions has its own pair of TS on and TS off lines for carrying out the logic of the present memory controls and Ternary register.

(B) *Mark and Mark Reset switches*

The Mark switch (FIG. 2C) is set to on when it is desired to mark a selected word. By definition a word may be marked during TS on time if its Select Bit is set to 1 (see Operation Switch) and there is no current on the Mark Reset on line. A marked word has its Mark Bit (FIGS. 2L and 20) set to 1 which inhibits further selection of that word during subsequent TS off times. In other words, any current appearing on the Equal Line (see Word Register 1 controls) during a memory interrogation (TS off time) will pass through the gate of cryotron 32 (see FIG. 2L) the control of cryotron 40 setting its associated Equal Bit to 1, and then through the gate of cryotron 44 to the Matched Line if the Mark Bit is set to 0. If the Mark Bit is set to 1, the current on the Equal TS off line would pass through the gate of cryotron 46 to the No Matched line. With this feature, a group of multiple like tagged words may be retrieved by selecting and marking one word per memory cycle.

The Mark Reset switch (FIG. 2C) provides for the resetting to 0 of those Mark Bits, during TS on time, whose corresponding Equal Bits (FIG. 2L) has been set to 1 during the previous TS off time. There are three positions to this switch: on, off and automatic. The on and off positions are obvious, but when the switch is in the automatic position the current from source +9 will pass through the gates of cryotrons 184, 186, 188 and 192 to the Mark Reset on line if the Match Indicator=1 and the Mark switch is on. For any other condition, the current from source +9 passes through either the gate of cryotron 190 or 194 to the Mark Reset off line. The purpose for the automatic position of the Mark Reset Switch is so the Mark Bits of multiple like-tagged words may be reset automatically when the last word of a group of multiple like-tag words is retrieved and the Mark Switch is set on.

The setting or resetting of the Mark Bits takes place during TS on time. Refer to the control circuits for Word Register 1 shown in FIG. 2L. Since the control circuits for each word are almost identical, only the details of Word Register 1 control circuits will be described as exemplary of similar control circuits. The current on either the Equal or Unequal line is directed on to the TS on line going through either the gate of cryotron 36 or 38 during TS on time. With current on the Mark Reset on line and with the Equal Bit set to 1, the current on the TS on line will pass through the gates of cryotrons 150 and 154 and through the control line of cryotron 156 resetting the Mark Bit to 0. In all other conditions, the current on the TS on line will either pass through the gate of cryotron 148 or cryotrons 150 and 152 and not affect the setting of the Mark Bit. Note, in all cases, the current appears at node 106.

The TS on current from node 106 goes up and is directed into one of four lines labeled *a*, *b*, *c* and *d*. The current will appear on line *a* if the Select Bit is in the 0 state, for cryotrons 92, 98 and 102 will be resistive while cryotron 86 will be super-conducting. The current on line *a* goes into current sink −17 without going through the Entry or Exit circuits. Note, however, any current on either line *b*, *c* or *d* will appear on the Select, TS on line which connects to the Exit and Entry lines going into the Word Register 1. The TS on current will be on the *b* line going through the gates of cryotrons 88, 92 and 94 only when there is current on the Mark on line, the Mark reset off line, and the Select Bit is 1. The current on the *b* line makes cryotron 90 resistive, thus setting the Mark Bit to 1. Any current on line *c* or *d* does not affect the Mark Bit; the purpose for these lines is to direct the current from node 106 over to the Select, TS on line when the Select Bit is 1 and the Mark Bit is not to be marked.

(C) *FIFO switch*

The FIFO switch (FIG. 2C) is set to on when a first-in-first-out entry operation is desired. When this switch is on, the memory controls will condition the first vacant Word Register after the last matched Word Register to accept the information contained in the Entry Register.

Current flowing down the FIFO on line makes the gate of cryotron 48 resistive (see Word Register 1). Thus during TS off time, the current coming from the left on the Equal line through the gate of cryotron 32 is directed through the gate of cryotron 50 to the control of cryotrons 54, 60, 66 and 72 and on to the No Select line where it sets the Select Bit to 0 by making the gate of cryotron 84 resistive. The reason for making the gate of cryotron 54 resistive is in order to maintain the current coming down the Select 1st Matched line (see Operation Switch) so that it may be used further down the line to set up the 1st vacant Word Register after the last matched Word Register. Cryotrons 60, 66 and 72 are part of the Match Count circuits and direct the TS off current coming up the 0, 1 or 2 Count line to the next higher count line through the gates of cryotrons 62, 68 or 74. (See Match Indicator.)

Current on the FIFO on line also makes the gates of cryotrons 116 and 118 resistive. This allows the output of each Word Register Vacancy Bit to set its corresponding Select Bit. Current coming in from the left on the Vacancy Bit=0, TS off line (indicating a vacant Word Register; for example, the Vacancy Bit of its corresponding Word Register will be in a 0 state, causing cryotron 182 to be resistive and cryotron 180 to be in its superconductive state) will pass through the gate of cryotron 120, and with current on either the 1, 2 or P Equal Count line, the *VB*=0, TS off current will control cryotron 126 and proceed through the gate of cryotron 132 to the FIFO No Select Line where it sets the Select Bit to 0 by going through the control of cryotron 144. With cryotron 126 resistive, the current on the Select 1st Matched line is prevented at this point from going over to the No Select line. If the word were after all matched words, then there would be current on the 0 Count line of the Match Indicator circuit through the control line of cryotron 132, and the current coming in on the *VB*=0, TS off line would go through the gate of cryotron 120, through the control of cryotron 124 (directing the current from the Select 1st Matched line over to the No Select line) and through the gates of cryotrons 134, 136 and 138 to the FIFO Select line, indicating a vacancy word after the last matched word. The first vacant word after the last matched Word Register is defined as that word whose control circuits have current on both the FIFO Select line and Select 1st Matched line. If this condition exists, then the current on the FIFO Select line will pass through the gate of cryotron 140 to the control of cryotron 146, setting the Select Bit to 1 and then to sink −8. For all other conditions, during FIFO on, TS on time, the current will appear on the FIFO No Select line.

Also with the gate of cryotron 118 resistive, the current coming in on the *VB*=1, TS off line will pass through the gate of cryotron 122 and the control of cryotron 130 to the FIFO No Select line where it sets the Select Bit to 0 in going through the control of cryotron 144.

With current coming down the FIFO off line, cryotrons 50, 120 and 122 will be resistive. Thus current on the Equal TS line would pass through the gate of cryotron 48 and the controls of cryotron 40, 52, 58, 64 and 70. With cryotron 52 resistive, the current coming down the Select 1st Matched line will be diverted to the No Select line which indicates to the Word Registers below that a matched word has been found. Cryotrons 58, 64 and 70 perform the same operation as the previously discussed cryotrons 60, 66 and 72. The current coming in on the *VB*=0 or *VB*=1 TS off lines will be respectively passed through the gates of cryotrons 116 and 118 to the FIFO off line to sink −8. Current on the FIFO off line makes cryotron 128 resistive thus preventing current from the Select 1st Matched line from passing over to the No Select line.

(D) *Operation switch*

The Operation switch (FIG. 2C) indicates whether the associative memory system is to perform an entry into all matched Word Registers, an entry into the 1st matched Word Register, an exist, or a sort operation. Note that the four operation lines merge to form the Entry and Exit lines which continue down through the memory becoming the controls for cryotrons 340, 342, 176, 178 (FIG. 2L), 278, 280, 282 and 284 (FIG. 2M), ending at current sink −23.

Current source +13 shown in FIG. 2C provides current for either the Select 1st Matched, No Select, or Enter All line depending upon the state of the Match indicator, the Operation Switch, and the lowest ordered bit of the Ternary Counter, the latter being pertinent only during a sort operation.

If the Operation Switch is in the Entry All position and the Match Indicator is in either the 2 or P state, current from source +13 will flow through the path consisting of the gates of cryotrons 234, 232, 216, 214 and 212 to the Enter All line.

If the Operation Switch is in the Sort Position and the Match Indicator in the 1 state, the path from source +13 through the gates of cryotrons 240, 238, 236, 230 will continue to the Select 1st Matched line. With the Match Indicator in the 2 or P state and the Operation Switch in the Sort Position, current will flow through the gates of cryotrons 234, 232, 222, 220 and 18 on to the Test Low Order Bit line where it goes into the right most Ternary Bit position of the Ternary Counter (FIG. 2B).

The Ternary Counter is designed so that the right-most bit position is always the lowest ordered bit position of the sorting field. Thus we have an indication of multiple like tags when this low order position is in either the 0 or 1 state and the Match Indicator is in the 2 or P state. So with the 1st ternary position in the 0 or 1 state, the current coming in on the Test Low Order Bit line will be directed on to the Select 1st Matched line through the gate of cryotron 252 (FIG. 2B) to cause the first of the multiple like sorting keys or tags to be selected by actuating the appropriate select bit of a word register. Had the last ternary position been in the M state, the current coming in on the Test Low Order bit line would have been directed over to the No Select line through the gates of cryotrons 248 and 250.

It should be noted that there will be current from source +13 on only one of the three lines, namely, the Select 1st Matched, No Select, or Enter All lines when the Match Indicator is in the 1, 2 or P state. There will be no current on these lines when the Match Indicator is in the 0 state for the current from current source +13 will be directed through the gates of cryotrons 246, 244, and 242 to the current sink −15. Also note the current sink −15 at the bottom of FIG. 20 and pay particular attention to the No Select indicator that will communicate with the rest of the computing system.

Current coming down the Select 1st Matched line makes cryotrons 142 and 87 resistive (FIG. 2L, Word Register 1) and indicates there have been no previous matched words. A matched word (current on the Matched line or on the FIFO Select line) directs the current on the Select 1st Matched line over to the No Select line by making cryotrons 52 or 124 resistive. Current on the No Select line prevents any matched word from becoming selected by making cryotrons 140 and 180 resistive. It is important to note that for a given word, the point at which the current is directed from the Select 1st Matched line to the No Select line is below the circuits, i.e., cryotrons 76 and 78, or 140 and 142, that are used to test whether this word is a 1st matched or 1st vacant Word Register. Current on the Enter All line allows all matched words to be selected for subsequent simultaneous entry into the Word Registers by making cryotron 76 resistive.

When there is current on the Select 1st Matched line, the current on the Matched line is directed through the gate of cryotron 80 and through the control of cryotron 82 setting the Select Bit to 1. When the Select Bit is set to 1 during the TS off time, the word associated with that set Select Bit is thereby conditioned, ready to enter or exit information during the following TS on time.

With current on the No Select line, the current on the Matched line will pass through the gates of cryotrons 76 and 78 setting the Select Bit to 0 by going through the control of cryotron 84, preventing the entry of exit of information on the following TS off time. Also note any current on the FIFO Select line would be directed over to the FIFO No Select line through the gate of cryotron 142, setting the Select Bit to 0 by going through the control of cryotron 144.

(*E*) *Enter Ternary Counter Switch*

The Enter Ternary Counter Switch (FIG. 2B) has three positions; The Reset (R), the Tag (T) and the Normal (N) position. In order to guarantee at the start of a sort operation that all controlling bits are in the reset state and that all positions of the Ternary counter are in the mask state, the Enter Ternary Counter Switch is set to the R position for only the first TS off time, after which it is set to the N position. With the Enter TC switch in the R position, the TS off current from current source +41 (FIG. 2C) is directed on to the Reset line and then through the controls of cryotrons 539 and 543 setting a Duplicate Bit D to the Reset (R) state, through the controls of cryotrons 612 and 613 setting the P2 Bit and P2 Echo Bit to their respective 0 states and through the control of cryotron 518 (FIG. 2B) setting the Sort Bit to 0. This guarantees that these bits will be set to the proper states at the start of a sort operation.

Refer to Bit N of Character 1 of the Ternary Counter and note that the current on the Reset line makes cryotrons 568 and 569 resistive, thus establishing superconducting current on the M line. Likewise, all of the other positions of the Ternary Counter are set to the M state. The current on the Reset line then comes back through Check Bits setting them to 0 prior to entering sink −43. See cryotron 570 of the Check Bit 1 of Character 1 (FIG. 2B). Refer also to FIG. 2C and note that there will be current on the Reset line coming from source +41 through the gate of cryotron 546 only during TS off time. At TS on time, the current will be directed through the gate of cryotron 548 to current sink −43.

If it were desirable to start sorting from a given tag, then this tag would have to be put into the Ternary Counter, and the Enter Ternary Counter switch would have to be set to the T position for the 1st TS off time. With the Enter TC switch in the T position, the TS off current will be directed to the Tag input line. The current on the Tag input line goes through the control line of cryotron 516 and sets the Sort Bit associated with cryotron 516 to 1 and transfers the information from the TC Input switches to their corresponding ternary position. For example, refer to Bit *n* of Character 1 and note that if its TC Input Switch were set to 0, then the current on the Tag Input line would pass through the gates of cryotrons 558, 559 and then through the controls of cryotrons 564 and 565 establishing current on the 0 line of its corresponding Ternary Counter position. The setting of the TC input switches is controlled by information coming from other parts of the computing system such as an Accumulator or Memory Buffer Register, not shown. The reason for setting a Sort Bit to 1 when starting a sort from a given tag is because it is not necessary to find the high order position at the start of this sort, as will be made more evident in describing a sorting operation hereinafter.

(2) Interrogation, read, write operations

A memory interrogation involves the following registers: Entry Register, Select Register, and the Word Registers (FIGS. 2G, 2H, 2J, 2K, 2M*n* and 2N). However, for the sake of emphasis on the unique attributes of the present system, attention will be concentrated hereinafter on the Word Registers in this section of the description.

The Entry Register consists of the flip-flops labeled E, the Mask switches, and Data-Tag Input Switches. Information to be interrogated and/or stored in the memory is first brought into the Entry Register in the following manner. During TS off time, the current on the TS off line makes cryotron 2 (see FIG. 2G) resistive. Since all bits of the Entry Register (FIG. 2G) are almost identical, only Bit 1 of Character 1 of that register will be discussed. This allows the current source +1 to travel through the Data-Tag switch to set an E flip-flop to a "1" or "0" depending upon the position of the switch. If the switch were set to "0," then the current from source +1 would bo through the "0" side of the switch and make cryotron 4 resistive. With cryotron 4 resistive, current from a source +S will be established down the right path of flip-flop E, indicating a "0" stored. The current from source +1 then continues down the TS off, I line to perform the memory interrogation.

The current on the TS off, I line is directed onto either the Mask or No Mask line going through the gate of cryotron 10 or 6 depending upon whether the Mask switch is set respectively to the Mask (M) or Compare (C) position. Note that there is only one Mask switch per character, except for the Vacancy and Miscellaneous Bits, which are individually controlled. Current coming down the No Mask line goes into an E flip-flop and out through either the 0 or I compare line through the gates of cryotrons 11 or 13 depending respectively upon whether the E flip-flop is in the 0 or 1 state. Current coming down either the Mask, 0, or 1 compare line feeds into the Select Register.

The Select Register is made up of the binary flip-flops labeled B, the ternary flip-flops labeled T, and the input switches having three positions respectively labeled the Entry-Exit (E—E), Sort (S) and No Entry (NE) positions. Referring to flip-flop T for character 1, the input circuit starts with current source +25 and ends at current sink −27. For example, with the Entry-Exit Switch in the E—E position during TS off time, current from source +25 will pass through the gate of cryotron 15 and make cryotrons 17 and 19 resistive. This will establish current on the Entry-Exit line of flip-flop T. With flip-flop T in the Entry-Exit state, current coming down the Mask, Compare 0, or compare 1 line will respectively pass through the gates of cryotrons 7, 8, or 9 to the compare M, 0, or 1 line. If the flip-flop T were in the Sort state, then the comparing current from the entry register would have been by-passed into the current source line $S_{11M}$ by going through the gates of cryotrons 29 and 31, 33 and 35, or 37 and 39. Note that the current on line $S_{11M}$ then goes up and into the Character Select Matrix to select which position of the Ternary Counter is to be used to interrogate the character position in memory, which in this case is taken to be character position number 1. Note also that the flip-flops labeled B do not affect the currents of the comparing circuits coming from the Entry Register because there is no sorting provided for these bit positions.

Referring now to FIGS. 2J, 2K, 2M and 2N, these are made up of the 16 figures: 2J1, 2J2, 2J3, 2J4, 2K1, 2K2, 2K3, 2K4, 2M1, 2M2, 2M3, 2M4, and 2N1, 2N2, 2N3, 2N4, in which the associative memory embodying the principles of the present invention is depicted. The associative memory comprises a plurality of word registers, namely Word Register 1 depicted in FIGS. 2J1, 2J2, 2K1 and 2K2, and other representative word registers, namely Word Register N–2, Word Register N–1 and Word Register N, as designated in the other figures of this group of 16 figures. Each Word Register includes an interrogation control circuit, each of these control circuits for its word register being shown in dotted blocks and designated 10*x*, 12*x*, 14*x* and 16*x* for Word Register 1, N–2, N–1 and N respectively. Each word register includes 6 bit positions designated (at the bottom of FIGS. 2M4, 2M3, 2N4 and 2N3) Vacancy Bit, Miscellaneous Bit, Bit 1 and Bit N of the characters 1 and N. Additionally, the Range Bit is depicted for each Word Register in FIGS. 2K2, 2K3, 2N2, 2N3. Each of these 7 bit positions includes a plurality of storage circuits as follows: 20*x*, 22*x*, 24*x*, 26*x* (Vacancy Bit); 28*x*, 30*x*, 32*x*, 34*x* (Miscellaneous Bit); 36*x*, 38*x*, 40*x*, 42*x* (Bit 1 of Character 1); 44*x*, 46*x*, 48*x*, 50*x* (Bit N of Character 1); 52*x*, 54*x*, 56*x*, 58*x* (Bit 1 of Character N); 60*x*, 62*x*, 64*x*, 66*x* (Bit N of Character N); 68*x*, 70*x*, 72*x*, 74*x* (Range Bit).

Associated with each bit position is an interface logic arrangement shown at the top of FIGS. 2J1, 2J2, 2K1, 2K2. The individual interface logic circuits for the previously noted 7 bit positions are designated 76*x*, 78*x*, 80*x*, 82*x*, 84*x*, 86*x*, 88*x*, respectively. Although only 4 registers have been shown in this group of 16 figures, 2J1 . . . 2N3, it is understood that in practice many additional registers are employed in an associative memory using the same or additional bit positions in each register.

The interface logic circuits are identical for all bit positions except for the first position, that is, for the Vacancy Bit. In the Interface logic circuit 76*x* associated with the Vacancy Bit, logic is not provided for reading the state of the Vacancy Bit position. In comparison with logic circuit 76*x*, taking the Miscellaneous Bit as typical, there is additionally provided a control arrangement for executing a read operation. This control arrangement comprises the portions 90*x* and 92*x* shown in the dotted boxes in FIG. 2J1.

The interface logic is controlled by a plurality of switches, one of which is designated interrogate-write switch 94*x*, and a read-reset switch 96*x* (FIG. 2K2).

It should be observed that for each bit position there are 6 input-output lines, 3 of these lines grouped together and labeled Compare, and the other 3 being grouped together and labeled entry-exit (E—E). These lines, of course, communicate with the other parts of the system as illustrated in the overall diagram of FIG. 5. In operation, reading or writing in the memory is preceded by an interrogation. This involves searching the memory to determine the Word Register or Registers having information stored in them which satisfies the established criteria. The criteria determine the words to be interrogated and the range of the information that is sought in each word. During a memory interrogation for range identification the Range Bit is changed to reflect the state of each Word Register. Associated with each Word Register is a Range Bit which is set to "1" at the start of a Range Retrieval operation, to be described. As the Range Retrieval operation is executed the state of the Range Bit will be set to reflect whether its corresponding Word Register is within the desired range.

To perform the interrogation, the interrogate switch 100*x* (see FIG. 2J1) is set to its "on" position and interrogate-write switch 94*x* (see FIG. 2K2) is also set to its "on" position. When switch 100*x* is in its "on" position, current flows from the positive supply 102*x*, causing cryotrons 104*x*, 106*x*, 108*x* and 110*x* to go resistive. This results in current from sources 112*x*, 114*x*, 116*x* and 118*x*, being allowed to flow onto the equal compare lines 120*x*, 122*x*, 124*x*, 126*x* respectively. Once the current is established on the equal compare lines, 120*x*, 122*x*, 124*x*, and 126*x*, the interrogate switch 100*x* can be set to the "off" position making cryotron 104*x*, 106*x*, 108*x* and 110*x* superconductive. The current on the lines 120*x*, 122*x*, 124*x*, and 126*x* will continue to flow because the compare cryotrons on these lines are normally in the superconductive state. Placing switch 94*x* in the "on" position permits current from the positive supply 102*x* to be directed into the interface logic circuits for each of the bit positions via lines 126*x* and 128*x*.

Referring again to FIG. 2J1, there will now be discussed the details concerned with converting the Compare and entry-exit (E—E) input signals to the desired signals required to control the associative memory cells. Attention will be concentrated on the Vacancy Bit position and the Bit 1 position of Character 1 for the sake of clarity and simplicity.

To interrogate or write a "0" into the associative memory cell comprising the storage circuit 52 for the Vacancy Bit, a negative current is required on the input line 130*x*, as indicated by the arrow in FIG. 2J1. To interrogate or write a "1" into the associative memory cell, a positive current is required on the input line 130*x*. When the given bit position is to be masked out from entering either an interrogation or write operation, no current is required on the input line 130*x*.

It is the purpose of the aforenoted interface logic to convert the incoming Compare and entry-exit (E—E) signals to a form suitable for this particular associative memory cell. The relationship that should be established between the incoming signals into this interface logic and the required output signals leaving the interface logic is shown in Table I below. In Table I a "0" represents no current, a "1" represents positive current and a "—" represents negative current on the bit input lines (W Line and Input Line).

TABLE I

| Interface Inputs | | Interface Outputs | |
|---|---|---|---|
| Compare | Entry | W Line | Input Line |
| M01 | 01N | | |
| 000 | 001 | 0 | 0 |
| 000 | 010 | 1 | 1 |
| 000 | 100 | 1 | — |
| 001 | 000 | 0 | 1 |
| 010 | 000 | 0 | — |
| 100 | 000 | 0 | 0 |

For example, let use assume we want to interrogate the Vacancy Bit position with a "0." Under these conditions a "0" signal will appear on the Compare input line 132*x*. (Top of FIG. 2J1). This signal will cause cryotrons 134*x* and 136*x* to be resistive. With cryotrons 134*x* and 136*x* resistive, the current coming from the interrogate-write switch 94*x* (FIG. 2K2) will be directed onto line 138*x*, causing cryotrons 140*x*, 142*x* and 144*x* to be resistive. With cryotrons 140*x*, 142*x* and 144*x* resistive, the current from source 146*x* will flow through cryotrons 148*x* and 150*x*, resulting in a negative current on input line 130*x*. This input signal going into the interface logic and the resulting output signal going into the bit input line 130*x* is shown on line 5 of Table I. In like manner, the other signals representative of the other input conditions for the interrogation of the Vacancy Bit positions and other bit positions will be directed from their respective Compare and E—E lines onto their respective bit input lines.

To interrogate a given associative memory cell with an "0," "1" or mask condition, a negative, positive or absence of a current respectively, is required on the cell's corresponding input line. For example, as before, let us assume it is desired to interrogate the Vacancy Bit position for a "0" condition. Now, further assume that the Vacancy Bit position is currently storing a "0" bit of information. The counter-clockwise current, representing a "0," that is circulating in an associative memory cell 20*x* (see FIG. 2J1) is not sufficient to cause the compare cryotron 160*x* to be resistive. Therefore, the current that was originally established on the equal compare line, for example, equal compare line 120*x*, by manipulation of the interrogate switch 100*x*, will remain on that equal compare line until a mis-match occurs during a memory interrogation. When interrogating for a "0," a negative current, as noted before, is established on the input line 130*x* and this negative current, in coincidence with the counter-clockwise current already established in cell 20*x*, results in no current flowing around the left hand position of cell 20*x*. Thus, the compare cryotron 160*x* will remain superconductive.

If, on the other hand, a "1" had been stored in the associative memory cell 20*x*, a clockwise circulating current would have been established within that cell. Since interrogation is being performed with a "0" signal, that is, as previously noted, with a negative signal on input line 130*x*, the coincidence of this negative input signal and the clockwise circulating current within cell 20*x* will result in a current flowing down the left half of 20*x* sufficient to cause the compare cryotron 160*x* to become resistive. With cryotron 160*x* thus made resistive, the current previously established on the equal line 120*x* will be directed to the unequal line 162*x*, thereby indicating a mis-match condition. It should be observed that if no current is placed on the input line, the persistent circulating currents in the corresponding associative memory cells are not sufficient to cause the compare cryotrons therein to go resistive. Hence these associative memory cells will not introduce a comparison operation.

This interrogation of the associative memory results in putting a current on either the equal or unequal compare lines, such as lines 120*x* or 162*x*, FIG. 2J1, to indicate whether a particular word in the memory was a match or mis-match. If a particular word in the memory matched the interrogating information, a current would appear on the equal compare line for that word. If the word did not match the interrogating information, a current would appear on the unequal compare line for that word. The currents on the equal or unequal compare lines are inputs to the word control logic as described in the section on memory controls. (See FIG. 2L1.)

In order to accomplish the write operation, the interrogate-write switch 94*x* is set to the "on" position. The setting of the switch 94*x* to the "on" position results in converting the write input signal coming into the interface logic to the required write input signal for writing into the associative memory cells. From the word control logic there will be established a current on the entry line corresponding to the word register to be written into. For example, let us assume it is desired to write into Word Register 1, shown in FIGS. 2J1, 2J2, 2K1, 2K2. Then there would be a current on the entry line 152*x*. In addition, for each bit position there will be a signal on the incoming entry-exit (E—E) lines to indicate whether that position is to be written with a "0," a "1," or is to be masked from the writing operation. For example, let us assume we want specifically to write a "1" into the Vacancy Bit position of Word Register 1. Referring to FIG. 2J1, there has been established a current as noted above on the entry line 152*x*. There will also be a positive current on the input line 130*x* (opposite to the negative current shown by the arrow), and a current on the W line 154*x*. The coincidence of the currents on the lines 154*x* and 152*x* will cause the write cryotron 156*x* to become resistive. With cryotron 156*x* resistive, the positive current on input line 130*x* will be directed around the right half of cell 20*x*. Having established this positive input current aound the right half of cell 20*x*, the current on the entry line 152*x* is taken away. This causes cryotron 156*x* to become superconductive. However, the current already established around the right half of cell 20*x* will continue to flow as established. Now, when the current established on the input line 130*x* is taken away, the electromagnetic field established around cell 20*x* will result in a clockwise persistent current flow within that cell. This clockwise persistent current, of course, represents a "1" stored in the associative memory cell 20*x*. In similar fashion, except for using a negative current on the input line 130*x*, a "0" can be stored in associative memory cell 20*x*.

To perform the read operation, the read-reset switch 96*x* (see FIG. 2K2), is set to the "on" position. This introduces a current onto the read-reset line 184*x* which markes cryotrons 186*x*, 188*x*, 190*x* 192*x*, 194*x* and 196*x* resistive. It should be noted that the read-reset line does not enter the Vacancy Bit position because this position is designed to have the ability to be changed while doing a memory read operation. For example, setting the Vacancy Bit to "0" ($VB=0$ indicates a vacant register) while reading a word results in doing a destructive read operation.

Refer now to Bit 1 of Character 1 in FIG. 2J2. With cryotron 194*x* resistive, the current from source 198*x* (top of FIG. 2J2) will be directed onto the bit sense "1" line 200*x*. Once the current has been established on the bit sense "1" line, the read-reset switch 96*x* is set to the "off" position making the bit sense "0" line superconductive. Turning the read-reset switch "on" then "off," primes the memory for the read operation.

Once the memory is primed for the read operation, a current traveling from right to left is established by the word control logic on the exit line of the desired word to be read. Let us assume that it is desired to read the information contained in Word Register 1. Refer to FIG. 2J2 and assume a current is traveling from right to left on the exit line 204*x*. Refer again to Bit 1, Character 1, of Word Register 1, which is represented by cell 36*x*. A clockwise circulating current, representing a "1" in this cell 36*x*, in coincidence with the current on the exit line 204*x*, will not make the read cryotron 206*x* resistive, since these currents are opposed in flowing through cryotron 206*x*. Thus, the current established on the bit sense "1" line remains flowing. If a counter-clockwise circulating current representing a "0" is stored in cell 36*x*, the coincidence of this stored current and the current on the exit line 204*x* will make the read cryotron 206*x* resistive, thereby directing the current on the bit sense "1" line to the bit sense "0" line.

The current established on either the bit sense "0" or bit sense "1" line will direct the entry-exit current onto either the exit "0" line 208*x* or the exit "1" line 210*x* under control of the cryotrons 212*x* and 214*x*. The currents of these exit lines can then be sensed by means of the sensing mechanisms 216*x* and 218*x* to read the state of Bit position 1, Character 1, of the selected word.

(3) Range Retrieval

Although the RAMOR system of the present invention can provide an ordered retrieval of information, the detailed procedure of such operation has been completely described before in patent application Ser. No. 163,233, now Patent 3,249,921. Rather, attention here will be focused on the novel aspects of the Range Retrieval operation.

However, before describing this Range Retrieval feature, it is considered useful to note briefly the nature of the RAMOR Sort. The RAMOR Sort differs from the AMOR Sort only in the way the Ternary Counter is advanced. In the RAMOR Sort, after each interrogation, the operating position is advanced. The state of the Match Indicator is not taken into consideration. The modification to the AMOR Ternary Counter required to introduce this RAMOR Sort is now described.

In FIG. 2C2 there is depicted a RAMOR position which has been added to the operation switch. When the operation switch is in this RAMOR position, current from the source will cause cryotron 500A to become resistive. Therefore, current from source +37 (far right of FIG. 2C2) will flow during TS on time through cryotron 514 onto line 500B and thence through cryotrons 501A, 502A, 503A and 504A. Line 500B becomes the advanced operating position line (see FIG, 2C1). Advancing the operating position is performed in the normal manner. The result of this modification is that every time the operation switch is in the RAMOR position and the time signal switch is in the "on" position, the operating position of the Ternary Counter position will be advanced.

Referring now to FIG. 2B2, the range switch is herein designated the RAMOR switch. This RAMOR switch controls some logic in the storage section, i.e., the Word Registers, previously described. When the RAMOR switch, shown in FIG. 2B2 is set to the "on" position, the current on the RAMOR "on" line will make cryotrons 170*x*, 172*x*, 174*x* and 176*x*, in FIGS. 2K2, 2K3, respectively, resistive. Thus, any current on the equal lines would be directed to the Range Bits, resulting in a change for these Range Bits. During the RAMOR operation this change for the Range Bits will result in setting the Range Bits to the "0" state. A normal writing operation is required to set these Range Bits to the "0" state.

Thus, to obtain a retrieval of words whose values lie between the value X and the value Y, the following procedure is carried out.

(a) In the first step, all Range Bits corresponding to the data words of interest are set to "1." (It will be remembered that there is a Range Bit for every Word Register.) This involves interrogating the memory with a tag that uniquely identifies the data of interest and selectively writing a "1" into the Range Bits of the matched words.

(b) In the second step a descending RAMOR Sort is performed starting with the value X and setting to "0" the Range Bits of all those data words that match. To do this, the value of X is placed in the Entry Register and interrogations are made, starting with the value of X of all words in the memory. After each interrogation, the RAMOR switch (FIG. 2B2) is set to the "on" position. With the RAMOR switch in the "on" position, as noted before, the current on the equal compare lines is directed into the Range Bits where it is used to set them to "0."

(c) In the third step, an ascending RAMOR Sort is executed starting from the value Y and setting to "0" the Range Bits of all words that match. To do this, the value Y is placed in the Entry Register and interrogations are made, starting with the value Y, of all words in the memory. Again, after each interrogation the RAMOR switch is set to the "on" position.

It should be noted that in the second and third steps of the operation described above, when the RAMOR switch is set to the "on" position, it introduces a resistive path on the equal lines, such as equal line 120*x* (FIG. 2K2). The current already established on such an equal line then has two alternative superconductive paths to follow, namely, the unequal compare line and the line controlling the Range Bit write cryotron (such as unequal compare line 152*x* and the line 182*x* as shown in FIG. 2K2). However, line 182*x* is designed to have less inductance than the unequal line 162*x*; therefore, the majority of the current previously established on the equal compare line 120*x* will be directed to line 182*x*. The current thus directed onto the line 182*x* will be sufficient to control the Range Bit write cryotron 180*x*.

At the end of this ascending RAMOR Sort (third step) the Range Bits that are set to "1" identify those words whose values fall between the values X and Y.

(d) The fourth and final step involves the read out of all data words of interest whose Range Bits have been set to the "1" state. To do this, mask compare signals are put on all of the bit input compare lines, except for the Range Bit where a "1" compare signal is established. The associative memory is then interrogated with these input compare conditions and all words having a "1" in their corresponding Range Bit position are identified. These identified words are then read out by means of a normal sequential read operation.

ALTERNATIVE EMBODIMENT

The principles of the present invention can also be embodied in a solid state semiconductor technology. As was pointed out in the beginning of the specification, such semiconductor technology takes advantage of the recent developments in monolithic circuit techniques. However, in order to implement a fully associative memory by such techniques the individual cells must be simply constructed and the interconnection patterns which permit connecting a plurality of such devices in suitable electrical configurations must not restrict the extremely close packing that is possible with monolithic techniques.

The alternative embodiment then advantageously utilizes the monolithic memory cells and systems as described in previously filed patent application Ser. No. 514,568, W. D. Pricer, filed Dec. 17, 1965.

For the sake of simplicity and clarity, the present embodiment is directed principally at the Range Retrieval operation to be performed, and more particularly, will describe the specific control circuitry as that circuitry is used in connection with an associative memory modeled on that described in the aforesaid patent application.

Referring now to FIG. 6, a 3 x 3 matrix is illustrated, comprising a plurality of memory cells 1000, 1010, 1020, 1030, 1040, 1050, 1060, 1070, 1080. This 3 x 3 matrix is in most respects identical with the 2 x 2 matrix illustrated in patent application Ser. No. 514,568, except that for purposes which will be apparent hereinafter, the various bias and signal sources, as well as sense amplifiers, have not been shown connected to the several lines, that is, the word drive line, word sense line, bit test "0" line, bit test "1" line.

Each of the memory cells in the 3 x 3 matrix of FIG. 6 incorporates two storage transistors in a latch circuit and includes an output transistor whose output is connected to a word sense line, also known as a match line. A typical one of these memory cells has been shown in detail within the box representing the cell 1000. As will be appreciated, for this particular memory cell configuration, 4 lines are required to each cell as shown in FIG. 6.

Figure 3:
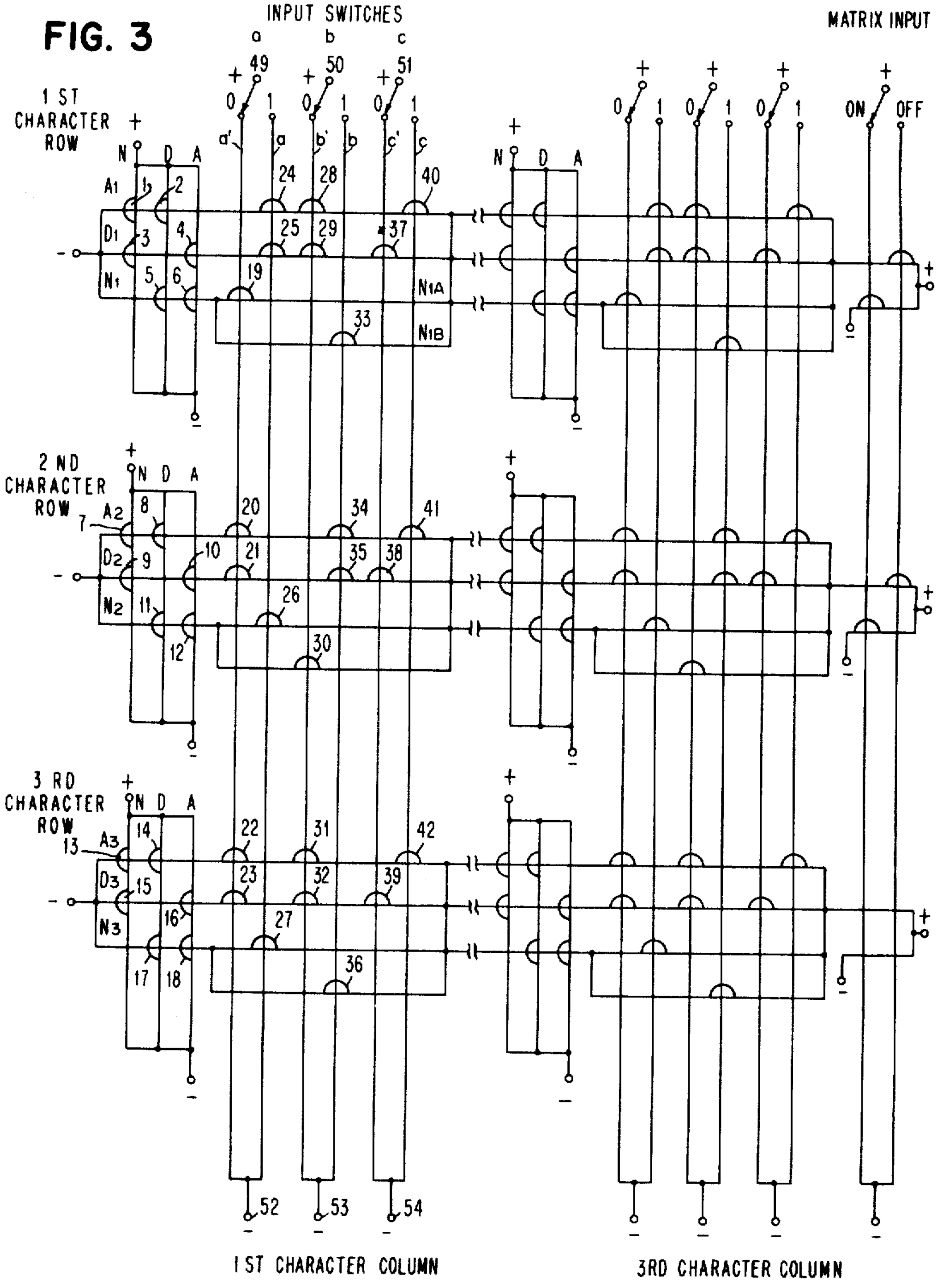
FIG. 3 is a detailed showing of matrix switches for setting the Character Select Matrix flip-flops of FIGS. 2D and 2E.

Since the essential operation of the associative memory, per se, shown in FIG. 6 is the same as that shown in FIG. 3 of the previously filed application Ser. No. 514,568, reference may be made to that application. However, as an aid to understanding the principles of the present invention, the operation of a typical memory cell will be considered.

In the cell 1000, a first transistor 1100 and a second transistor 1110 are provided, typically of the NPN type. The bases of transistors 1100 and 1110 are respectively coupled directly to the collectors of the opposite transistors. The collectors of these transistors are each connected to a load resistor as shown. For convenience, a line to the collector of transistor 1100 is referred to as the bit test "0" line, and the line to the collector of transistor 1110, as the bit test "1" line.

The emitters of transistors 1100 and 1110 are coupled together, and are connected by an emitter resistor to the word drive line. The emitters are also tied to the base of the transistor 1120, to whose collector a bias supply is connected, and to whose emitter the word sense line is connected.

In the quiescent state of memory cell 1000, that is, when no signals are being supplied to the memory cell 1000, either the transistor 1100 or the transistor 1110 is in the conductive state. When transistor 1100 is conductive, an "0" is being stored, and when transistor 1110 is conductive, a "1" is stored.

In order to write information into a given memory cell such as cell 1000, the word drive line is pulsed positively. If it is desired to write an "0" into the memory cell, the bit test "1" line is also pulsed positively. This results in transistor 1000 going into conduction and remaining in that state. Similarly, to write a "1" the word line is again pulsed positively, but now the bit test "0" line is coincidently pulsed positively. This results in conduction by transistor 1110.

In the memory system as depicted in FIGURE 6 nondestructive readout of the memory cells is provided. By nondestructive readout, as is well-known to those skilled in the art, the state of a memory cell is ascertained without requiring that the state be changed. To read out the typical cell 1000, therefore, the potential is raised on the word drive line and this results in a change in current for the already conducting transistor. Thus, assuming transistor 1100 is conducting, that is, a "0" is being stored, the change in current will be detected on the line connected to the collector of transistor 1100. This corresponds, of course, to the "bit test 0." In the performance of an associative search with the memory system of FIGURE 6 a predetermined cell such as the typical cell 1000 is tested, for example, for a "0," and a positive pulse is applied to the "bit test 0" line. If the cell 1000 is storing a "0," transistor 1100 will then be conducting. The current flow through the transistor 1100 will not be substantially affected by the applied pulse, and thus there will be no change on the word sense line. However, if the memory cell was storing a "1" with transistor 1110 conducting, this raise in potential on the "bit test 0" line would cause a spike of voltage on the word sense line.

In operation of the memory cell in the performance of an associative search only the test lines, that is, the "bit test 0" and "bit test 1" lines have their potential levels changed. In this case the word sense line (or match line) is used to sense whether or not the interrogating information matches the stored information. If the cell is to be tested for a stored "0," the "bit test 0" line is raised in potential. In the event that a "1" is being stored rather than an "0," the transistor 1110 is conductive and the raising of the potential of the "bit test 0" line causes a spike of voltage to appear on the sense line. However, if transistor 1110 were in the conductive state, the raising of the collector potential would have no effect on the sense line, that is, there would be no signal on this line and the indication would thus be that a match had occurred.

The implementation of the RAMOR system in solid logic technology will be explained by reference to FIGURES 7, 8 and 9. It will be appreciated that rather than unduly encumbering this specification by further reference to all of the other elements of the system, attention will be directed to the specific control circuitry, namely, the bit control logic of FIGURE 7, the control of the range bit as shown in FIGURE 8, and also to the word control logic as depicted in FIGURE 9. FIGURE 9 incorporates in block form the associative memory of FIGURE 6.

Referring now particularly to FIGURE 7, there is shown, in addition to the basic Entry and Mask Registers that are normally used in associative memory systems (and which have been described in the prior cryogenic embodiment of the system of the present invention) a Sort Register and an Echo Register. These four registers have been illustrated as containing two bit positions, but it will be appreciated that any number of bit positions can similarly be arranged. These four registers are shown in the (A) section of the figure and their several outputs are connected to the corresponding input points in the (B) and (C) sections of this same figure. The various elements, such as AND and OR logic circuits, are labeled in accordance with conventional labeling and, per se, are well-known to those skilled in the art. The four registers, namely, the Sort Register, Entry Register, Mask Register and Echo Register, comprise conventional storage devices 1200, 1210, 1220, 1230, 1240, 1250, 1260, and 1270. For convenience, the bit position on the left is referred to as the "$i$" position and the bit position on the right is called position "$i+1$." The "0" and "1" states for each of the storage devices 1200–1270 are controlled by a plurality of input lines. For example, in the Entry Register the arrows at the top of the storage device 1220 indicate typical input lines. Further, there is a set line for precise control at predetermined times of the "1" state and a reset line for control of the "0" state. The arrangements for the other storage devices are apparent from this consideration of storage device 1220.

The Sort Register is used here to define the field upon which the RAMOR retrieval is to be performed. The Echo Register will be explained hereinafter.

The basic algorism for performing an ascended RAMOR sort is the following: All match indicators are initially cleared. Write the specified value in the Entry Register, and compare with all words in memory. Change the lowest order "0" to a "1" and compare this bit and all higher order bits (lower order bits are masked out) to all words in memory. Any word that matches will be equal to or greater than the original value because this word will have a change in the highest order position in which the two words differ. These matched words will turn on their corresponding match indicator. Change the next higher order "0" to a "1" and compare this bit and higher order bits to the entire associative memory. This continues until all "0" 's in the original word have been changed to "1" 's. The algorism for performing a descending RAMOR sort is very similar to that for performing an ascending RAMOR sort. The only difference is that the "1" 's complement of the specified word is written in the Entry Register and that we compare with the "1" 's complement of the Entry Register. This may seem like a "double reverse" but it allows us to use the same method of changing the "0" 's in the Entry Register to "1" 's while having the effect of changing "1" 's in the original value to "0" 's.

The circuits shown in FIGURE 7, that is, in (A), (B) and (C) perform these algorisms. Assume that the Sort Register is set to define the field upon which we would like to perform the RAMOR operation, the Entry Register contains the initial value, and the Mask Register is appropriately set. First, the Echo Register is reset to "0" 's by means of the reset line 1300. Then the TR line 1310 is pulsed, thus setting "1" 's in those positions of the Echo Register which correspond to "1" 's in the Entry Register. This follows because of the AND gate 1320 at the output of storage device 1230. A signal is applied on the INC line 1330 to the lowest order sort bit. The signal propagates through all "0" sort bits, that is, bit positions where a "0" is being stored, until it reaches the lowest order position of the defined field which is a "1." At that position, because of the AND gate at the output, for example AND gate 1340 at the output of storage device 1220, the signal on the INC line 1330 will be applied to the corresponding bit in the Entry Register, changing it to a "1" if it was originally a "0" or leaving it a "1" if it was originally a "1." This same signal is simultaneously ANDed, such as by AND gate 1350, with the corresponding echo bit. It should be pointed out here that the Echo Register is used to maintain the previous value of the Entry Register for a short time after the entry bit is changed; then later, the echo bit assumes the new value of the entry bit. Thus, if the entry bit was a "0," at the time of the INC signal, the echo bit would remain "0" for a while and thus prevent the propagation of the INC signal to the next bit. After the INC signal is removed, the TR signal comes on and changes the echo bit to a "1." The Echo Register must be initialized each time new data is brought into the Entry Register, which requires merely setting the Echo Register to "0" 's and applying the TR signal one time. Now when the echo bit is a "1" at the time of the INC signal (meaning the corresponding entry bit is also "1") a new signal is created from the AND gate at the echo bit such as AND gate 1350. This signal goes to two inputs. One of these is an input OR gate 1360 which has its output at a signal identical to the original INC signal which is subject to the same logic in the next bit (and all succeeding bits). The other input is used to set the mask on the corresponding bit of the Mask Register since we are not interested in low order "1" 's after they have been used once.

After each INC signal is applied, we perform an interrogation with the value of the Entry Register or its complement according to the True/Complement Gate. This will turn on a Match Indicator for each word in the associative memory which is equal to the unmasked portion of the Entry Register. This interrogation operation is performed until the entire field has been masked, and the INC signal finds no more bits marked in the Sort Register. At this point, we unmask the Range Bit, and selectively write a "0" in the Range Bits of all those words whose Match Indicators have been turned on during the previous set of interrogations.

The circuits of FIGURES 8 and 9 show the controls for this operation. In particular, it should be noted that in FIGURE 9 the box labeled "associative memory array" corresponds with the 3 x 3 matrix array of FIGURE 6 already described. It should also be particularly noted that the typical bit drivers are those labeled thusly at the bottom of FIGURES 7(B) and (C); the Range Bit drivers are those labeled thusly at the bottom of FIGURE 8(C). There are, of course, two inputs shown in FIGURE 9 from each bit driver and these correspond with the "bit test 0" and "bit test 1" lines previously noted in connection with FIGURE 6. It should also be particularly noted that the Match line 1400 corresponds with the word sense line illustrated in FIGURE 6, and that the line 1410 in FIGURE 9 labeled Read/Write corresponds with the word drive line in FIGURE 6.

In the circuits of FIGURES 8 and 9, the various incoming signals, namely Set Zero, Unmask, Write True and Selective Write from the memory controls will perform this selective write function. Only those words whose Match Indicators are "1" will have their write line active for the selective write. We can then insert a new bound in the Entry Register and repeat the entire operation. New bounds are thus inserted until all desired fields have been considered in the range identification operation. We will then have a "1" in the Range Bits of each word which has satisfied all the initial criteria. Thus, by performing a normal interrogate and read operation we can retrieve all words of interest.

What has been disclosed herein is a unique associative memory system which is especially adapted to enable storage of data in random fashion and a subsequent retrieval of all of the stored data which satisfies established criteria. More particularly, the present invention provides the key feature in an associative memory of the ability to retrieve randomly-stored words which fall within a given range, that is, Range Retrieval. This Range Retrieval feature has been particularly described as embodied by means of the cryogenic technology and also in a solid state, that is, semiconductive technology. In both of these embodiments the system has been designed and constructed to attain the utmost in simplicity at the bit level. At this bit level, that is, in the Word Registers, the ability to retrieve data within established bounds has been accomplished by means of only an equal or unequal manifestation. The novel approach in accordance with the present invention effectively has modified the algorism that is employed and the controls that are utilized in a Range Retrieval operation.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An associative memory system comprising a plurality of word registers, each containing a plurality of bit positions, in which a plurality of data words are randomly stored, means for locating all of those words in said word registers a portion of whose content matches selected data in a predetermined range, comprising means for successively comparing the stored data with interrogating data above and below the predetermined range, including means for applying said interrogation data in an ordered sequence that excludes the selected data in said predetermined range, and means for manifesting whether any of the stored data is equal at each successive comparison to the interrogating data.

2. An associative memory system as defined in claim 1, further comprising means for retrieving the entire content of all of those words a portion of whose content was found to match the selected data in said predetermined range as manifested by inequality with the interrogating data.

3. An associative memory system as defined in claim 2, wherein said means for retrieving the data includes means for retrieving the data in binary order from said word registers.

4. An associative memory system as defined in claim 1, wherein the means for locating the matching data includes means for successively comparing the stored data with interrogating data in ascending order of the latter above said predetermined range.

5. An associative memory system as defined in claim 1, wherein the means for locating the matching data includes means for successively comparing the stored data with interrogating data in descending order of the latter below said predetermined range.

6. An associative memory system as defined in claim 1, wherein each of the bit positions comprises a persistent current, superconductive loop circuit including at most three in-line cryotron devices.

7. An associative memory system as defined in claim 1, wherein said word registers each contain a plurality of bit positions and a plurality of auxiliary positions including a range bit position for identificaton of words that satisfy established criteria, and further including means for registering the match or no-match condition of a selected word register prior to setting the range bit position of said selected word register to a predetermined state indicative of said condition.

8. An associative memory system as defined in claim 1, wherein each of the bit positions comprises a storage circuit having at least three transistors, two of which are cross-coupled from their respective collectors and bases.

9. An associative memory system in which a plurality of words are stored randomly in a plurality of word registers and in which all stored words having a portion of their content between two predetermined values are retrieved comprising means for locating all of those words a portion of whose content is lower in value than the first predetermined value including means for successively comparing interrogating data in a descending ordered sequence with the stored data, means for locating all those words a portion of whose content is higher in value than the second predetermined value, including means for successively comparing interrogating data in an ascending ordered sequence with the stored data, each of said word registers including a plurality of data word bit positions and each further including a single range bit position for identifying those words a portion of whose content is equal at each successive comparison to the interrogating data.

10. An associative memory system as defined in claim 9, including means for initially setting all of the range bit positions in the data field of interest to a first state, means for subsequently setting to a second state all of the range bit positions of those data words a portion of whose content matches the interrogating data and, means for reading out the entire content of all those data words whose range bit positions remain in the first state.

11. An associative memory system as defined in claim 9, wherein each of the bit positions comprises at least three transistors, two of said transistors being connected to store a bit of information and a third transistor being connected to indicate whether a bit of interrogating data matches the stored bit.

12. An associative memory system as defined in claim 9, wherein each of the bit positions in each of the word registers comprises a persistent current superconductive loop containing at most three in-line cryotron devices, and means connected to said loop for indicating only whether a bit of interrogating data is equal to a stored bit.

13. An associative memory system as defined in claim 11 further including a first register for defining the sorting field for the data to be retrieved, and a second register for storing the interrogating data including means for propagating a signal through all bit positions of said first register that are in the "0" state and for applying said signal to a corresponding bit position of said second register upon reaching the lowest ordered bit position of the defined field which is in the "1" state.

References Cited

UNITED STATES PATENTS

| | | | |
|---|---|---|---|
| 3,195,109 | 7/1965 | Behnke | 340—172.5 |
| 3,253,265 | 5/1966 | Lindquist | 340—172.5 |
| 3,264,616 | 8/1966 | Lindquist | 340—172.5 |
| 3,354,436 | 11/1967 | Winder | 340—172.5 |

PAUL G. HENON, *Primary Examiner.*

PAUL R. WOODS, *Assistant Examiner.*